Feb. 18, 1958     A. G. F. RAMBOLD     2,823,502
METHOD AND MACHINE FOR MANUFACTURING, FILLING
AND CLOSING OF BAGS
Filed March 14, 1952     70 Sheets-Sheet 1

INVENTOR
Adolf G.F. Rambold
BY
Curtis, Morris + Safford
ATTORNEYS

Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 2

INVENTOR
Adolf G. F. Rambold
BY
Curtis, Morris & Safford
ATTORNEYS

Feb. 18, 1958
A. G. F. RAMBOLD
2,823,502
METHOD AND MACHINE FOR MANUFACTURING, FILLING AND CLOSING OF BAGS
Filed March 14, 1952
70 Sheets-Sheet 3
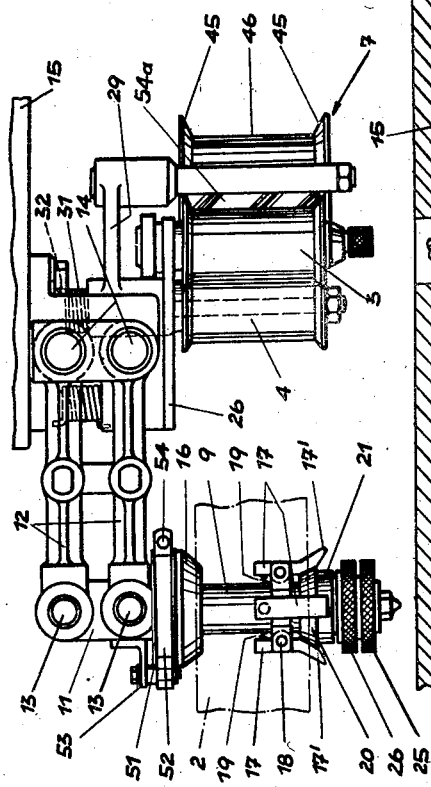
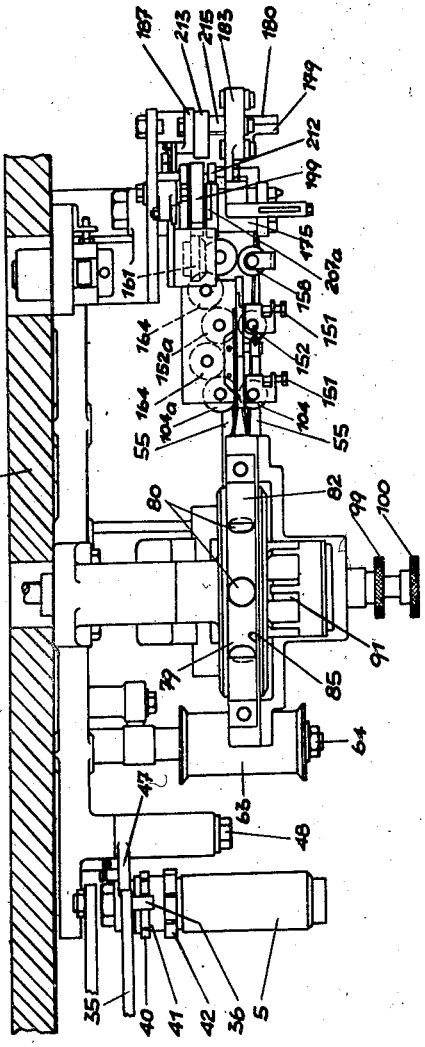
INVENTOR
Adolf G.F. Rambold
BY
Curtis, Morris + Safford
ATTORNEYS INVENTOR
Adolf G.F. Rambold Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 6

INVENTOR
Adolf G.F.Rambold
BY
Curtis, Morris + Safford
ATTORNEYS

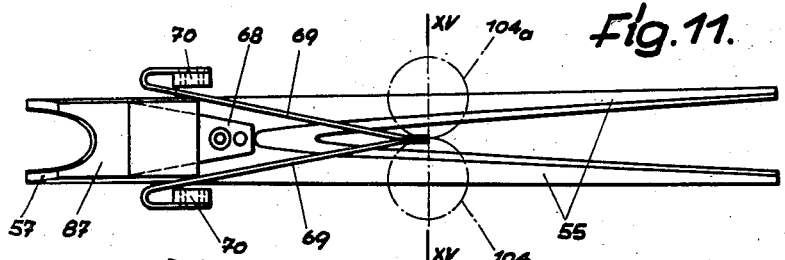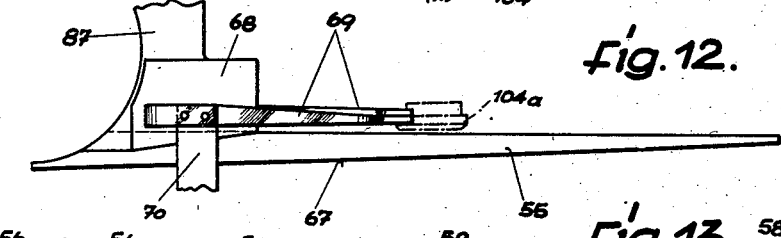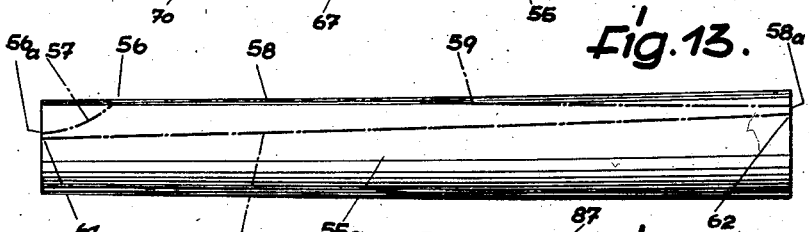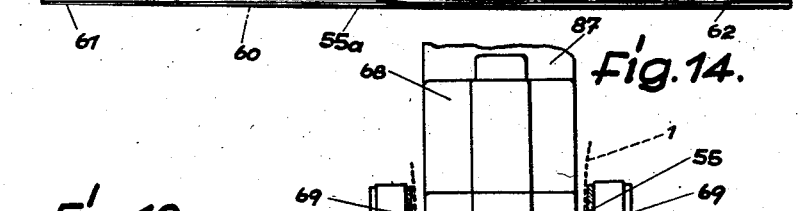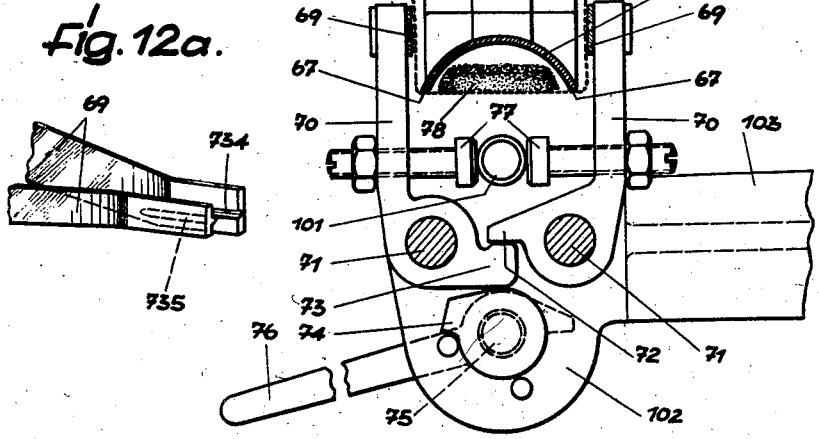

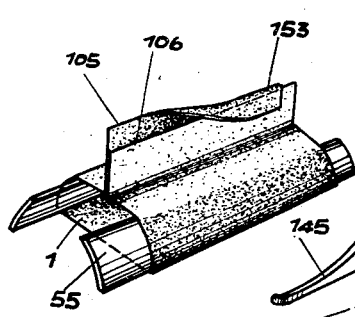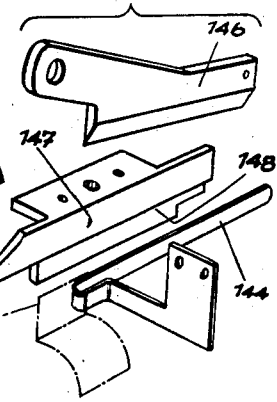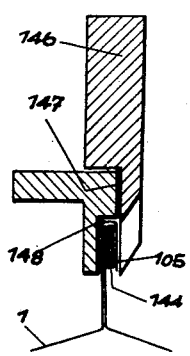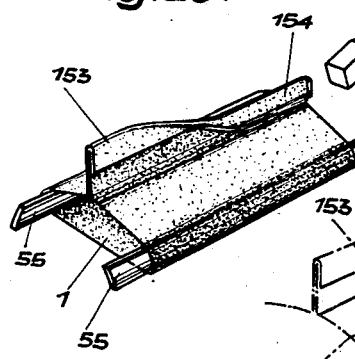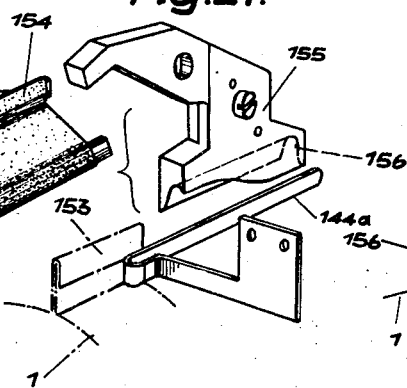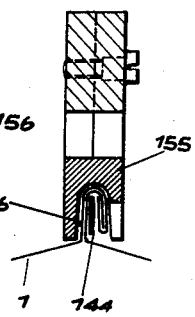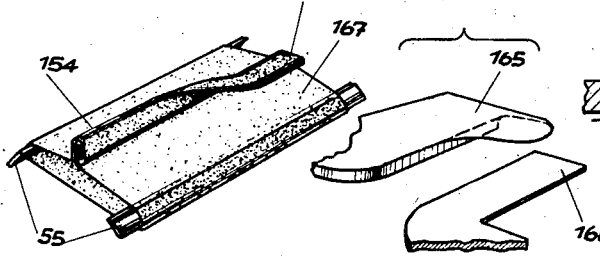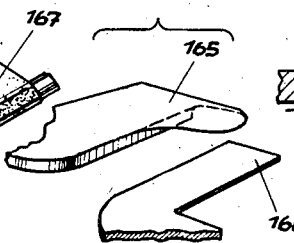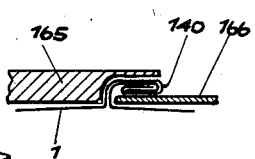

Feb. 18, 1958     A. G. F. RAMBOLD     2,823,502
METHOD AND MACHINE FOR MANUFACTURING, FILLING
AND CLOSING OF BAGS
Filed March 14, 1952     70 Sheets-Sheet 10
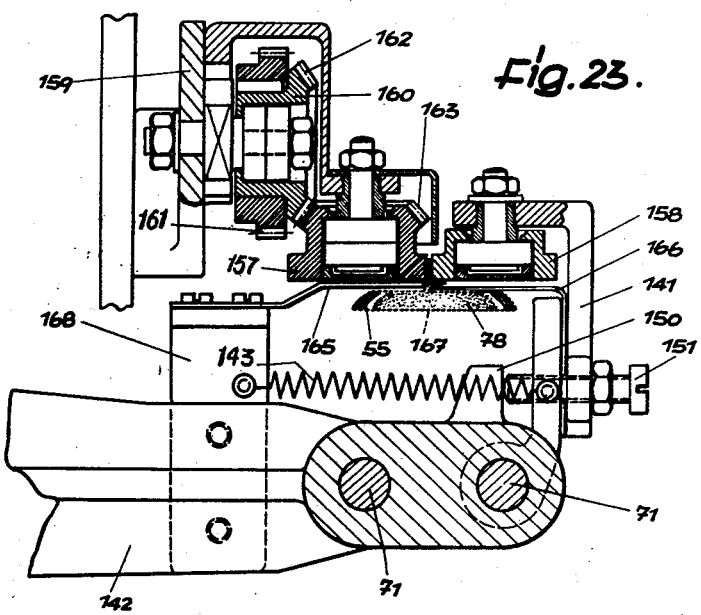
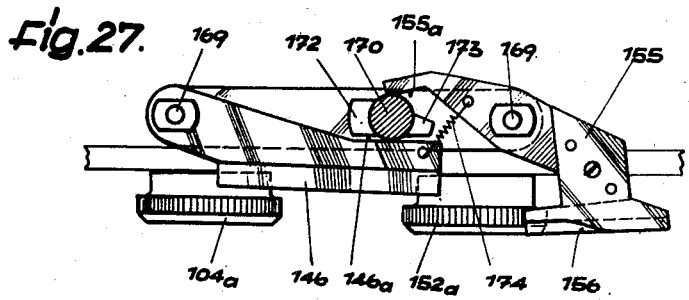
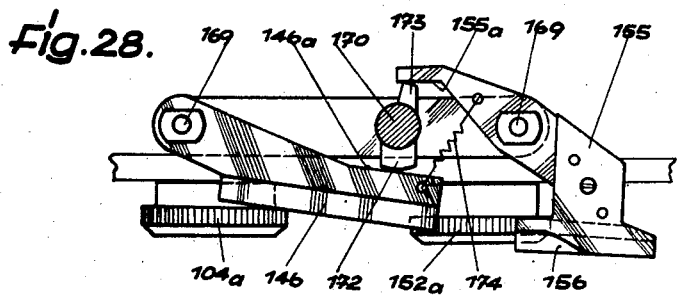
INVENTOR
Adolf G.F. Rambold
BY
Curtis, Morris + Safford
ATTORNEYS Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 11
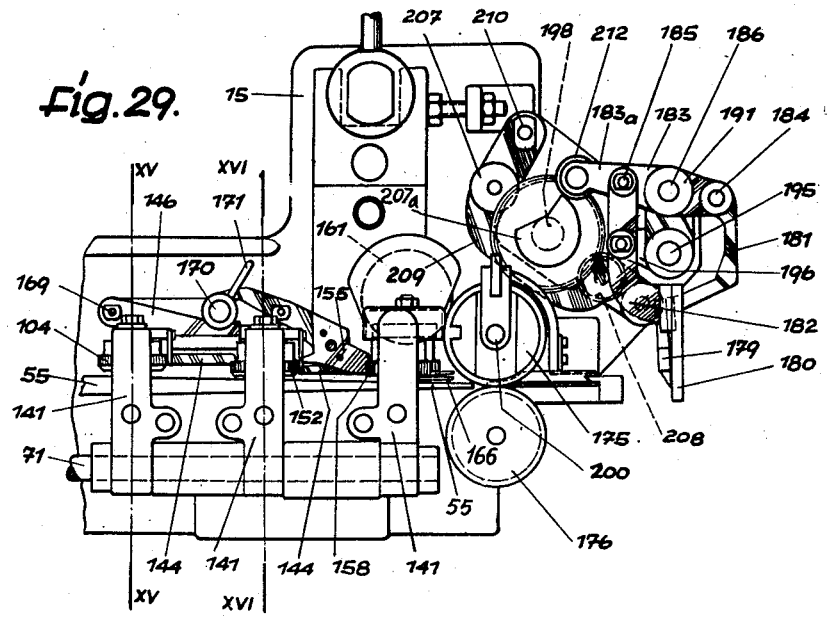
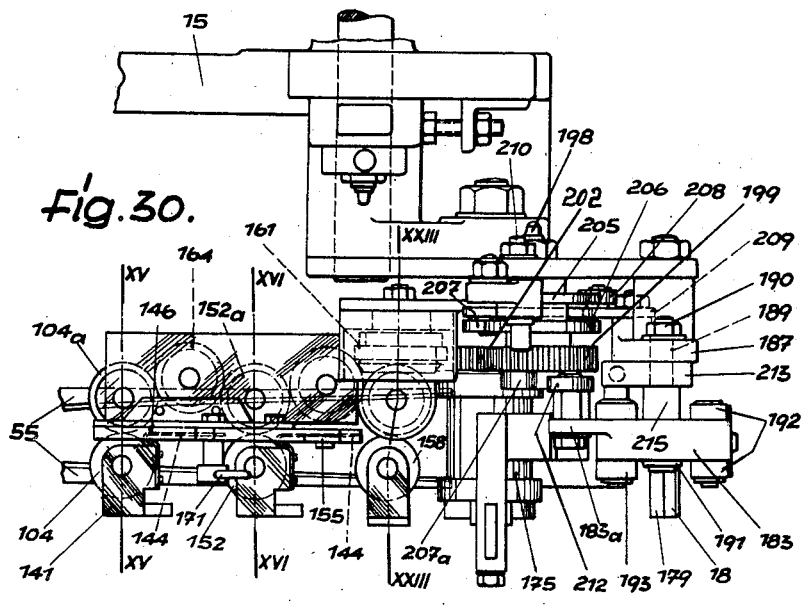
INVENTOR
Adolf G.F. Rambold
BY
Curtis, Morris + Safford
ATTORNEYS

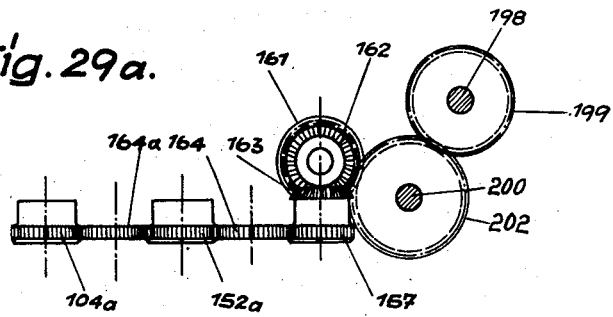
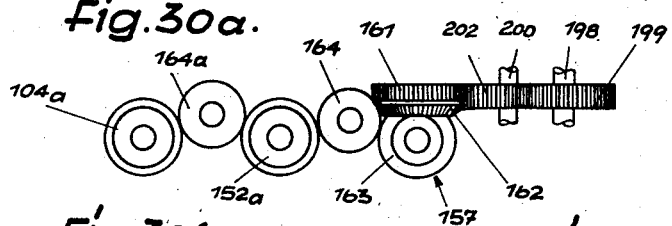
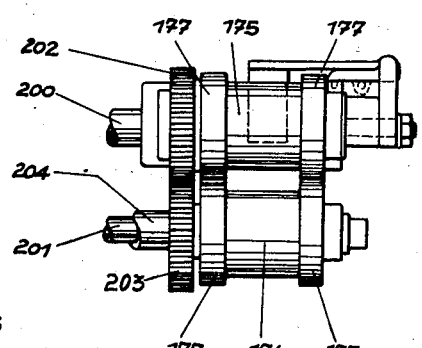
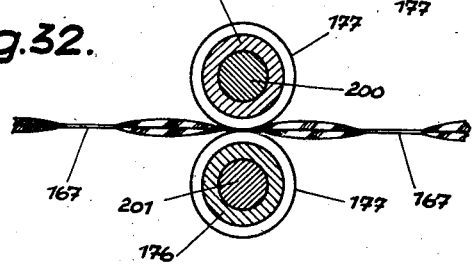

Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 13
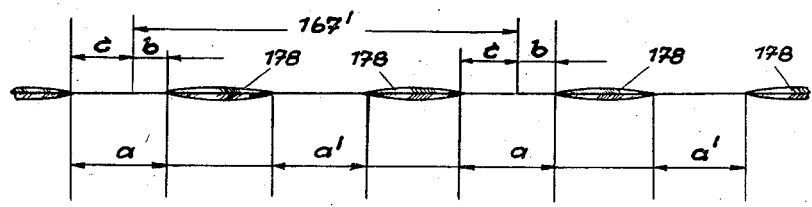
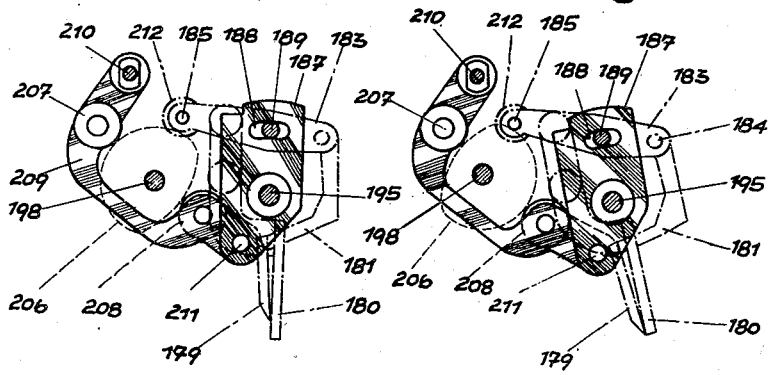
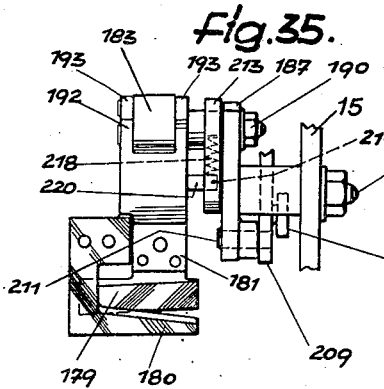
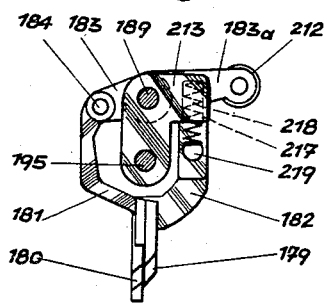
INVENTOR
Adolf G.F. Rambold
BY
Curtis, Morris & Safford
ATTORNEYS

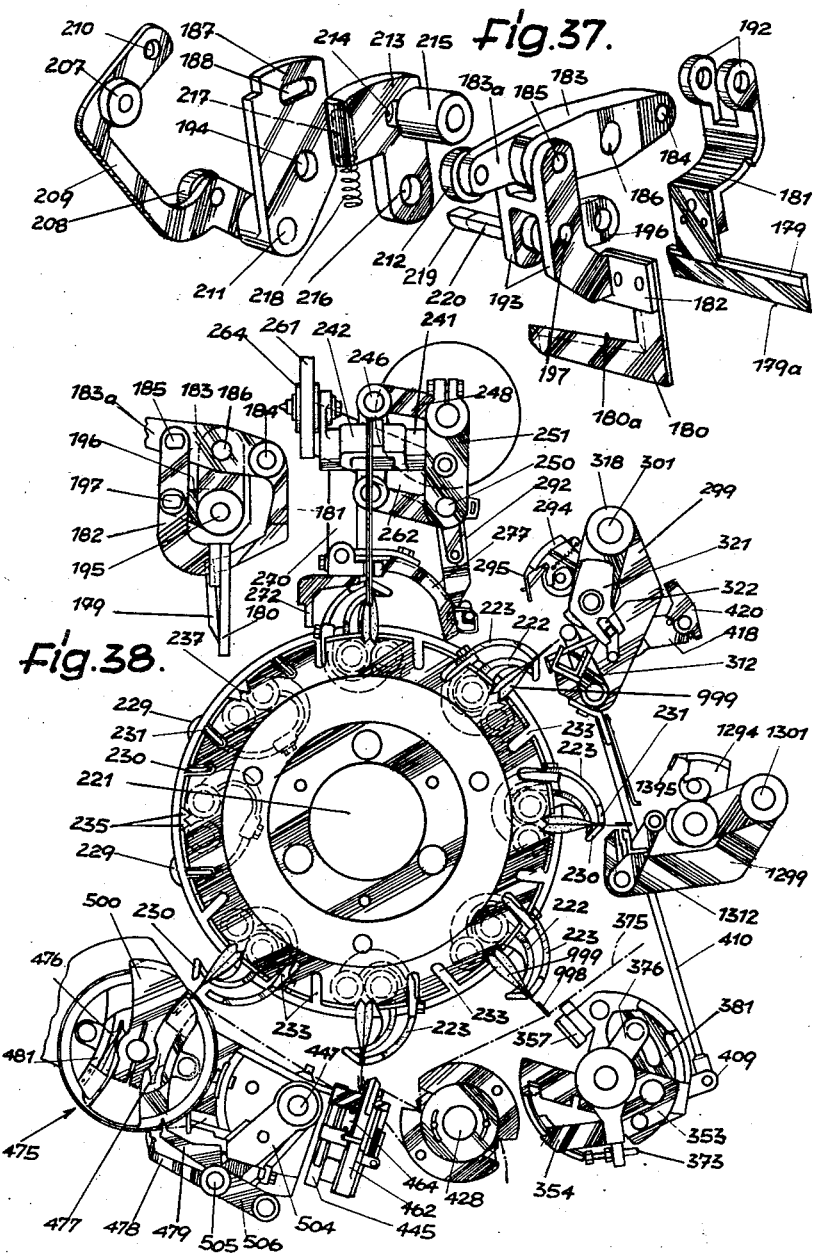

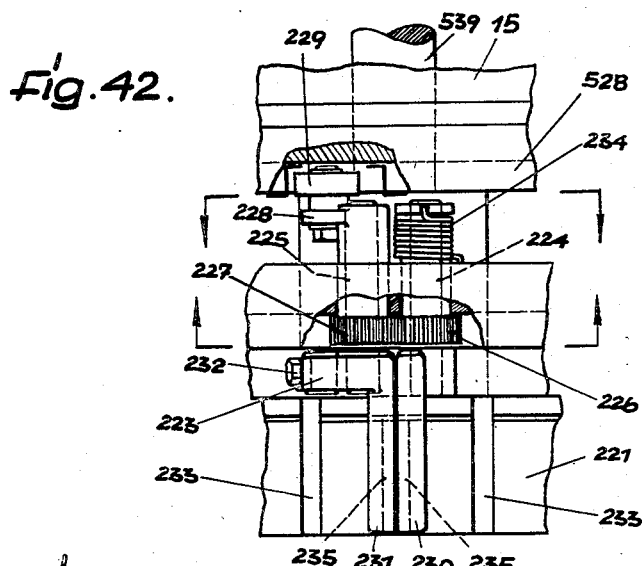
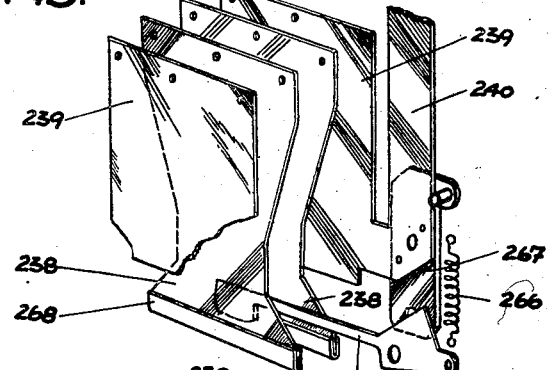
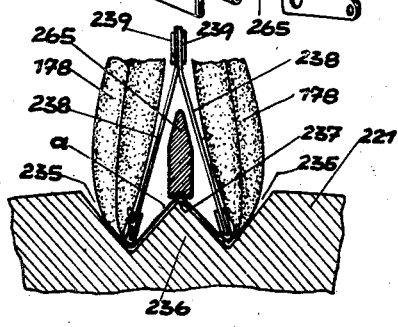

Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 17
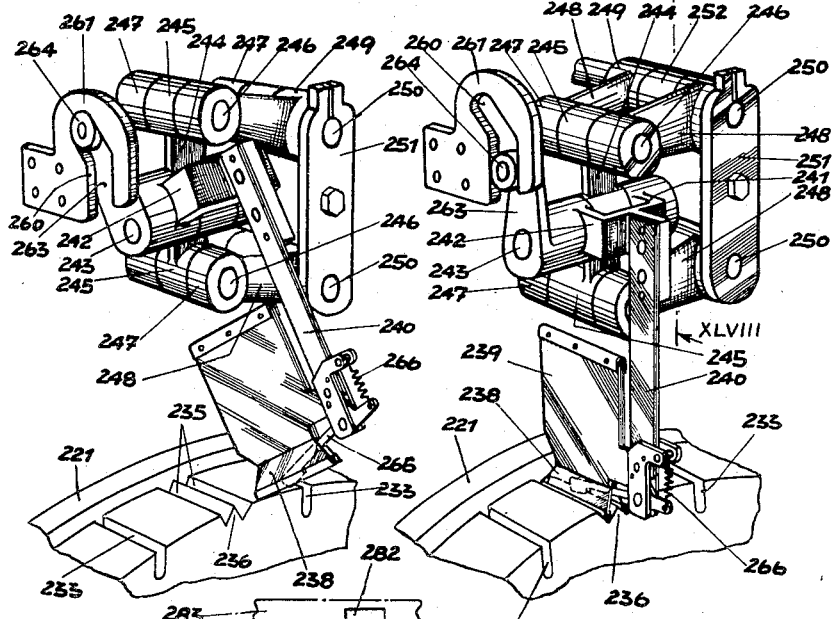
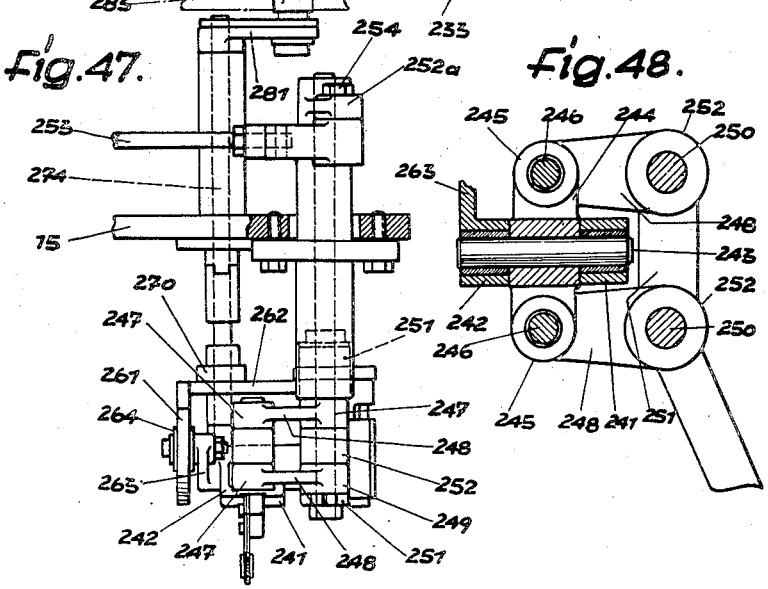
INVENTOR
Adolf G.F.Rambold
BY
Curtis, Morris + Safford
ATTORNEYS

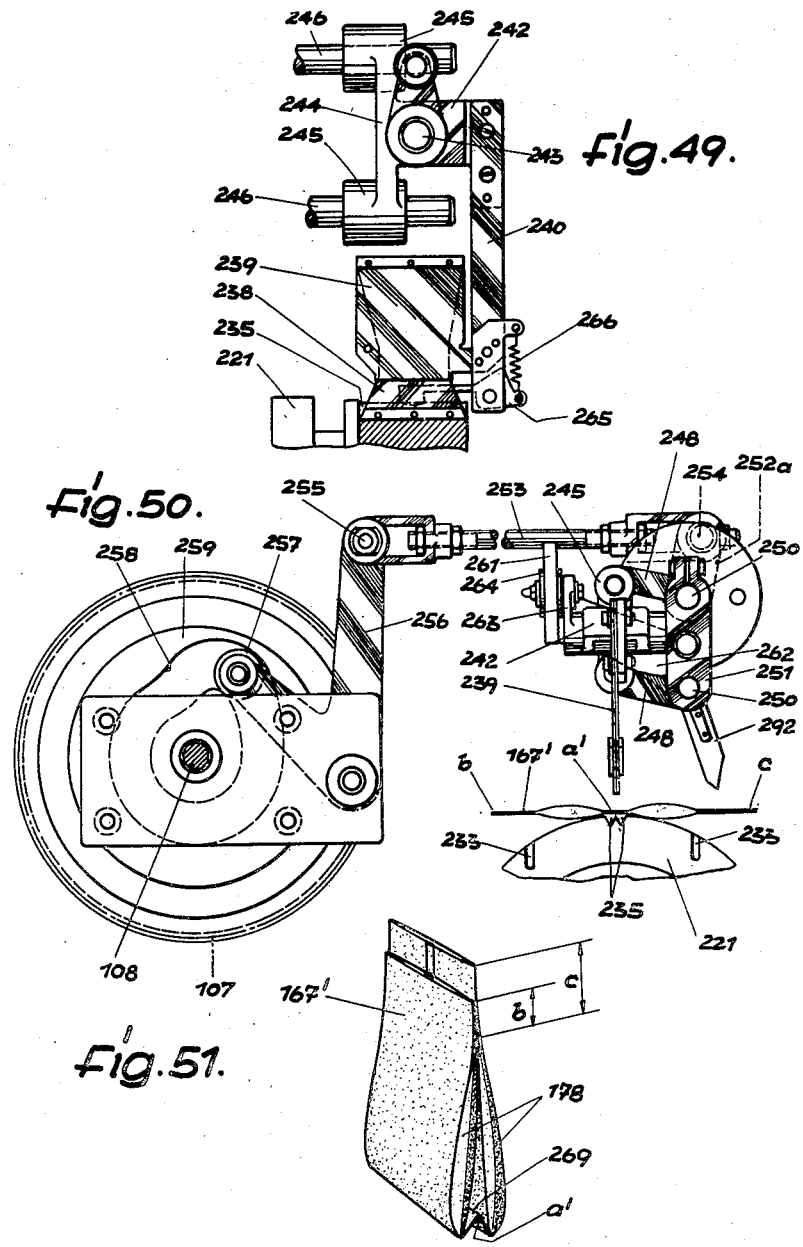

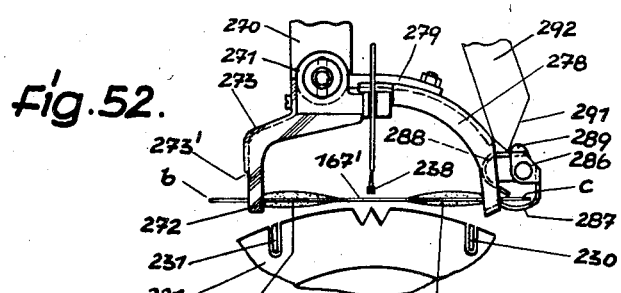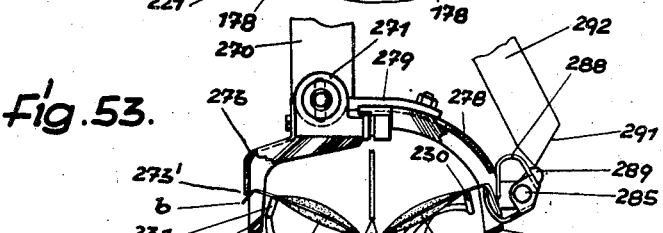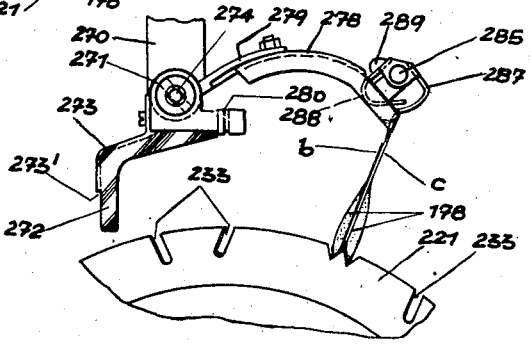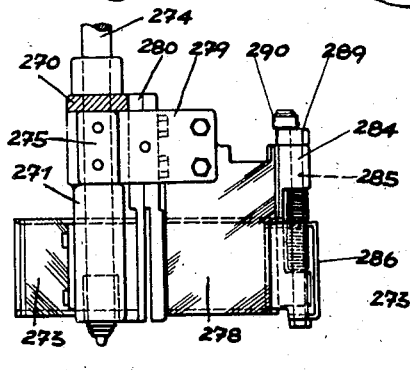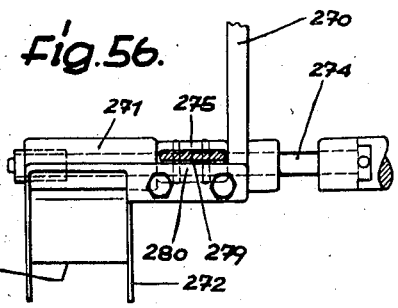

Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 21
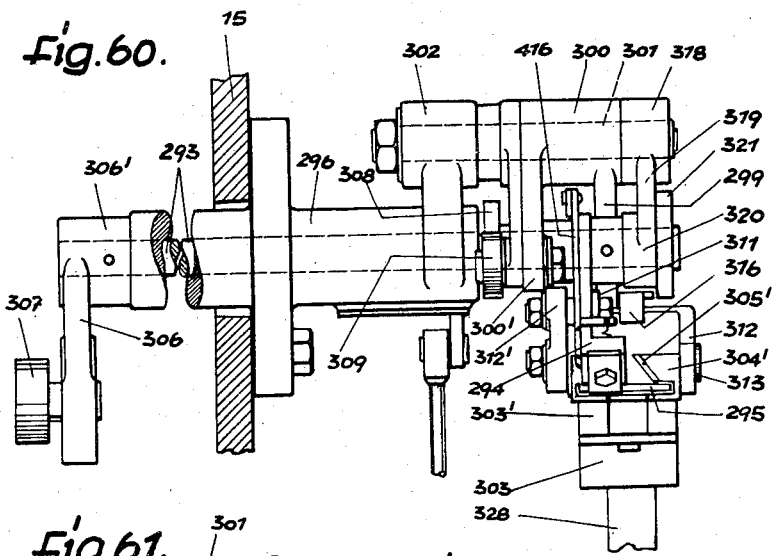
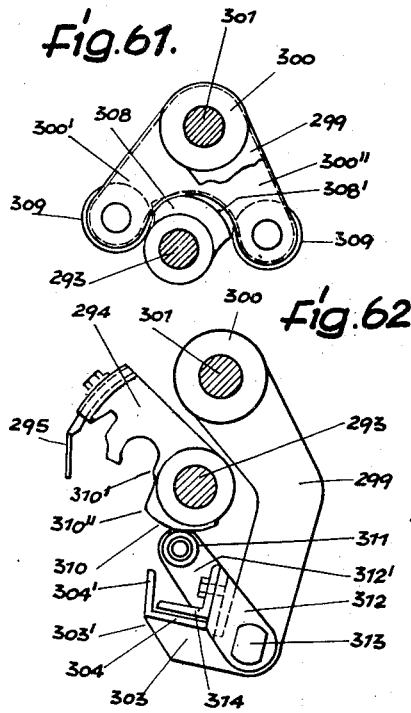
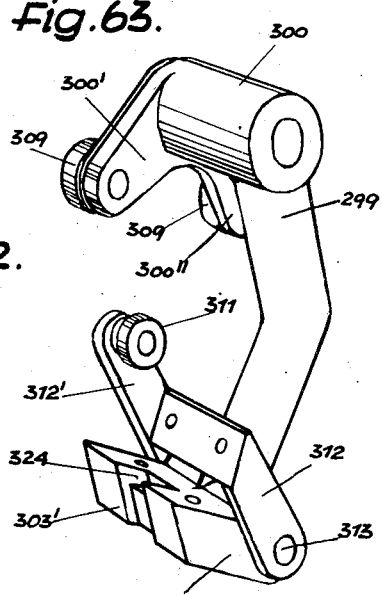
INVENTOR
Adolf G.F. Rambold
BY
Curtis, Morris + Safford
ATTORNEYS Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 22

INVENTOR
Adolf G. F. Rambold
BY
Curtis, Morris + Safford
ATTORNEYS

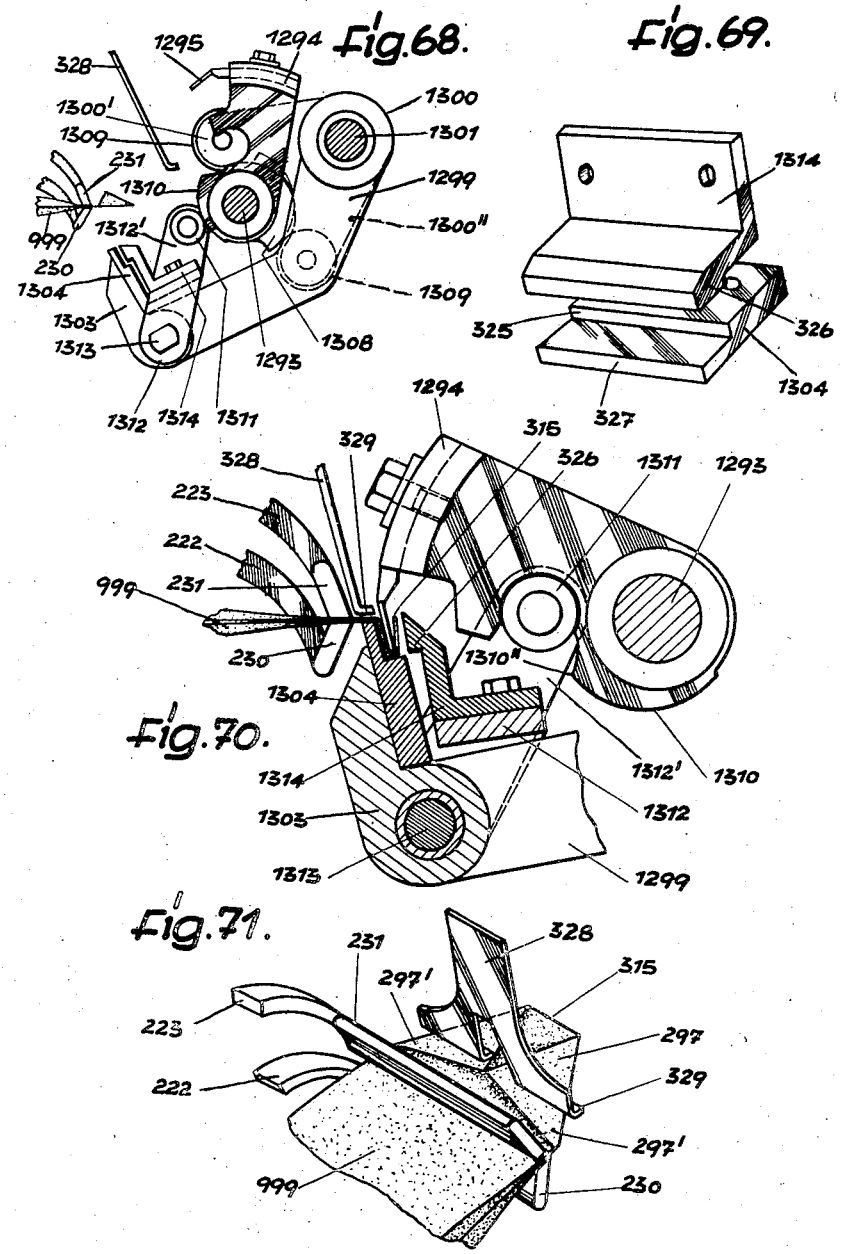

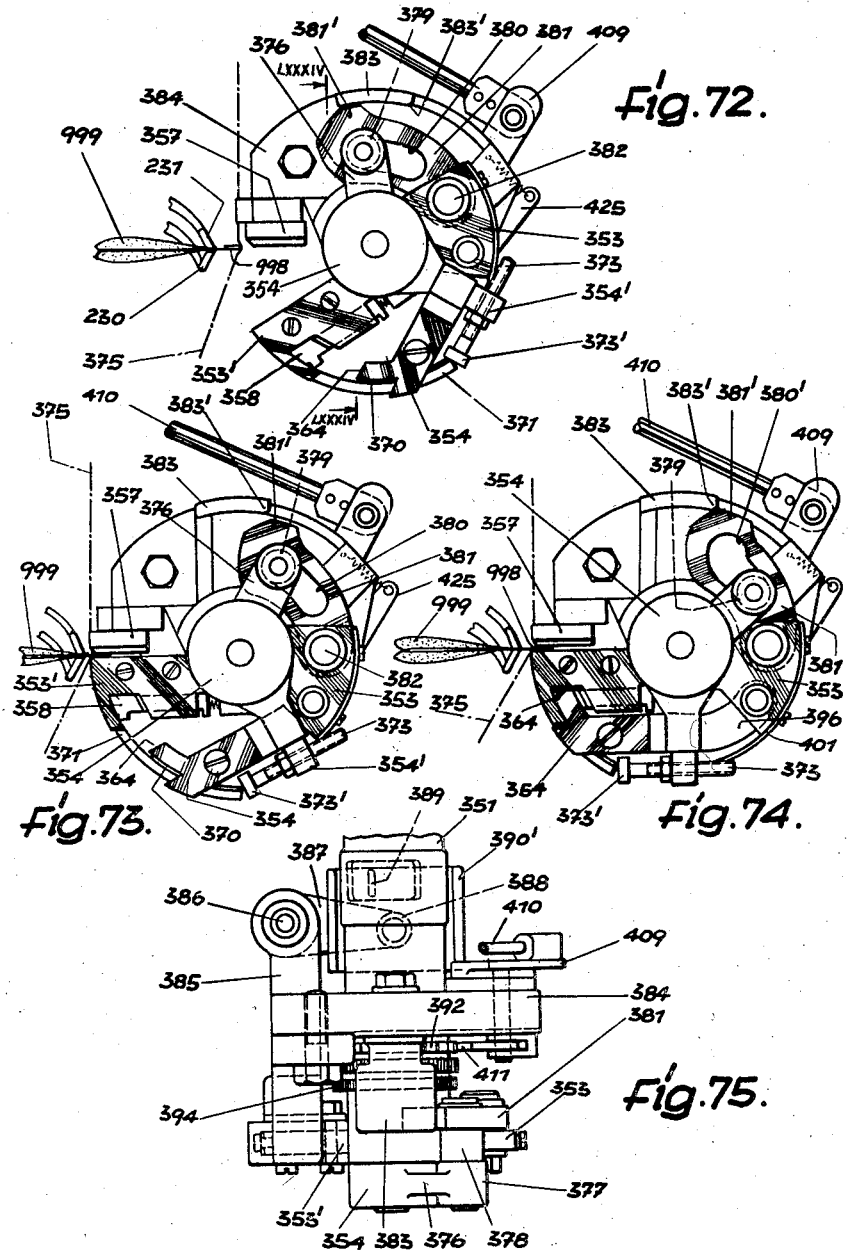

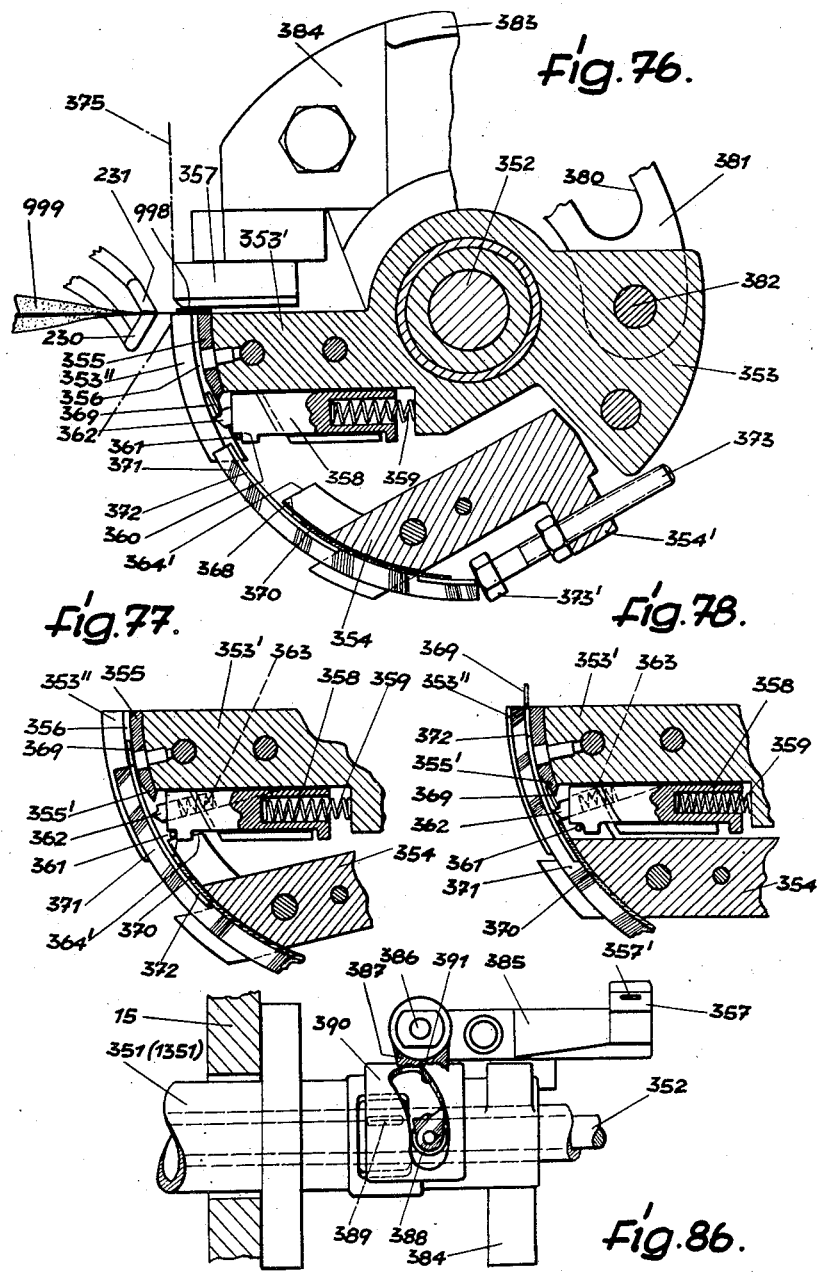

Feb. 18, 1958     A. G. F. RAMBOLD     2,823,502
METHOD AND MACHINE FOR MANUFACTURING, FILLING
AND CLOSING OF BAGS
Filed March 14, 1952     70 Sheets-Sheet 26

INVENTOR
Adolf G.F. Rambold
BY
Curtis, Morris + Safford
ATTORNEYS

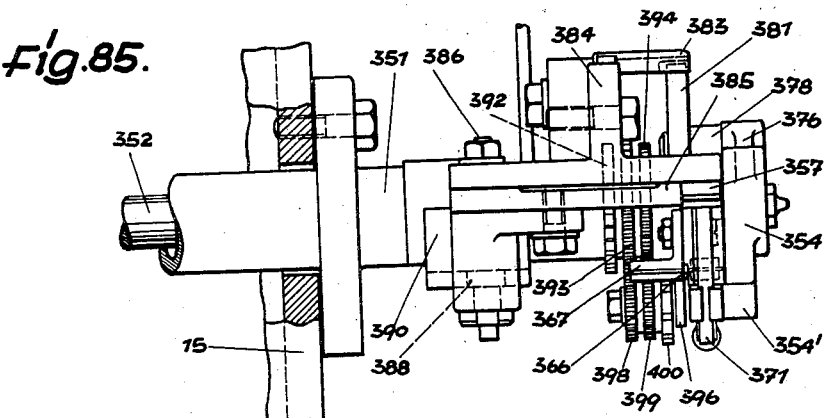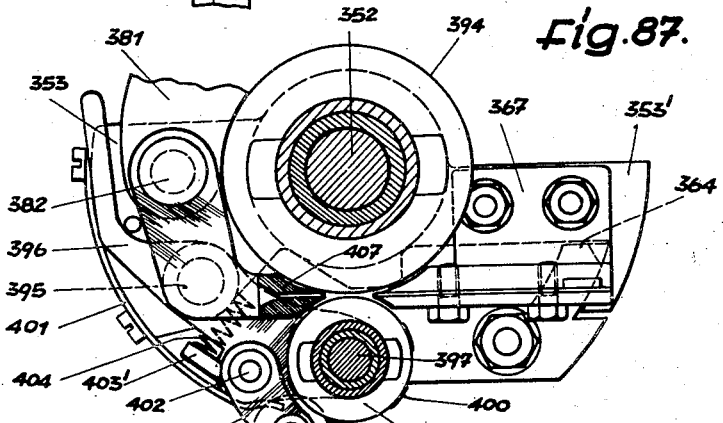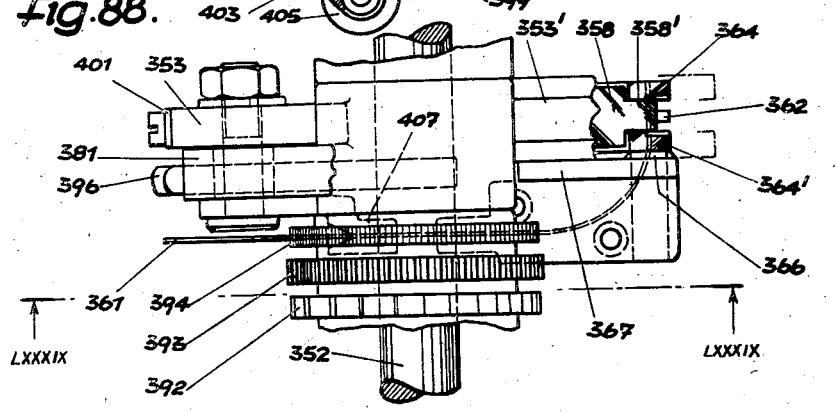

Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 30
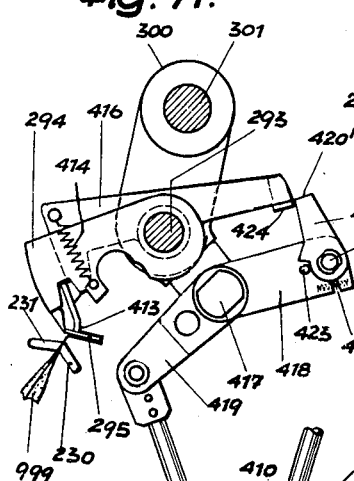
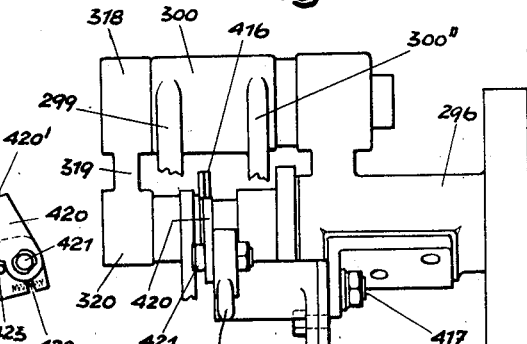
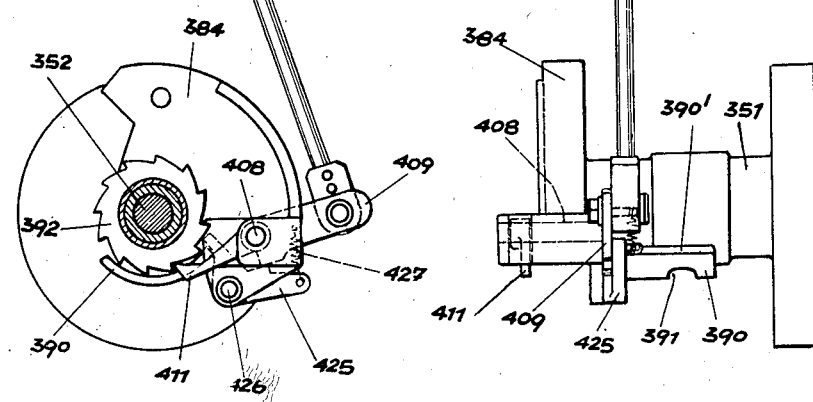
INVENTOR
Adolf G. F. Rambold
BY
Curtis, Morris + Safford
ATTORNEYS Feb. 18, 1958    A. G. F. RAMBOLD    2,823,502
METHOD AND MACHINE FOR MANUFACTURING, FILLING
AND CLOSING OF BAGS
Filed March 14, 1952    70 Sheets-Sheet 31

INVENTOR
Adolf G.F.Rambold
BY
Curtis, Morris + Safford
ATTORNEYS

Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 32
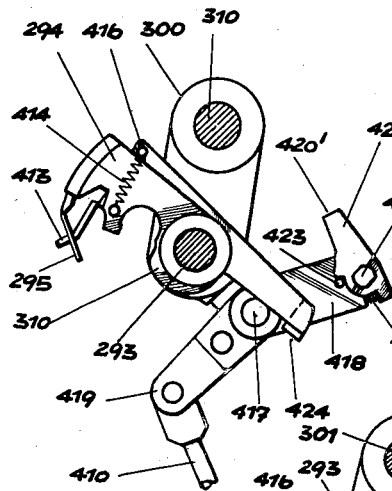
Fig. 98.
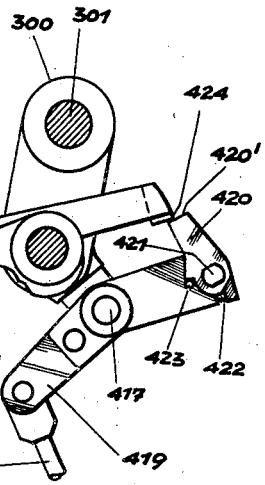
Fig. 99.
Fig. 100.
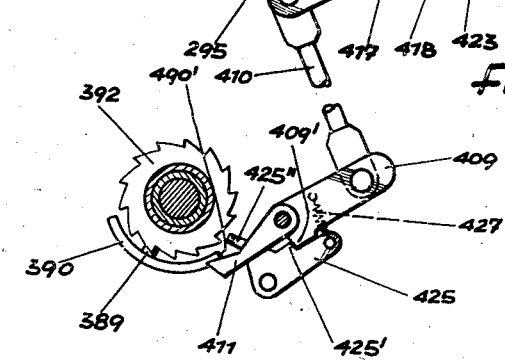
INVENTOR
Adolf G.F.Rambold
BY
Curtis, Morris + Safford
ATTORNEYS Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 33

INVENTOR
Adolf G. F. Rambold
BY
Curtis, Morris & Safford
ATTORNEYS

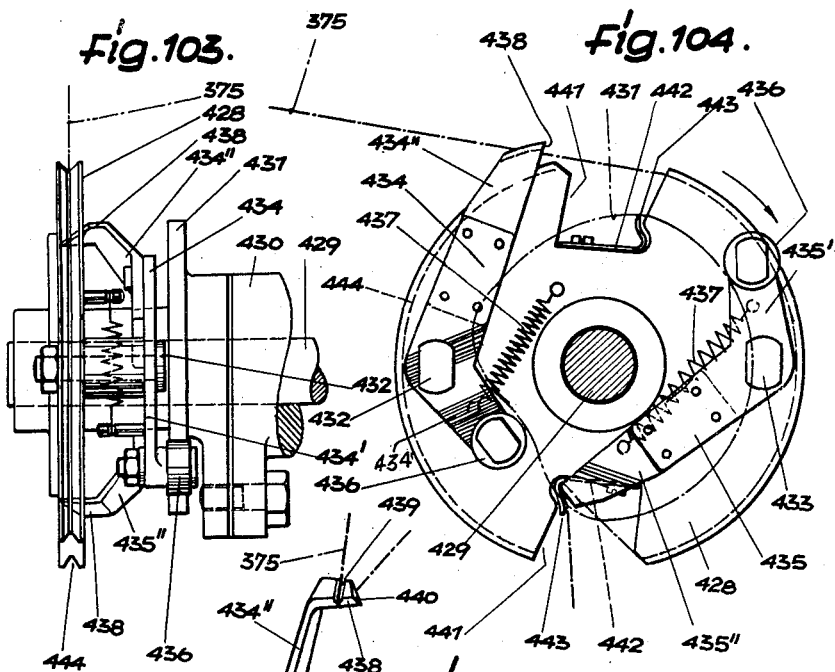
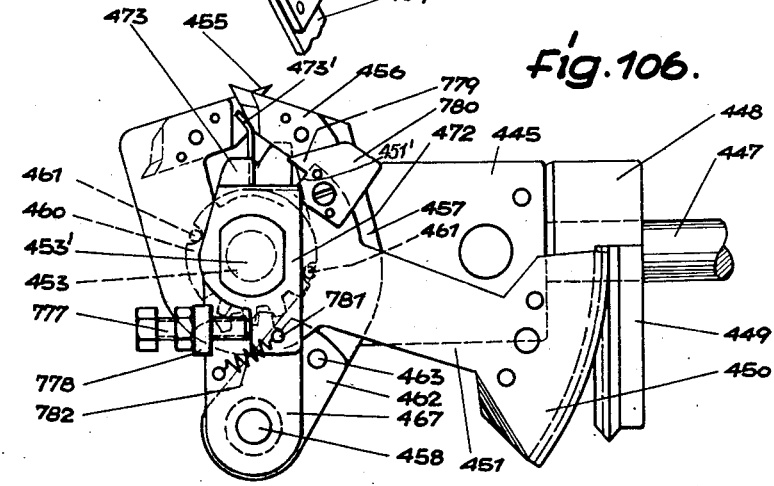

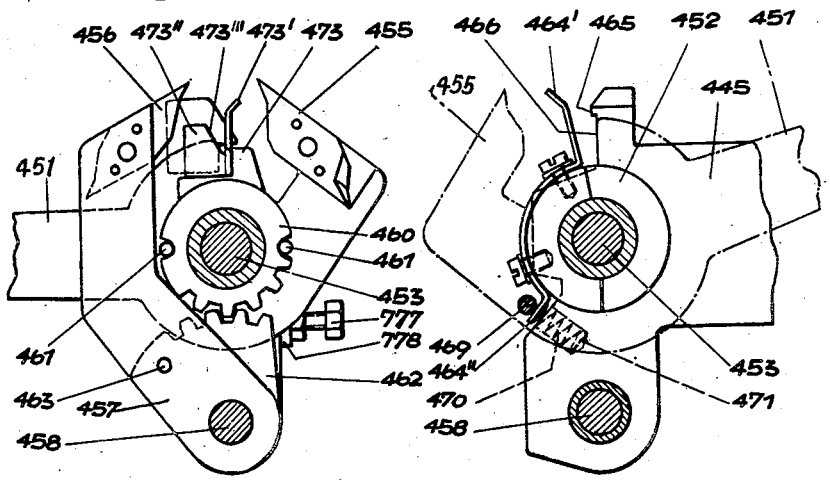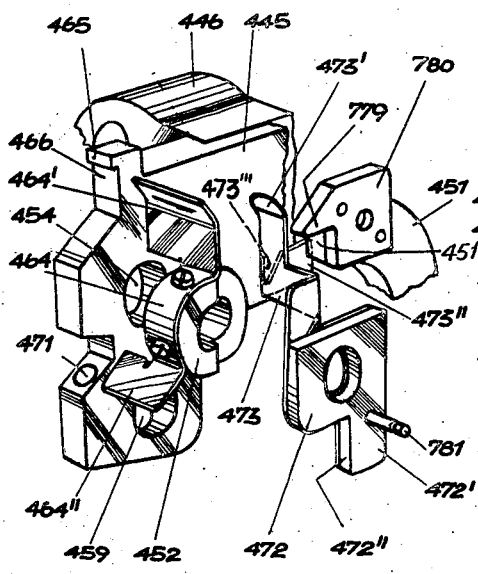

Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 36
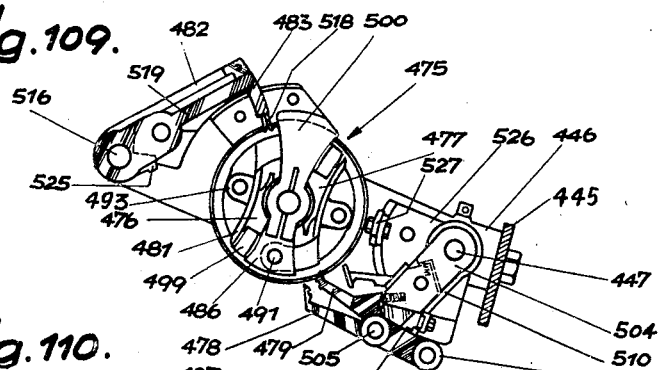
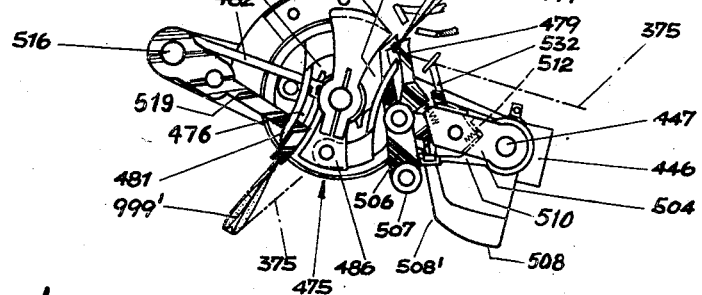
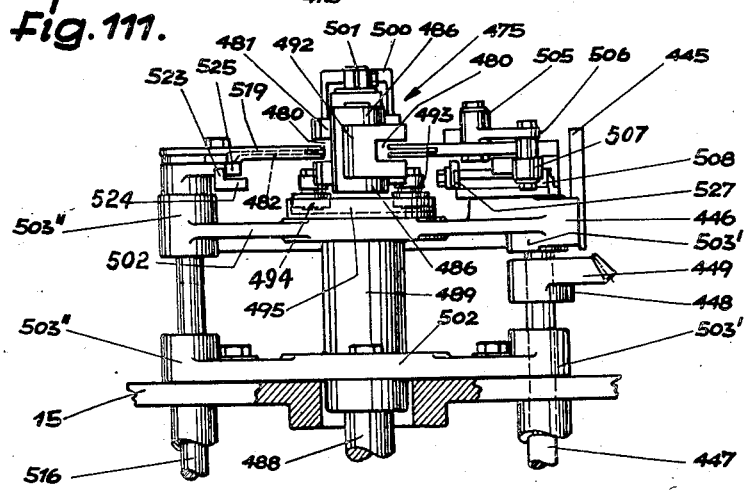
INVENTOR
Adolf G.F.Rambold
BY
Curtis, Morris + Safford
ATTORNEYS Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 38
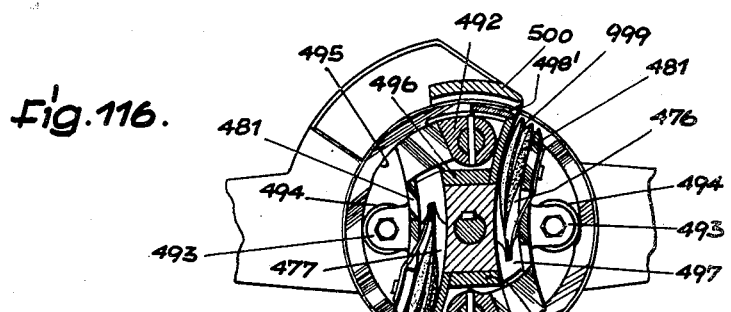
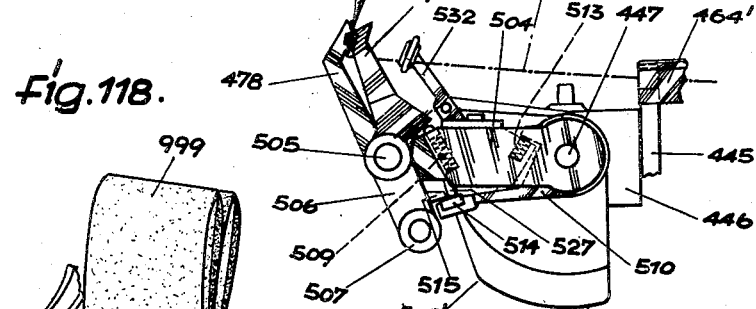
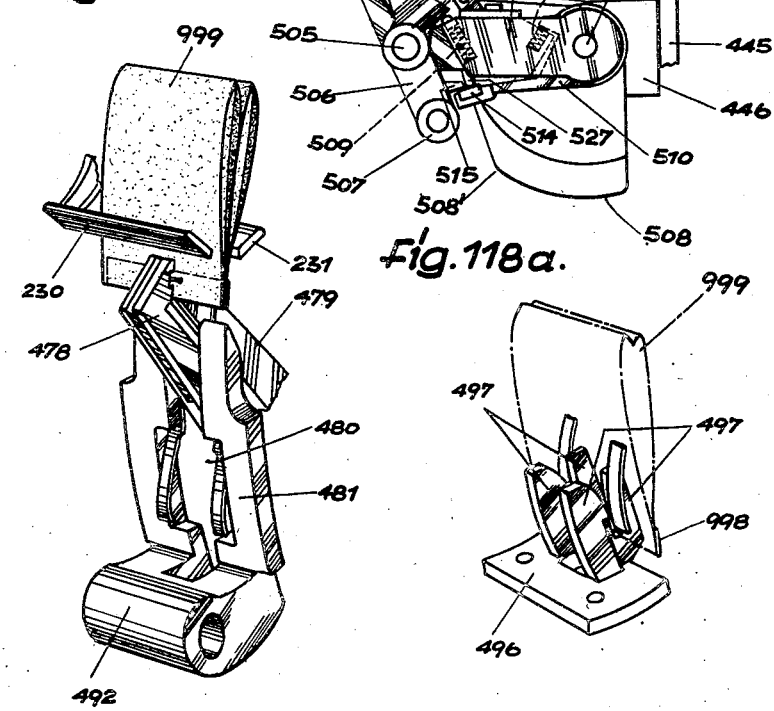
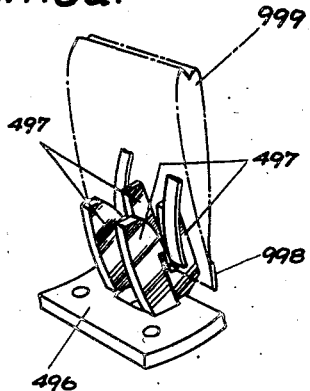
INVENTOR
Adolf G.F.Rambold
BY
Curtis, Morris + Safford
ATTORNEYS Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 39

INVENTOR
Adolf G. F. Rambold
BY
Curtis, Morris + Safford
ATTORNEYS

Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 40
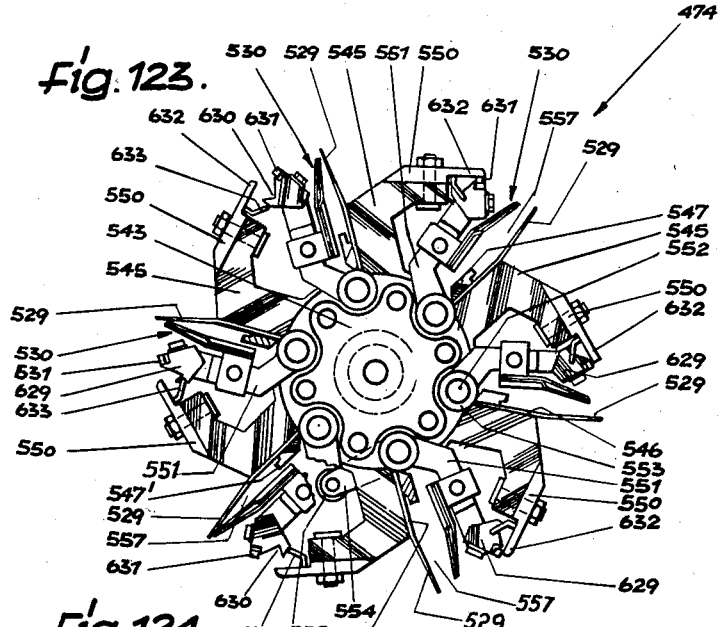
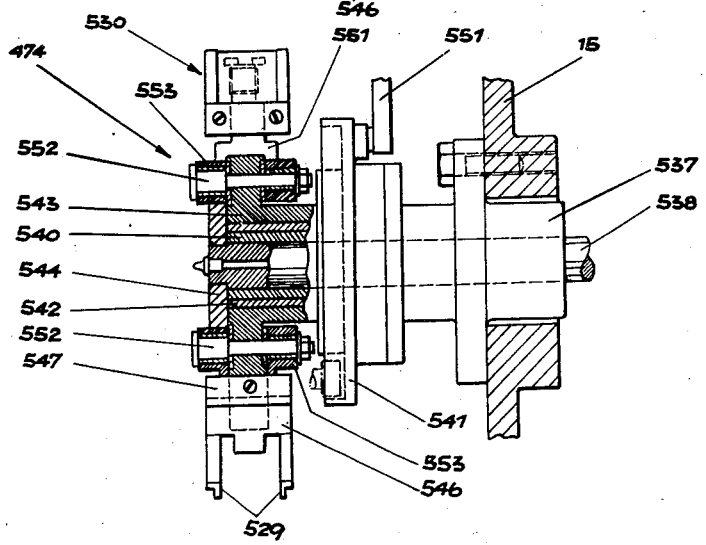
INVENTOR
Adolf G. F. Rambold
BY
Curtis, Morris + Safford
ATTORNEYS Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 41
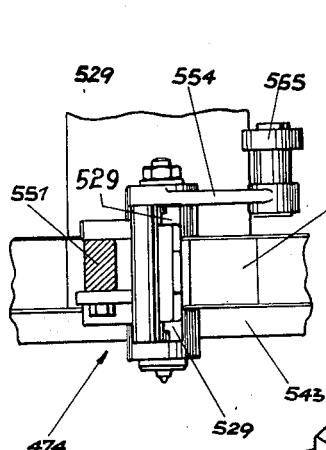
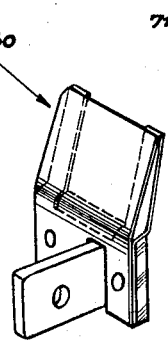
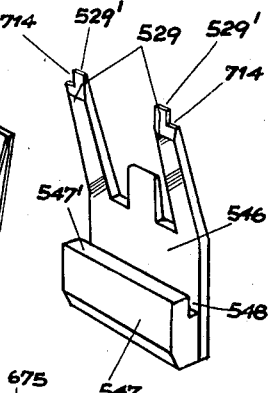
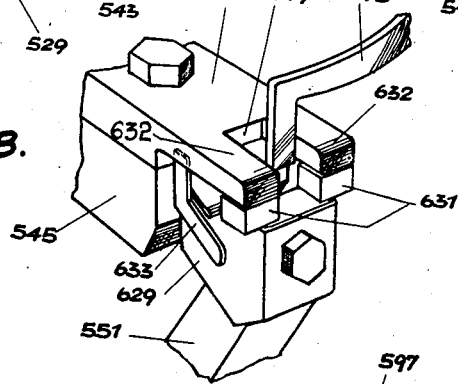
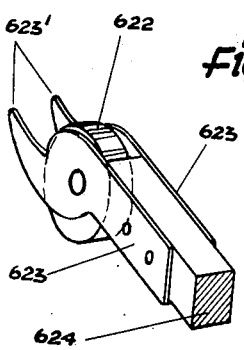
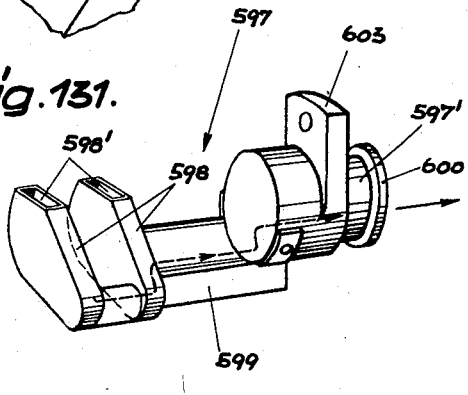
INVENTOR
Adolf G.F.Rambold
BY
Curtis, Morris + Safford
ATTORNEYS Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 42
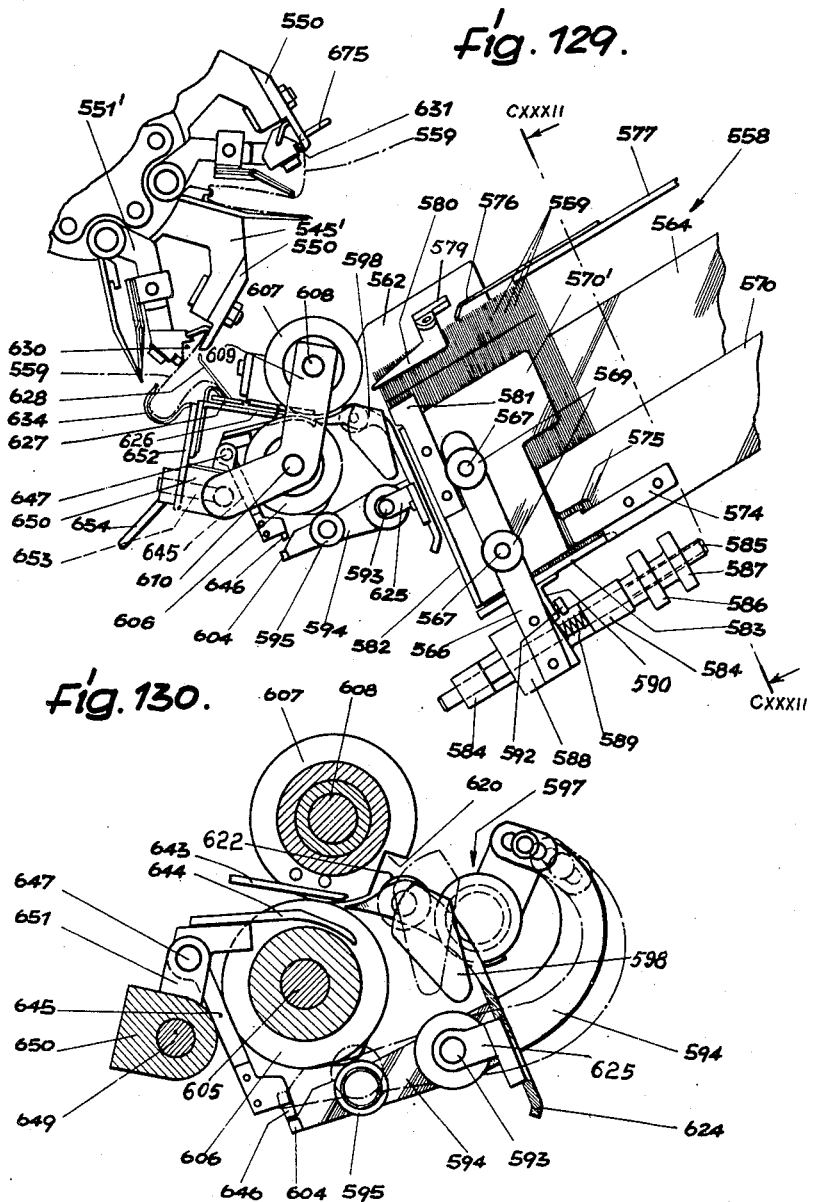
INVENTOR
Adolf G.F.Rambold
BY
Curtis, Morris + Safford
ATTORNEYS Feb. 18, 1958  A. G. F. RAMBOLD  2,823,502
METHOD AND MACHINE FOR MANUFACTURING, FILLING
AND CLOSING OF BAGS
Filed March 14, 1952   70 Sheets-Sheet 43
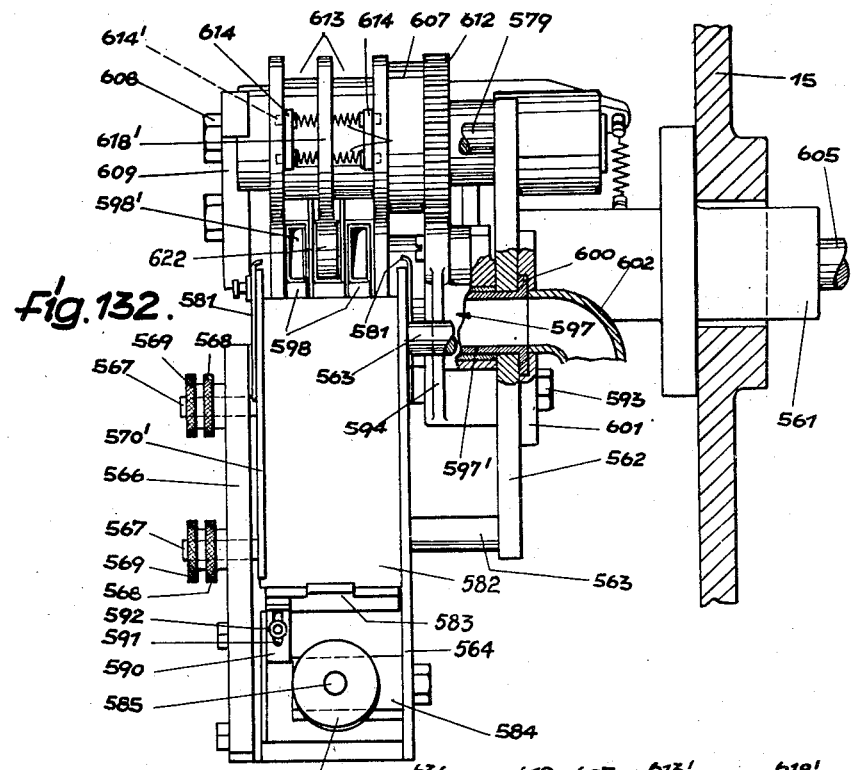
INVENTOR
Adolf G.F.Rambold
BY
Curtis, Morris + Safford
ATTORNEYS Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 44
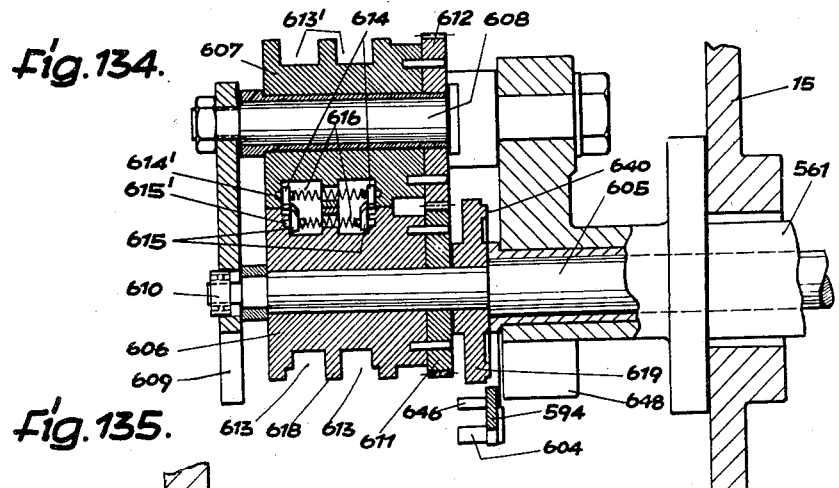
Fig. 134.
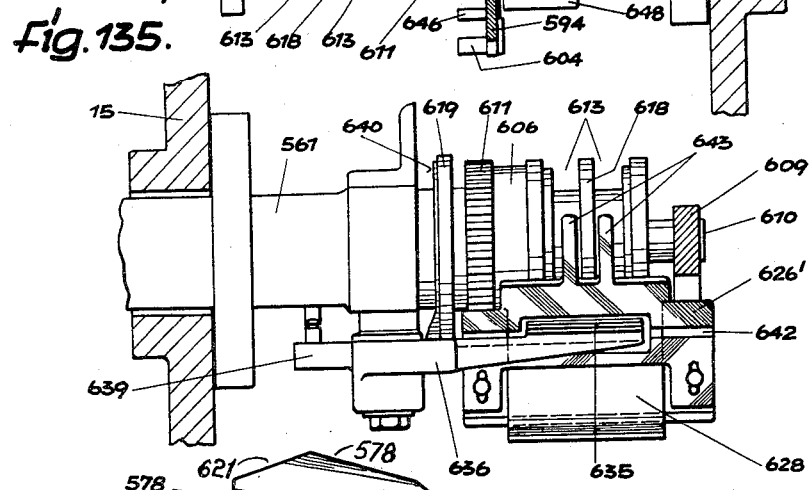
Fig. 135.
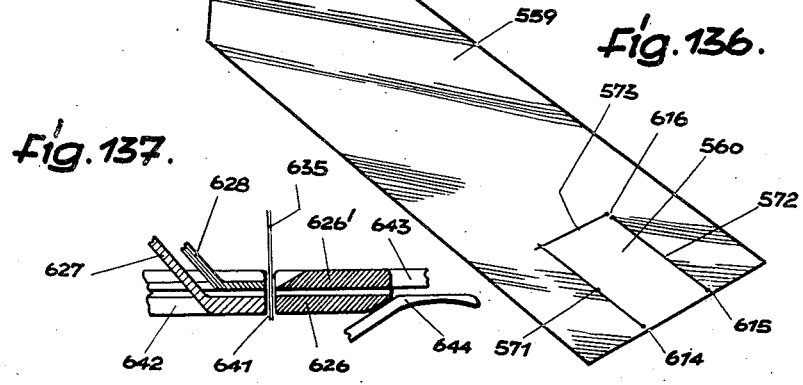
Fig. 136.
Fig. 137.
INVENTOR
Adolf G. F. Rambold
BY
Curtis, Morris + Safford
ATTORNEYS Feb. 18, 1958   A. G. F. RAMBOLD   2,823,502
METHOD AND MACHINE FOR MANUFACTURING, FILLING
AND CLOSING OF BAGS
Filed March 14, 1952   70 Sheets-Sheet 45
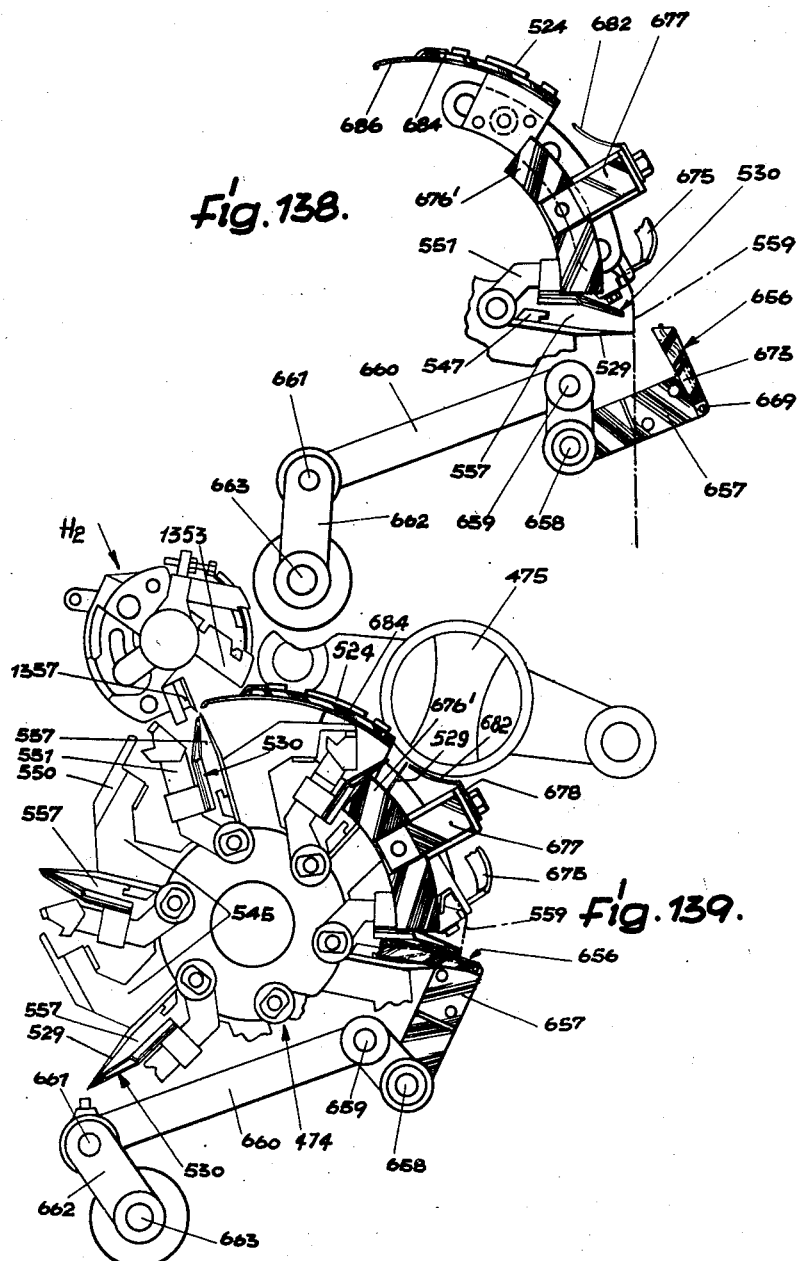
INVENTOR
Adolf G. F. Rambold
BY
Curtis, Morris + Safford
ATTORNEYS

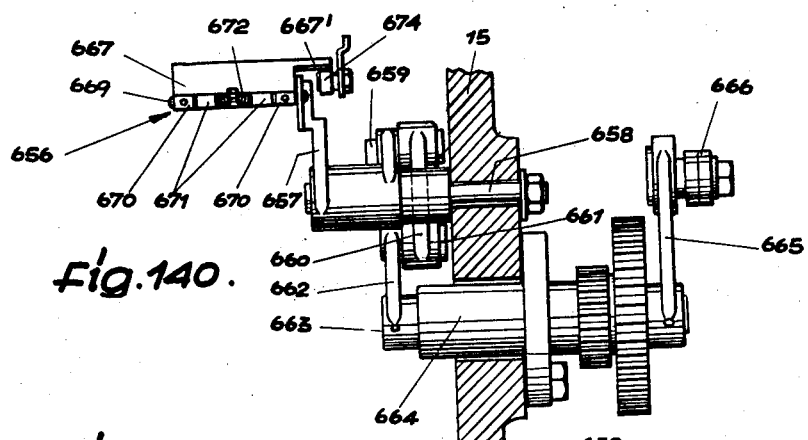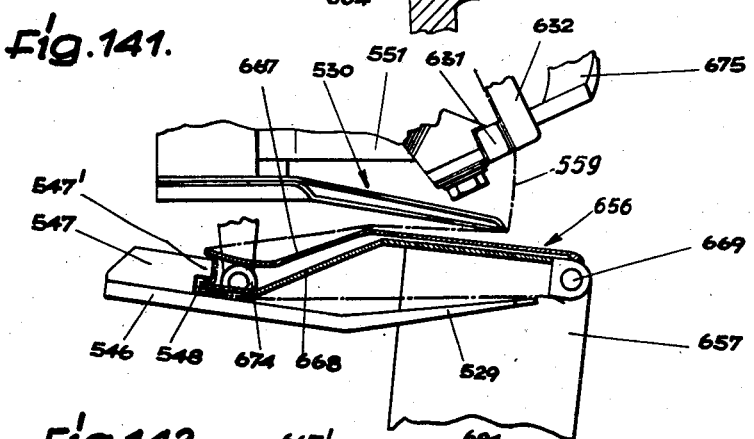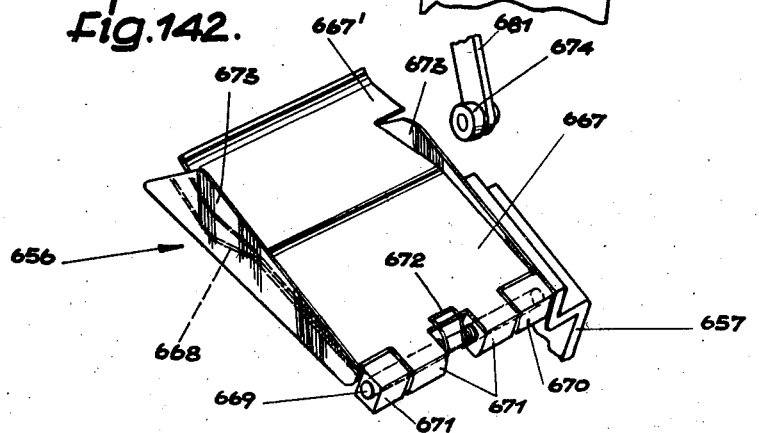

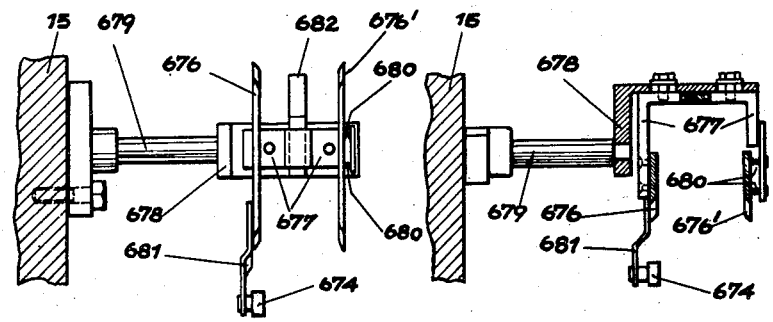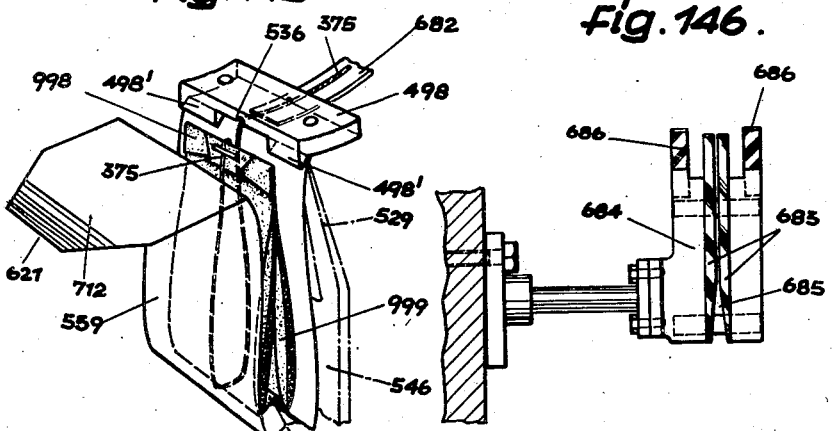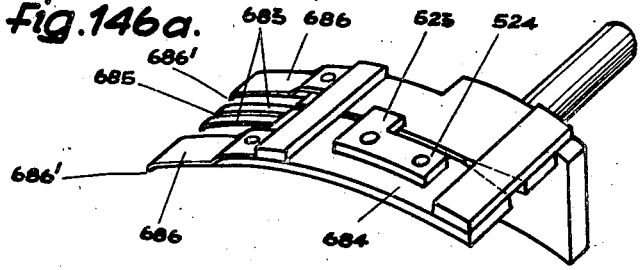

Feb. 18, 1958   A. G. F. RAMBOLD   2,823,502
METHOD AND MACHINE FOR MANUFACTURING, FILLING
AND CLOSING OF BAGS
Filed March 14, 1952   70 Sheets-Sheet 48
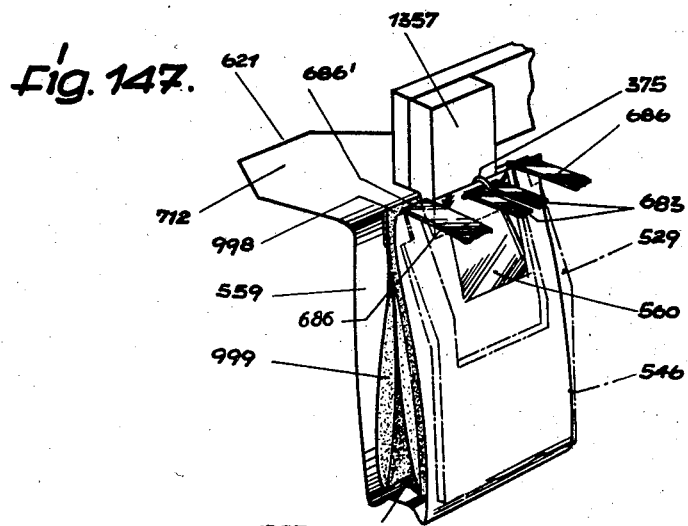
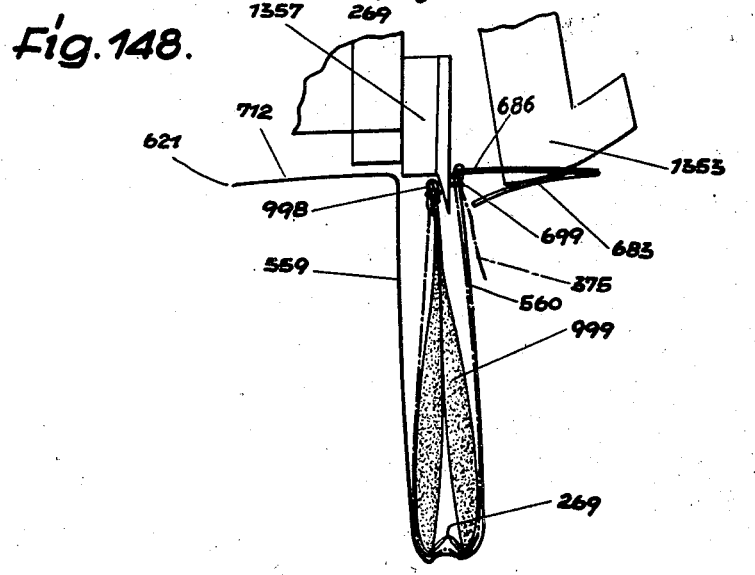
INVENTOR
Adolf G.F.Rambold
BY
Curtis, Morris + Safford
ATTORNEYS Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 49

INVENTOR
Adolf G. F. Rambold
BY
Curtis, Morris + Safford
ATTORNEYS

Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 50
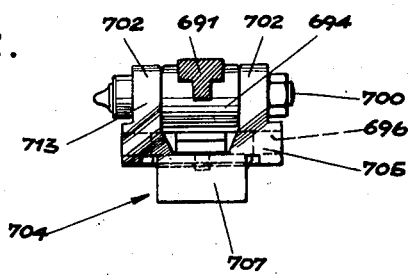
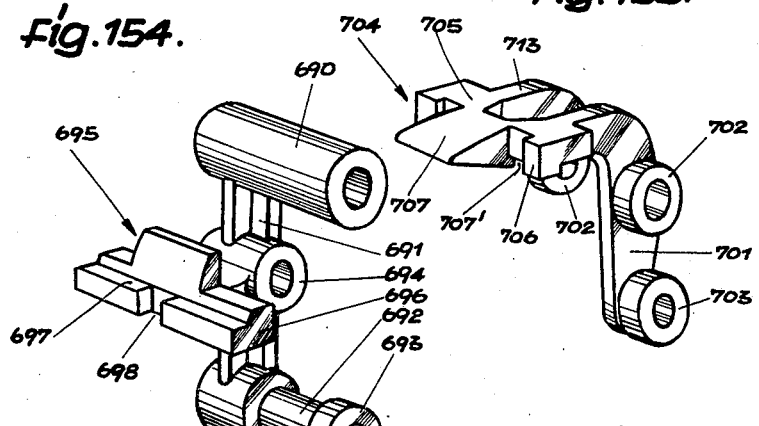
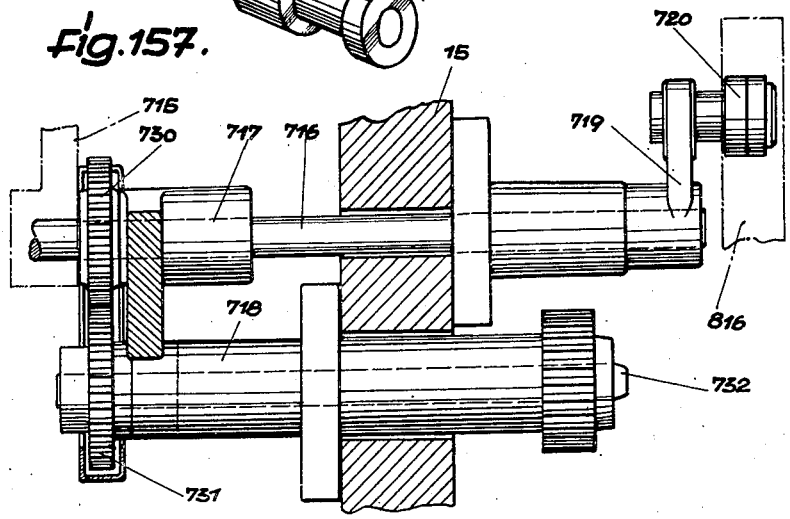
INVENTOR
Adolf G.F.Rambold
BY
Curtis, Morris + Safford
ATTORNEYS Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 51

INVENTOR
Adolf G.F.Rambold
BY
Curtis, Morris + Safford
ATTORNEYS

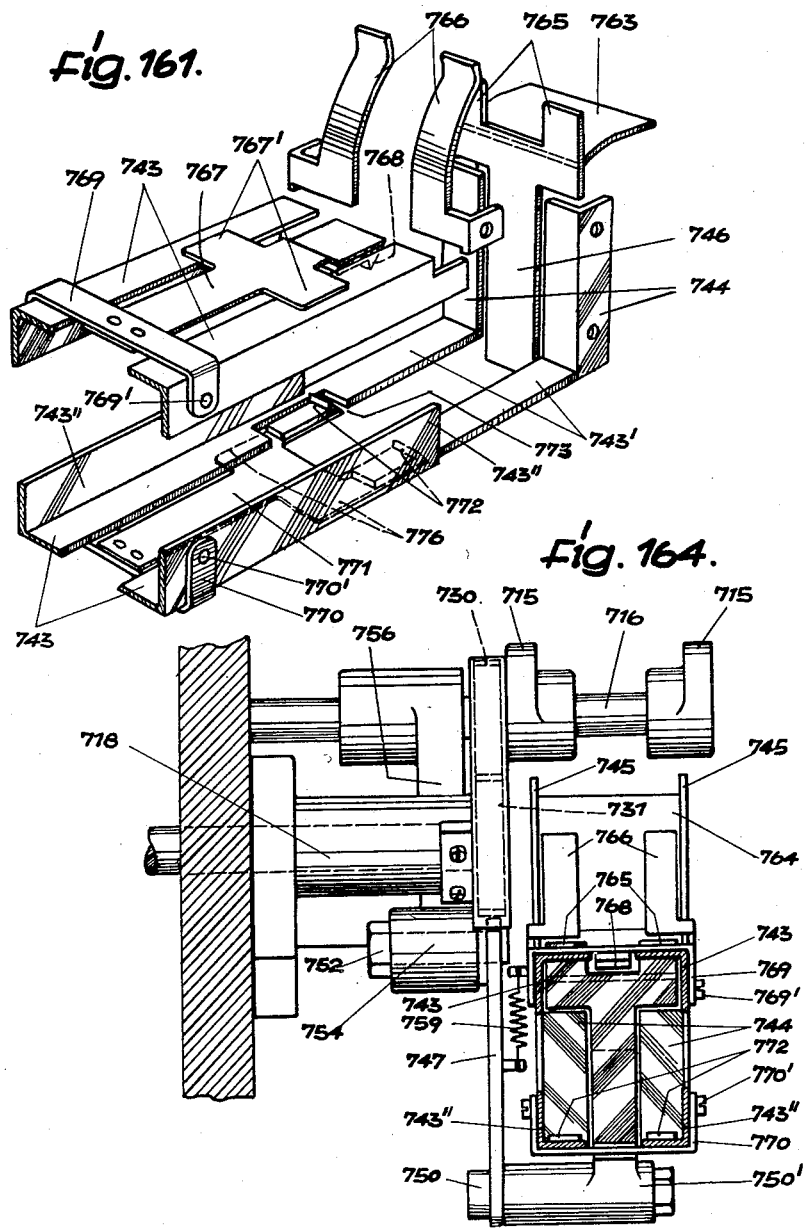

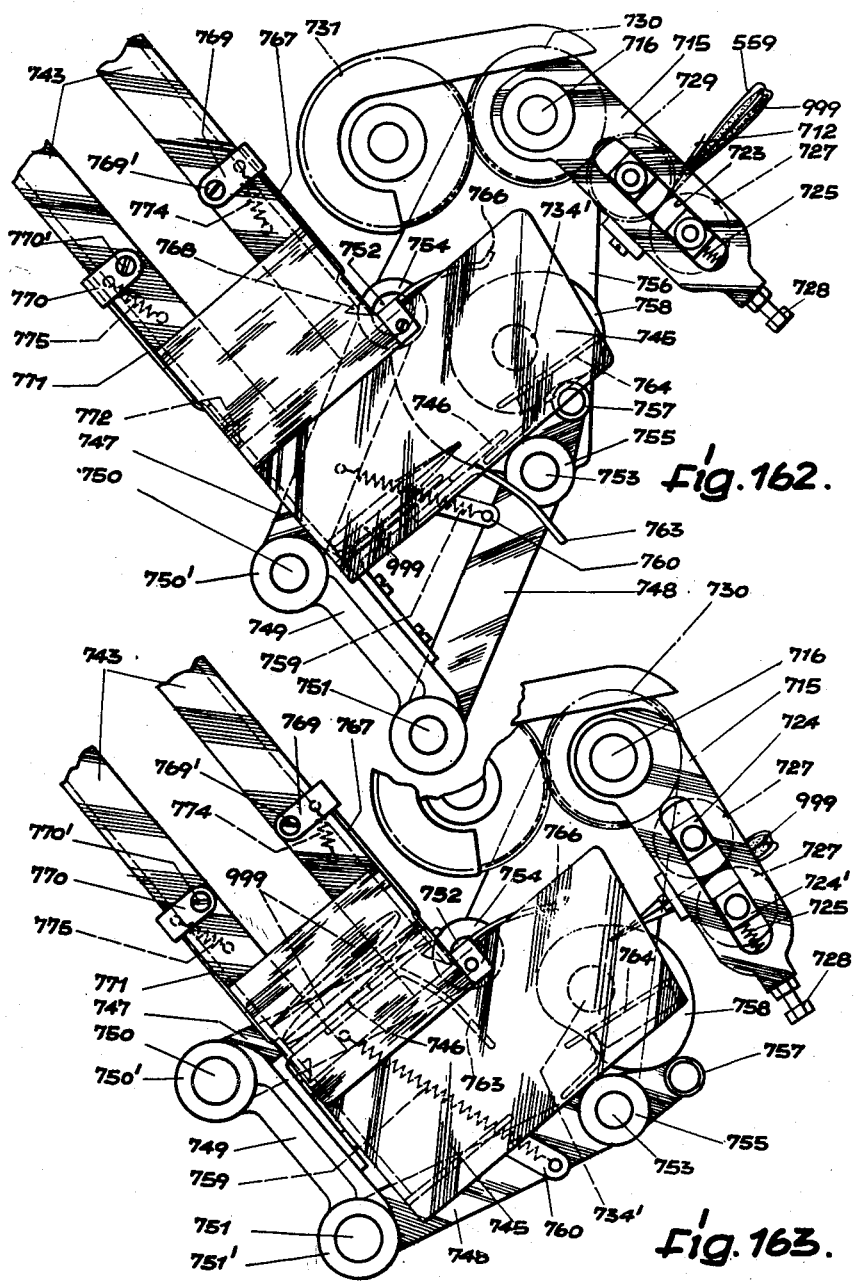

Feb. 18, 1958     A. G. F. RAMBOLD     2,823,502
METHOD AND MACHINE FOR MANUFACTURING, FILLING AND CLOSING OF BAGS
Filed March 14, 1952     70 Sheets-Sheet 55

INVENTOR
Adolf G. F. Rambold
BY
Curtis, Morris + Safford
ATTORNEYS

Feb. 18, 1958  A. G. F. RAMBOLD  2,823,502
METHOD AND MACHINE FOR MANUFACTURING, FILLING
AND CLOSING OF BAGS
Filed March 14, 1952  70 Sheets-Sheet 56

INVENTOR
Adolf G.F.Rambold
BY
Curtis, Morris + Safford
ATTORNEYS

Feb. 18, 1958     A. G. F. RAMBOLD     2,823,502
METHOD AND MACHINE FOR MANUFACTURING, FILLING
AND CLOSING OF BAGS
Filed March 14, 1952     70 Sheets-Sheet 57

INVENTOR
Adolf G. F. Rambold
BY
Curtis, Morris & Safford
ATTORNEYS

Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 59

INVENTOR
Adolf G. F. Rambold
BY
Curtis, Morris + Safford
ATTORNEYS

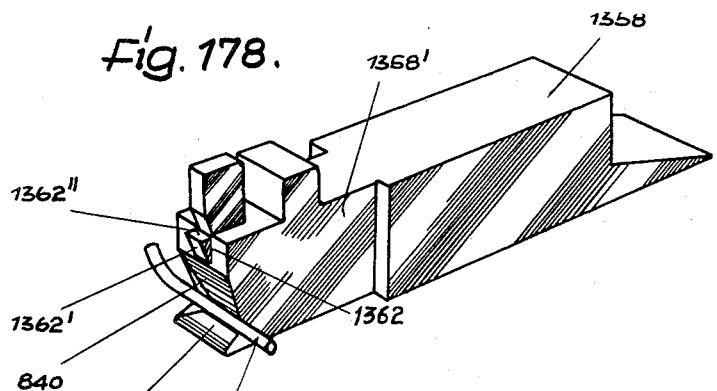
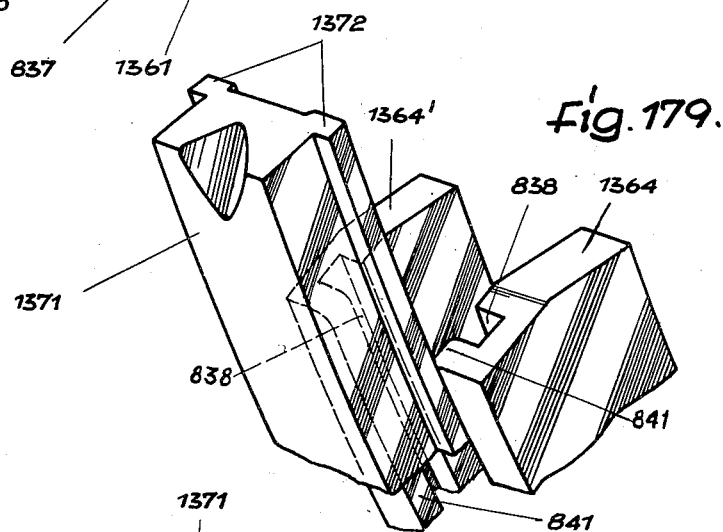
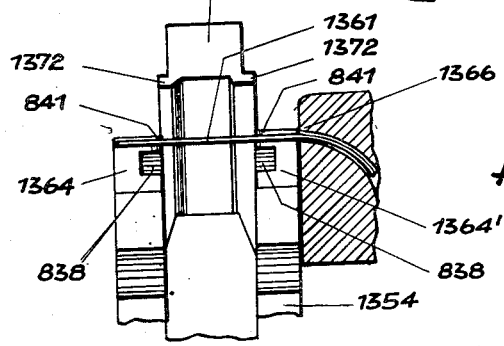

Feb. 18, 1958   A. G. F. RAMBOLD   2,823,502
METHOD AND MACHINE FOR MANUFACTURING, FILLING
AND CLOSING OF BAGS
Filed March 14, 1952   70 Sheets-Sheet 62
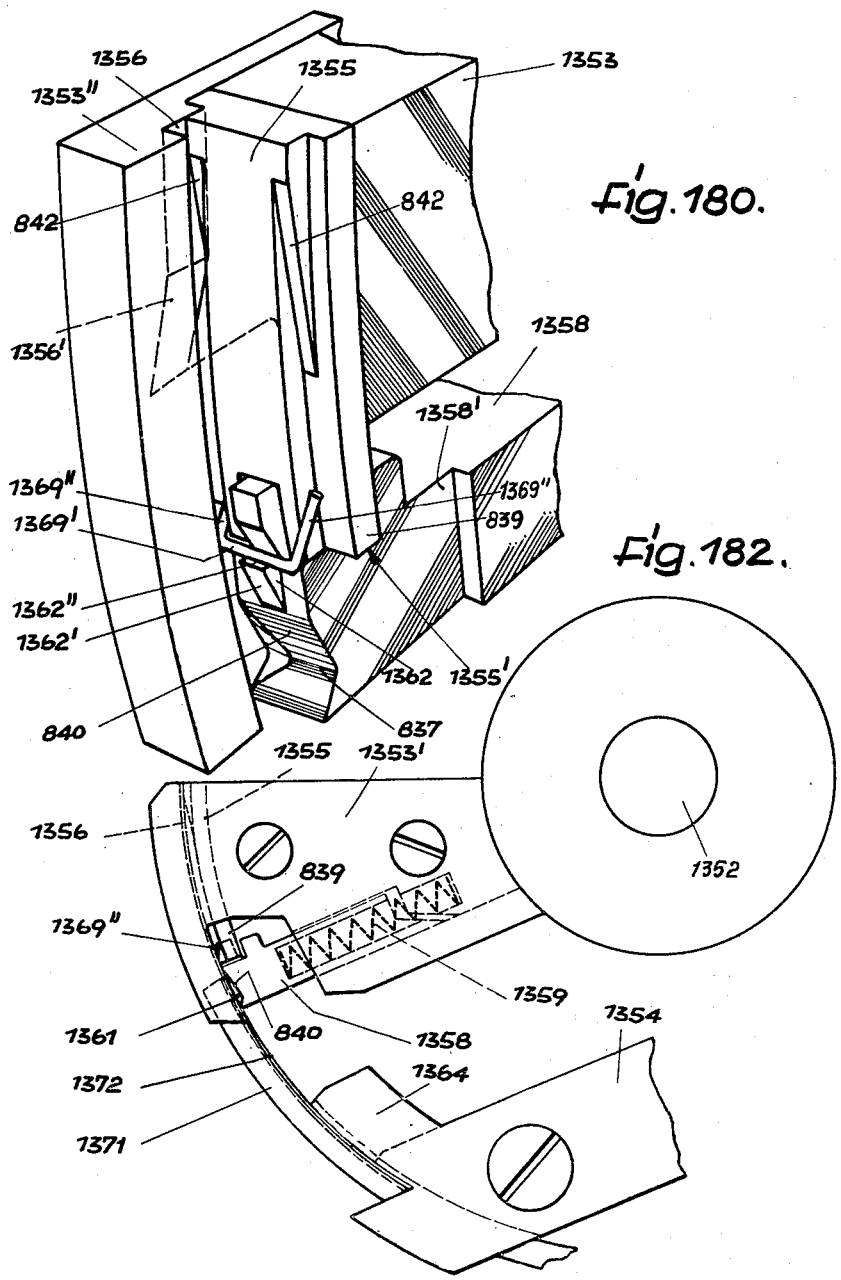
INVENTOR
Adolf G.F.Rambold
BY
Curtis, Morris + Safford
ATTORNEYS

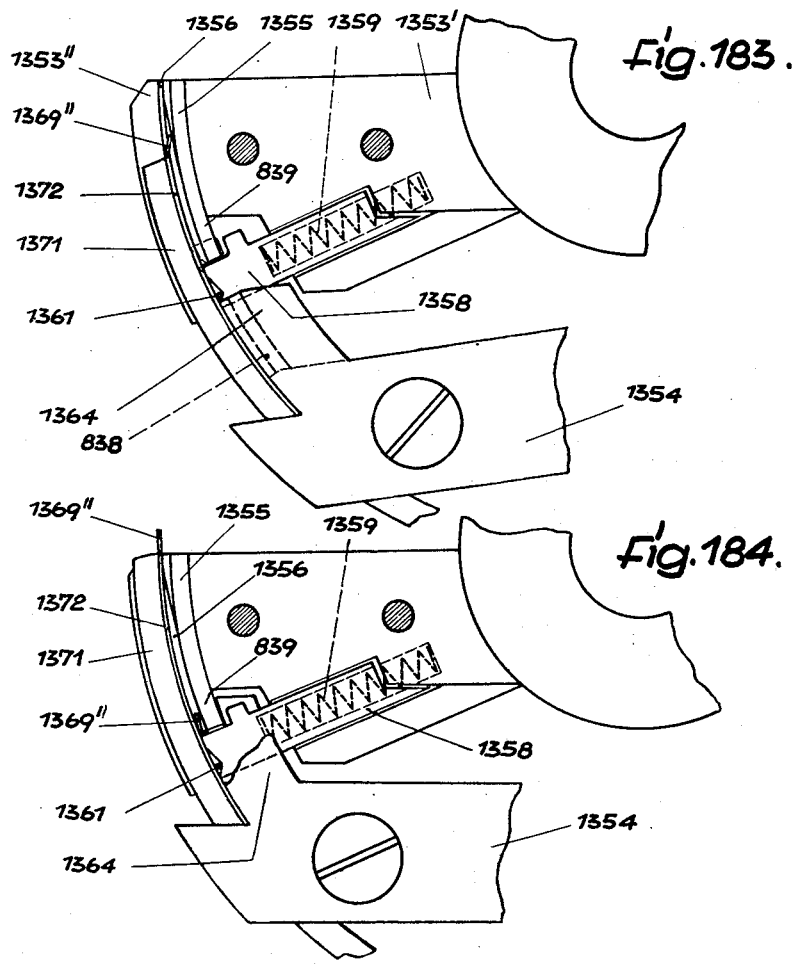
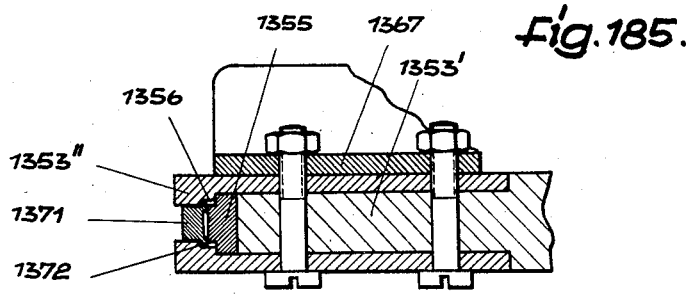

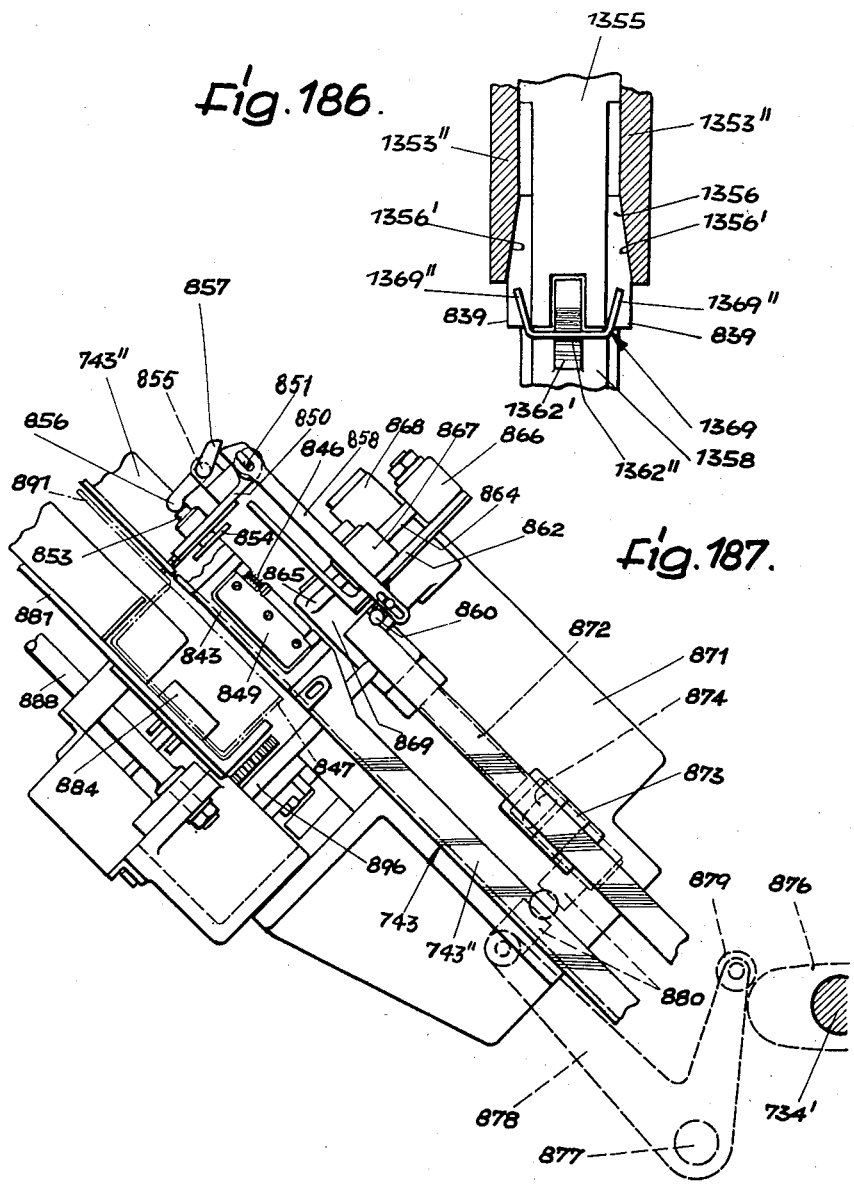

Feb. 18, 1958  A. G. F. RAMBOLD  2,823,502
METHOD AND MACHINE FOR MANUFACTURING, FILLING AND CLOSING OF BAGS
Filed March 14, 1952  70 Sheets-Sheet 65

INVENTOR
Adolf G. F. Rambold
BY
Curtis, Morris & Safford
ATTORNEYS

Feb. 18, 1958 A. G. F. RAMBOLD 2,823,502
METHOD AND MACHINE FOR MANUFACTURING, FILLING
AND CLOSING OF BAGS
Filed March 14, 1952 70 Sheets-Sheet 66
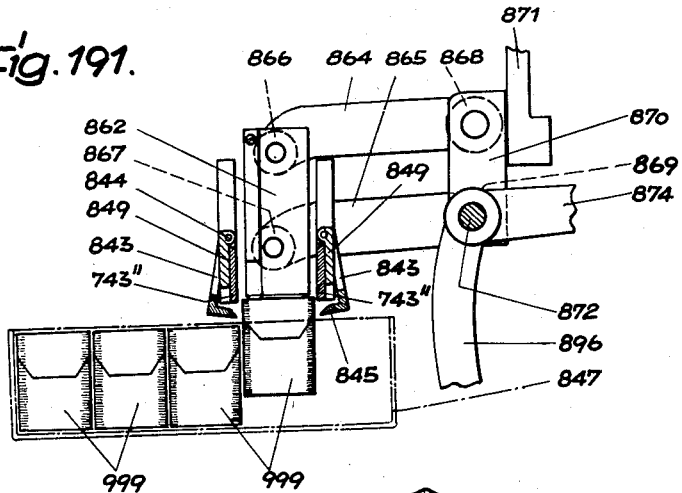
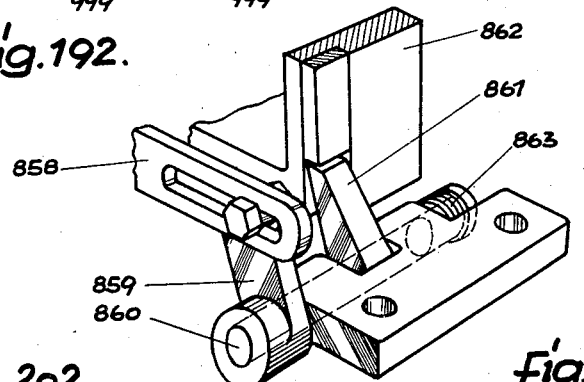
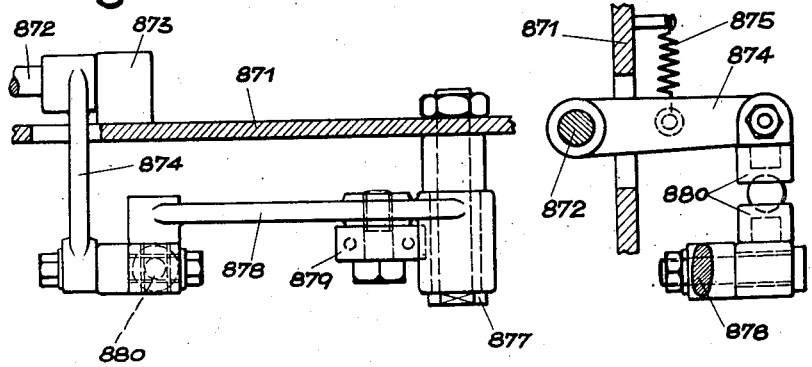

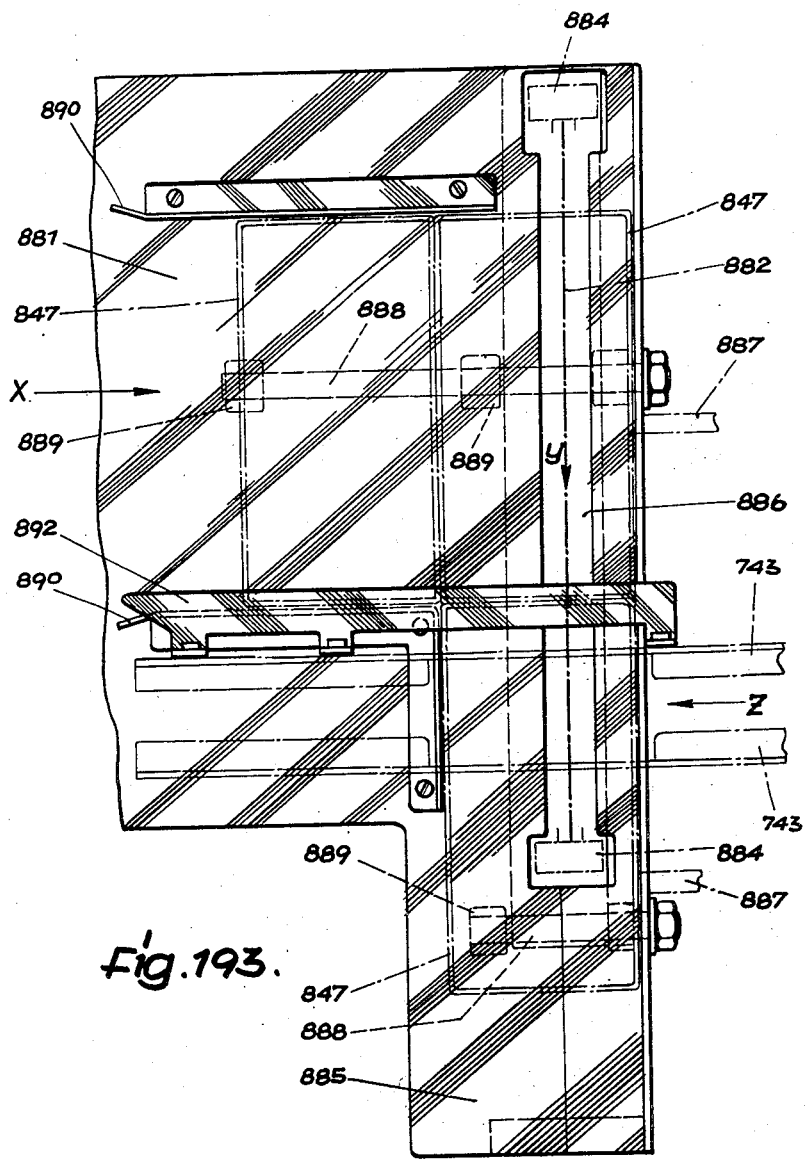

Feb. 18, 1958   A. G. F. RAMBOLD   2,823,502
METHOD AND MACHINE FOR MANUFACTURING, FILLING
AND CLOSING OF BAGS
Filed March 14, 1952   70 Sheets-Sheet 68
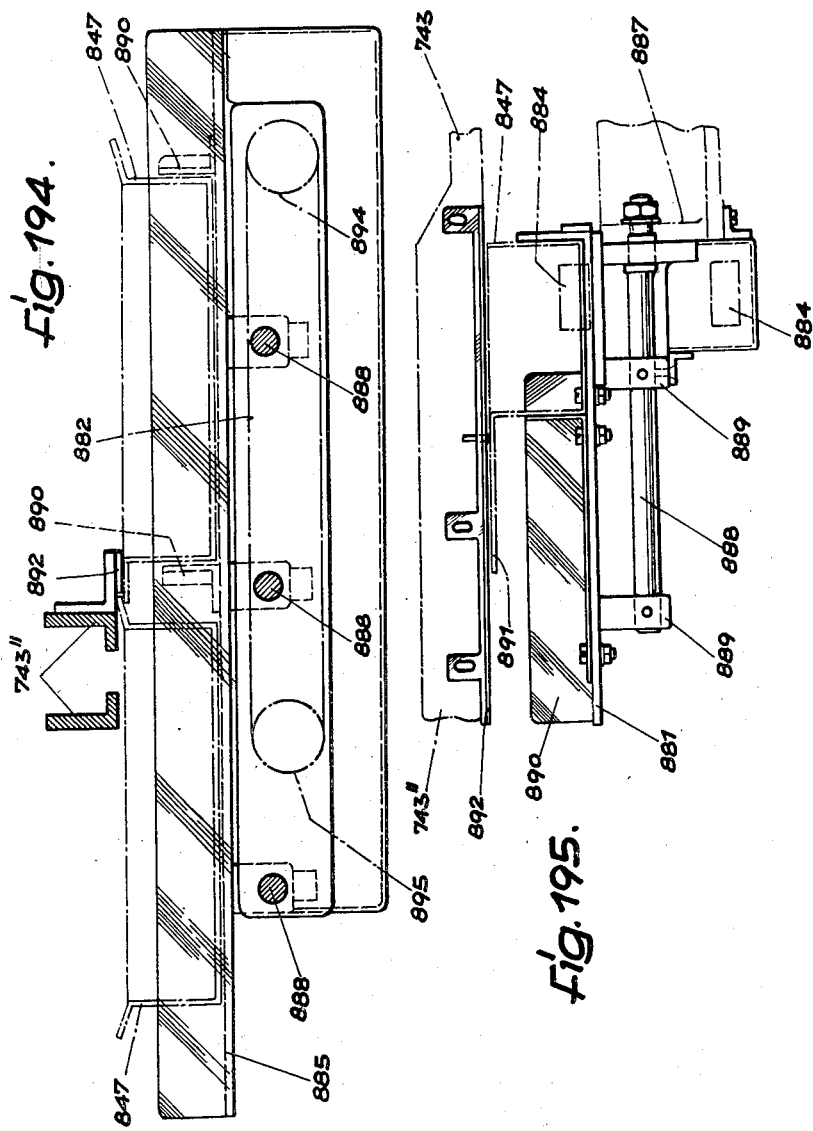
INVENTOR
Adolf G.F. Rambold
BY
Curtis, Morris + Safford
ATTORNEYS

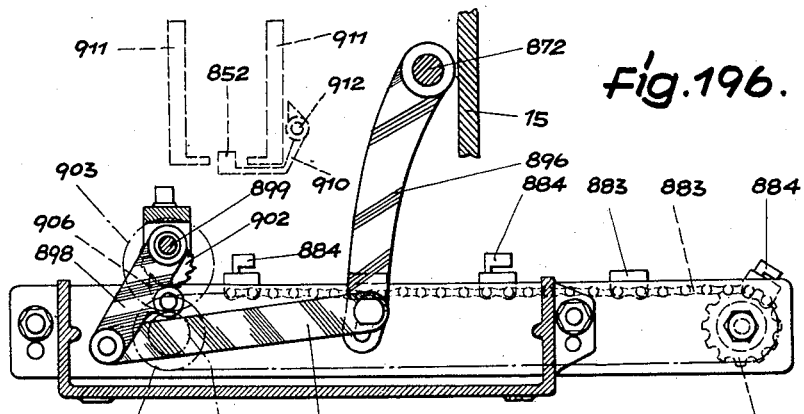
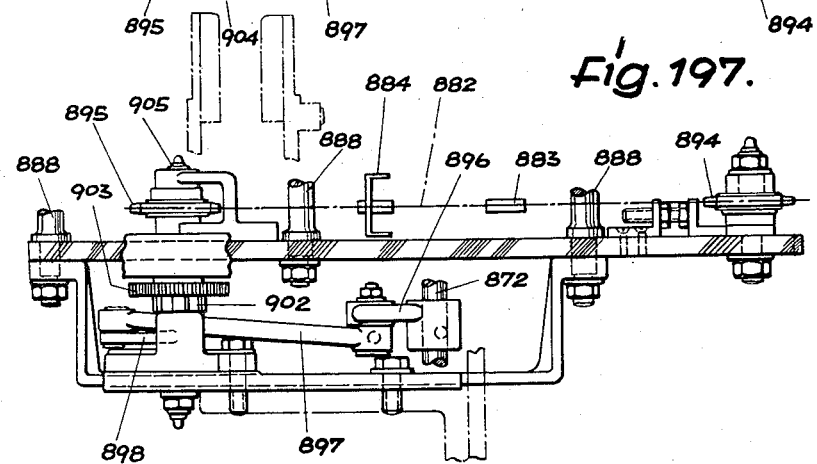
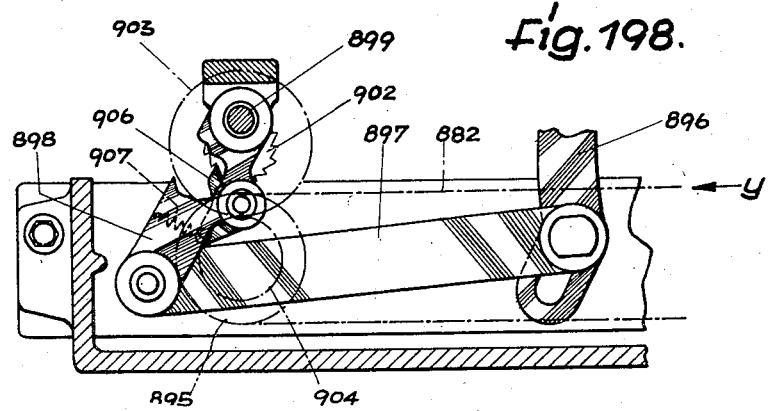

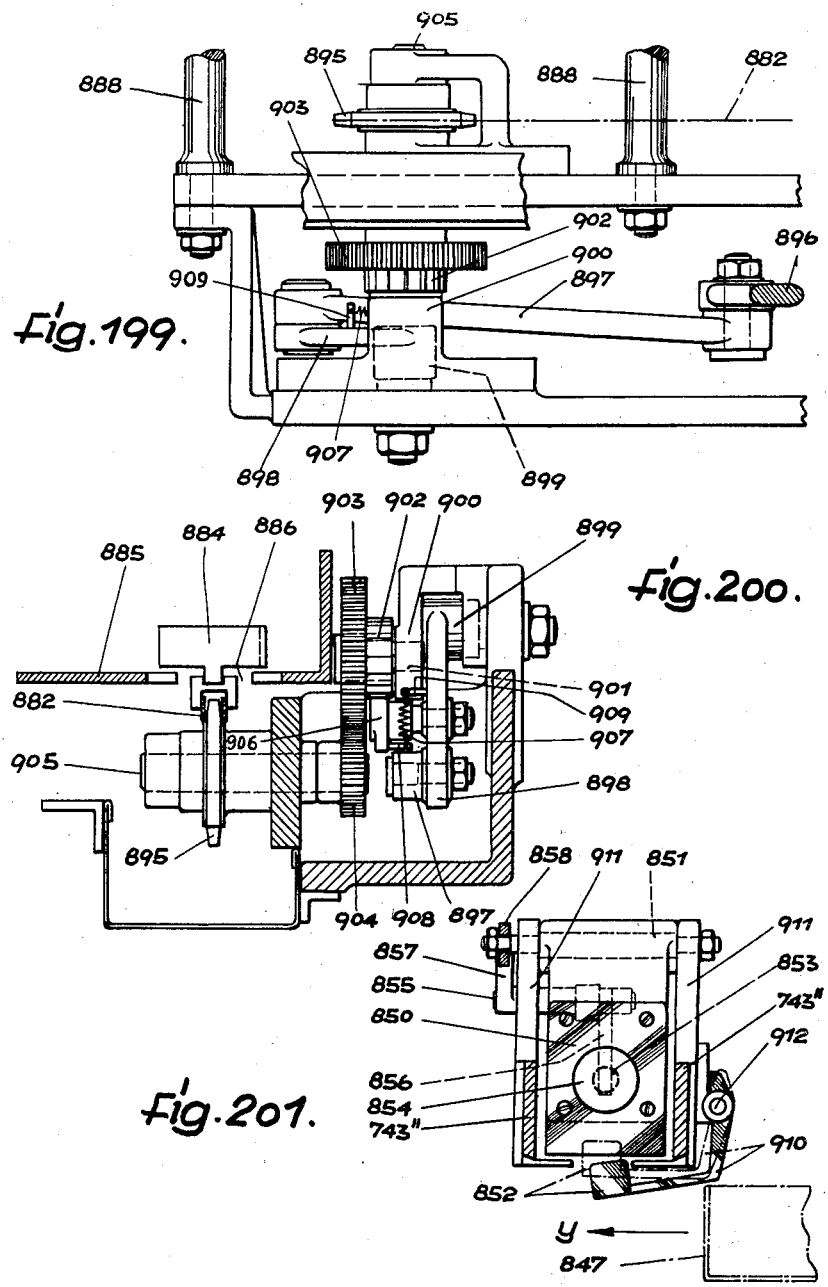

United States Patent Office 2,823,502
Patented Feb. 18, 1958

2,823,502

METHOD AND MACHINE FOR MANUFACTURING, FILLING, AND CLOSING OF BAGS

Adolf G. F. Rambold, Viersen, Germany

Application March 14, 1952, Serial No. 276,537

Claims priority, application Germany March 15, 1951

66 Claims. (Cl. 53—134)

This invention relates to a method and apparatus for manufacturing, filling and closing of bags. More particularly it may be said to relate to infusion bags for preparing a beverage such as tea, coffee, or the like, by suspending the bag containing the desired beverage in a hot infusion liquid, such as hot water. Such bags can be made from various materials, however, the present invention will be described as using a suitable paper which will allow the liquid to infuse sufficiently into the interior of the bag, without destroying the strength or firmness of the paper, but it is to be understood the invention is not limited to such a bag material.

A primary object of the invention is to provide a bag which can be maufactured by a high-speed machine with a minimum of bag material, while, however, meeting all requirements necessary in this type of bag for satisfactory extraction of the substance contained therein.

Accordingly the bag consists of two sections formed from a tubular strip of said paper material which is cut off from a flat, continuous tube made of said material which in turn is formed by overlapping and folding the edges of a continuous flat strip of paper. A measured quantity of the substance to be extracted is deposited in each of the two substance sections during the construction of the tubular strip, which includes the formation of a longitudinal fold through the center thereof. The bag is then made from the tubular strip by placing the substance sections side by side, in such a manner that the longitudinal folds of both sections are situated adjacent each other. The sections are connected and closed at the bottom by means of an integral fold or crease and at the other end by an overlapping piece in the form of a flap which produces in effect a one piece bag with two separate and distinct substance containing sections.

When the substance contained in the separate sections is soaked in the infusion liquid, causing the substance to swell within the sections, the connecting piece allows the sections to spread apart during this swelling, but only until the opposite longitudinal seams of the sections abut and thereby maintain each other in folded relationship, i. e., the connecting piece is of a length equal to the thickness of a section after the swelling.

This construction of a bag allows the infusion liquid to come through between the sections, which greatly improves the extraction of the substance contained in the sections.

Another object of the invention is to provide a method and machine such that the bag is provided with an envelope or wrapper which in turn is provided with a tag, the bag and the tag being connected by means of a string or thread in such a manner that after the tag has been torn off the envelope the uncovered bag hangs from the tag by the string.

Another object of the invention is to provide a method and machine such that the completed bags made thereby are stacked in such a way that they lie alternately reversed 180°, thereby compensating for the unequal thickness of the individual bags which lie side by side in one row, since the substance contained in the bags generally spreads more to the bottom of the section than to the top part thereof.

Furthermore, it is an object of the invention to provide a machine such that the stacked bags are counted by means of a scanning or pick-up device and packed in cartons which are fed to the machine in a suitable manner.

The method of manufacturing, filling and closing an infusion bag in accordance with the present invention includes the following steps:

Forming a longitudinal channel in a constantly forward moving band or strip of paper or other suitable material; placing uniform quantities of the substance to be extracted at equal intervals in said channel, subsequently folding the longitudinal edges of the band to form a continuous tube containing the applied quantities of said substance; flattening said tube between the quantities of said substance so that two substance filled sections are separated from each other by one of these flattened tubular sections; cutting every other flattened tubular section transversely to give tubular pieces containing two substance filled sections which are connected by an intermediate piece; joining together and closing the open ends of this tubular piece by laying the sections side by side and overlapping and folding the ends of said tubular piece.

In the preferred embodiment, in accordance with the present invention, the intermediate flattened tubular section between two substance quantities comprises in each case three equally spaced transverse folds, and the joining of the open ends of the tubular piece, i. e., the placing of the substance-filled sections side by side, takes place in such a manner that the parts of the longitudinal seam of the two sections formed by the folded longitudinal edges of the band lie opposite each other and the intermediate tubular section is formed into an accordion fold, as described above, between the two substance-filled sections.

The closing of the bag is accomplished by folding the open ends of the tubular piece and placing a staple therein. The staple is positioned so that it clamps the longitudinal seam part of the tubular piece and simultaneously fastens one end of a string to the bag.

From a wrapper made of suitable material, i. e., paper, a label is punched out in such a manner that it is still connected with the wrapper at a few points. Each bag is enclosed in such a wrapper by inserting it in the prefolded wrapper which is provided with an open flap on one side. The part of the wrapper which constitutes the label is connected to the free end of the string by means of a staple after the string has been laid around the bag on insertion in the envelope.

The device for the production, filling and closing of infusion bags in accordance with the present invention includes, in combination with the necessary framework, an attachment for feeding from a roll a narrow strip of material, out of which the bags are to be made; means for forming said strip into a channel, i. e., means for arching the strip of material; means for feeding and dosing of the filling substance for depositing equal quantities of this substance in spaced relationship on the strip of material which is formed as a channel; means for forming a tube from the preformed strip of material which is provided periodically with the dosages of the substance, including means for forming a longitudinal seam by folding together the longitudinal edges of this strip; means for the intermittent pickup of the tube at points at which no substance is present and for the forming of the intermediate piece in such a way that the picked up section of the tube is made into an incomplete form of a bag with two sections; means for the cutting off of a piece of the tube containing two dosages of the substance, shortly after the intermittent pickup means has caught the tube; means for putting the substance sections of the bag side by side; and means for catching the folded double section bags before the intermittent pickup means has released the bag; means for conveying the bag; and means for closing the bag, as well as for stacking the bags.

The machine can further be complemented in such a manner that it includes means for feeding and prefolding of the wrappers; means for inserting the bag into the prefolded wrapper; means for connecting each wrapper with the corresponding bag and means for the stapling of the bag.

The invention further relates to the constructing of the machine so as to provide means for producing and filling a tubularly shaped incomplete form of a bag with two sections, each containing the same quantity of substance and separated from each other by an intermediate piece; means for placing side by side the two sections and picking up and conveying of the incomplete form of the bag, means synchronizing the operation of these means with an intermittently rotating conveyor wheel, around which the means for closing of the bag are arranged; means for transmitting the completed bag to a second intermittently rotating conveyor wheel, about which are arranged further means for the holding of the bag and for the feeding and prefolding of wrappers, as well as means for the closing of the wrappers; and means for transmitting of the bags from the second conveyor wheel to a stacking device for the bags.

Furthermore, the machine is equipped to attach a string while closing the bag, to draw the string to a fixed length and to them cut off the string. When transferring the completed bag to the second intermittently rotating conveyor wheel, additional means are provided to lay the string around the outside of a bag section. On the second conveyor wheel these means for holding of the bags and wrappers also lay the string around the outside of the other bag sections. About the second conveyor wheel are arranged the means for conveying and prefolding of the wrappers and forming of a label for the wrappers, as well as the means for closing of the wrappers, and for simultaneously fastening the free end of the string of each bag to the label of the wrapper around the bag.

It is preferred that the machine be equipped in such a manner that the means for the intermittent pickup of the tube, at the points at which no substance is present, are arranged so that they form three equally spaced transverse folds in the intermediate piece between two dosages of the substance and then close them into one fold. By this intermediate piece the picked up section of the tube is made into an incomplete form of a bag with two sections. Furthermore, means have been provided whereby both sections of the bag are laid side by side in such a manner that the longitudinal seam parts of both sections are lying adjacent each other and the intermediate piece forms a fold between the sections.

The accompanying drawings show an illustrative embodiment of the infusion bag and machine and of their different parts drawn to various scales.

Figure 3 is a plan view taken on line III—III of Figure 2 showing the paper supply feeding device;

Figure 4 is a top plan view of the dosing and tube forming mechanisms;

Figure 11 is a top plan view of the tube forming pattern and pickup fingers;

Figure 12 is a side elevational view of Figure 11;

Figure 12a is a detailed perspective view of the grooved ends of the pickup fingers of Figures 11 and 12;

Figure 13 is a side view of the tube forming pattern blank;

Figure 14 is a sectional view taken on line XIV—XIV of Figure 2;

Figure 17 is an exploded perspective view of the mechanism for forming the first part of the longitudinal fold;

Figure 18 is a sectional view of the folding apparatus of Figure 17 in the assembled and closed position;

Figure 19 is a perspective view of the partially formed fold;

Figure 20 is a perspective view of the second step in the forming of the longitudinal fold;

Figure 21 is an exploded perspective view of the apparatus for performing the second step in the folding operation;

Figure 22 is a sectional view of the assembled apparatus of Figure 21 in the closed position;

Figure 23 is a sectional view taken on line XXIII—XXIII of Figure 30;

Figure 24 is a view similar to Figures 19 and 20 of the completed longitudinal fold;

Figure 25 is a view similar to Figures 17 and 21 of the apparatus for forming the completed fold;

Figure 26 is a sectional view of the apparatus of Figure 25 assembled in the final fold position;

Figure 27 is a side view of the operating mechanism for the first and second folding blades shown in the unoperated position;

Figure 28 is a view similar to Figure 27 showing the device in the operated position;

Figure 29 is a side view of the final stages of the tube forming and feeding apparatus;

Figure 29a is a partial side view of the drive sequence for the fold forming wheels;

Figure 30 is a top plan view of the apparatus of Figure 29;

Figure 30a is a top plan view corresponding to Figure 29;

Figure 30b is a perspective view of the driving cam and connecting arm for the cutting device of Figures 33 and 37;

Figure 31 is a partial end view of the knurling wheels 175 and 176 of Figure 29;

Figure 32 is a sectional view of the knurling wheels 175 and 176;

Figure 32a is a schematic illustration of the paper strip with the spaced dosages therein showing the relative dimensions of the various segments;

Figures 33 and 34 are side views of the tube cutting device in its initial and final positions respectively;

Figure 35 is an end view of the device of Figure 33;

Figure 36 is a sectional view taken on a line XXXVI—XXXVI of Figure 35;

Figure 37 is an exploded perspective view of the cutting device assembly of Figures 33 and 34;

Figure 38 is a side view of the first conveyor wheel and its associated bag forming devices showing their relative positions and the sequence of operation;

Figure 42 is a detailed top plan view of the conveyor arm control assembly;

Figure 43 is an exploded perspective view of the bottom fold forming plate assembly;

Figure 44 is a side view in partial section showing the fold forming plates in operative position;

Figure 45 is a perspective view of the fold forming assembly in the unoperated position;

Figure 46 is a view similar to Figure 45 showing the apparatus in the operated position;

Figure 47 is a top plan view of the fold forming mechanism and the drive thereof;

Figure 48 is a partial sectional view taken on line XLVIII—XLVIII of Figure 46;

Figure 49 is a partial side view of the fold forming apparatus in operated position;

Figure 50 is a side view of the fold forming apparatus and the drive linkage therefor;

Figure 51 is a perspective view of a partially formed bag;

Figure 52 is a partial side view of the first bag forming and folding device showing the severed tube segment in the initial position prior to folding;

Figure 53 is a view similar to Figure 52 showing the severed tube segment in the partially folded position;

Figure 54 is a top plan view of the bag guiding arms of Figure 53;

Figure 55 is a side view similar to Figure 52 showing the bag being withdrawn after completion of the first folding operation;

Figure 56 is a partial end view of the device of Figure 52 showing part of the driving connection therefor;

Figure 60 is a plan view parallel to the axis of the device of Figure 58 taken from the right side thereof;

Figure 61 is a detailed sectional view of the cam drive of eye 300 of Figure 58;

Figure 62 is a partial side view of the device of Figure 58 showing the cam control surfaces for the fold pressing device;

Figure 63 is a perspective view of the lever 299 of Figure 58;

Figure 68 is a side view similar to that of Figure 58 of the second sealing-fold forming device;

Figure 69 is an enlarged perspective view of the sealing-fold forming plates of Figure 68;

Figure 70 is a partial sectional side view similar to Figure 59 of the second sealing-fold forming device;

Figure 71 is a perspective view of the fold positioning arm of Figures 58 and 68;

Figures 72 through 74 are side views of the staple forming and driving mechanism in the initial, intermediate, and final stages respectively;

Figure 75 is a top plan view of the device of Figure 72;

Figure 76 is a broken away sectional view of Figure 73;

Figure 77 is a partial sectional view showing the device in a stage intermediate that of Figures 73 and 74;

Figure 78 is a detailed partial sectional view of the lower staple driving portion in the final position of Figure 74;

Figure 85 is a side view of the wire feeding mechanism for the device of Figures 72–74;

Figure 86 is a bottom plan view of the anvil pivoting lever and cam for the device of Figures 72–74;

Figure 87 is a partial sectional side view taken from the opposite side from that of Figures 72–74 showing the wire feeding device and controls therefor;

Figure 88 is a top plan view of Figure 87;

Figure 91 is a side view partially broken away showing the interconnection between the wire feeding device and the first fold forming device;

Figure 92 is an end view of the device of Figure 91;

Figure 93 is a side view of the lower portion of Figure 91 showing the side opposite from that shown in Figure 91;

Figures 98 and 99 are fragmentary views of the feeler arm of the sealing-fold forming device for the wire feeding interlock mechanism of Figure 91, showing the sequence of operation when no bag is present in the fold forming device;

Figure 100 shows the final step in the operation of the feeling arm of Figures 98 and 99 and its effect on the wire feeding device;

Figure 103 is an end view of the thread guiding device of Figure 101;

Figure 104 is an enlarged detailed side view of the thread guiding device of Figure 101;

Figure 105 is a detailed perspective view of the thread engaging arm of the thread guiding device of Figure 101;

Figure 106 is a side view of the thread cutting device;

Figure 107 is a partially broken away side view of the cutting device taken from the opposite side from that of Figure 106;

Figure 107a is a partially broken away side view of the cutting device of Figure 106;

Figure 108 is an exploded perspective view of the thread clamping and guiding means associated with the thread cutting device of Figure 106;

Figure 108a is an end view of the device of Figure 106;

Figure 109 is a side view of the bag transferring wheel for transferring the bags from the first to the second conveyor wheel, showing the associated bag engaging arms and tongs in the unoperated position;

Figure 110 is a view similar to Figure 109, showing the arms and tongs in operated position;

Figure 111 is a bottom plan view of the assembly of Figure 109;

Figure 116 is a sectional view of the transfer wheel showing bags positioned in the transfer compartments;

Figure 117 is a partial side view of the bag engaging tongs showing the tongs in closed position;

Figure 118 is a fragmentary perspective view of the tongs projecting through the bag chamber side wall to engage the bag sealing fold;

Figure 118a is a perspective view of the bag receiving forks which are positioned in the bag chambers of the transfer wheel;

Figure 123 is a side elevation of the second conveyor wheel;

Figure 124 is a sectional view of the second conveyor wheel together with its mounting;

Figure 125 is a sectional view of the cam drive for the arm 551;

Figures 126 and 127 are perspective views of the fingers of the second conveyor wheel which form the cavity for the reception of the bag envelope;

Figure 128 is a detailed view of the clamping assembly on the second conveyor wheel for the envelope flap;

Figure 129 is a detailed elevational view of the envelope blank stacking and feeding device;

Figures 130 and 131 are detailed sectional and perspective views, respectively, of the pickup feed for the device of Figure 129;

Figure 132 is a sectional view taken along line CXXXII—CXXXII of Figure 129;

Figure 133 is an elevation of the exit side of the envelope blank drive rolls;

Figure 134 is a sectional view through the axes of the drive rolls 606 and 607 of Figure 129;

Figure 135 is a top plan view of the drive rolls of Figure 129;

Figure 136 is a perspective view of an envelope blank, showing the tag portion partially severed therefrom;

Figure 137 is a detailed sectional view of the guide for the envelope blank;

Figures 138 and 139 are partial side elevational views of the second conveyor wheel, showing the envelope blank inserting mechanism and the positions of the transfer wheel and second stapling device;

Figure 140 is an end view of the drive for the envelope inserting finger assembly 656 of Figures 138 and 139;

Figure 141 is a detailed sectional view of the fingers 656 inserted in the envelope cavity of the second conveyor wheel;

Figure 142 is a perspective view of the finger assembly 656 of Figure 141;

Figures 143 and 144 are a plan and sectional view respectively of the spring guide 682 and assembly therefor;

Figures 145 and 147 are perspective views of a bag within its envelope as it engages the matrix of the tag stapling device;

Figure 146 is a plan view of the spring guide for the thread attached to the bag;

Figure 146a is a perspective view of the spring guide assembly for the string and envelope;

Figure 148 is a side elevation of the bag and tag stapling dies;

Figure 152 is a sectional view taken on line CLII—CLII of Figure 150;

Figures 153 and 154 are exploded views of the envelope flap closing device;

Figure 157 is a plan view of the cam drive control for the drive of Figure 156;

Figure 161 is a perspective view of the bag rack;

Figures 162 and 163 are detailed side elevational views of the knurling wheels of the transfer device and an alternative bag reversing mechanism for the completed bags;

Figure 164 is a sectional view taken on the line CLXIV—CLXIV of Figure 162;

Figure 178 is a detailed perspective view of the male wire forming die;

Figure 179 is an exploded perspective view of the driving die for inserting the staple;

Figure 180 is an assembled perspective view similar to that of Figure 177 showing the device one step further advanced in its operation;

Figure 181 is a top plan view of the wire forming and staple driving dies;

Figure 182 is an enlarged partial elevational view of the stapling device at the beginning of the staple driving stroke;

Figure 183 is a view similar to Figure 182, showing a more advanced position of the driving operation;

Figure 184 is a view similar to Figure 183, showing the dies in their final position after driving of the staple;

Figure 185 is a horizontal sectional view of the staple guides;

Figure 186 is a vertical sectional view of the correcting guides in the staple channel of the first conveyor stapling device;

Figure 187 is an elevational view parallel to the bag rack showing the carton filling mechanism and a portion of its associated drive;

Figure 191 is a view similar to Figure 190 showing the slider in its operated position;

Figure 192 is a detailed perspective view of the locking arrangement and control for the slider 862 of Figure 187;

Figure 193 is a top plan view of the bag and carton feed and conveyor systems showing their relative positions and direction of travel;

Figure 194 is a partial sectional view taken parallel to the direction of feed Y of Figure 193;

Figure 195 is an elevational view taken parallel to the direction Z of Figure 193;

Figure 196 is a partially broken away view of the drive of the Y direction carton conveyor of Figure 193;

Figure 197 is a top plan view of the apparatus of Figure 196;

Figure 198 is an enlarged detailed view of the drive portion of Figure 196;

Figure 199 is a top plan view of the apparatus of Figure 198;

Figure 200 is an end view partially cut away of Figure 199;

Figure 201 is a detailed end view of the catch and release for the end plate of the bag counting and depositing mechanism of Figure 188;

Figure 202 is a top plan view of the connecting linkages for the return drive of the slider 862 of Figure 187;

Figure 203 is a detailed view of the spring biased mounting of one of the drive levers for slider 862.

*Means for feeding of a strip of material*

Figure 1:
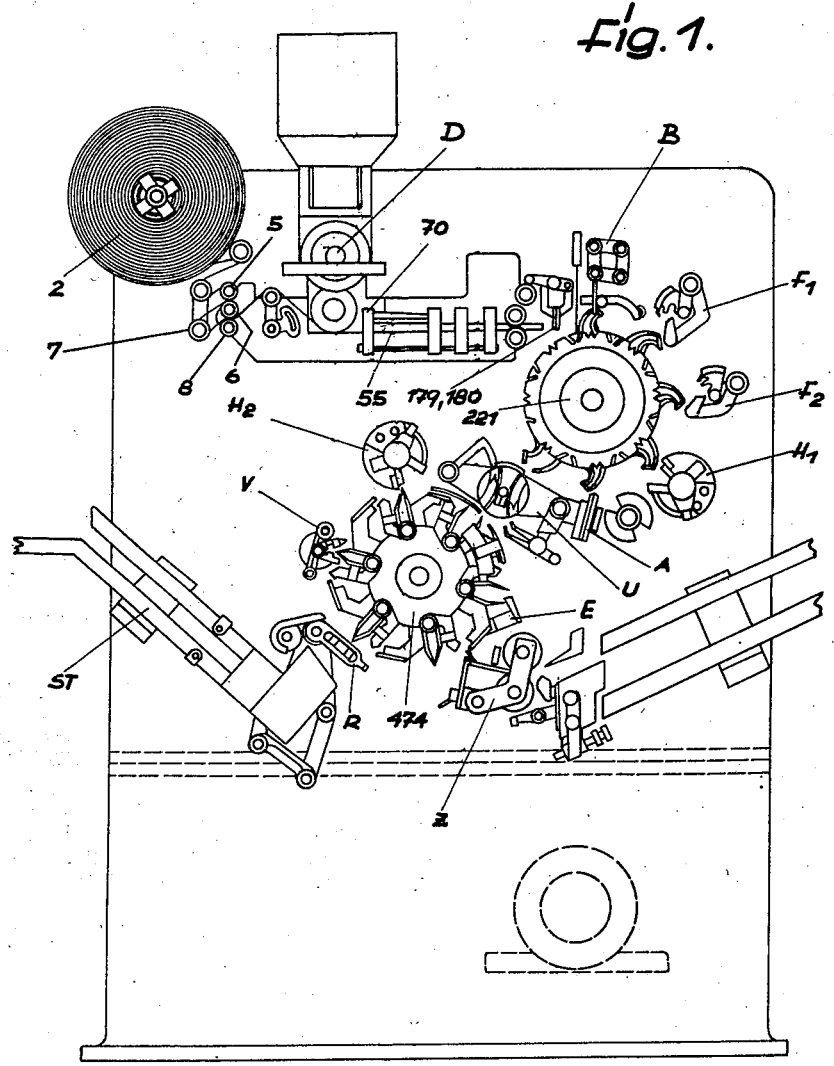
Figure 1 is an overall schematic view showing the relative positions of the various elements of the machine, together with the general layout thereof.
Figure 2:
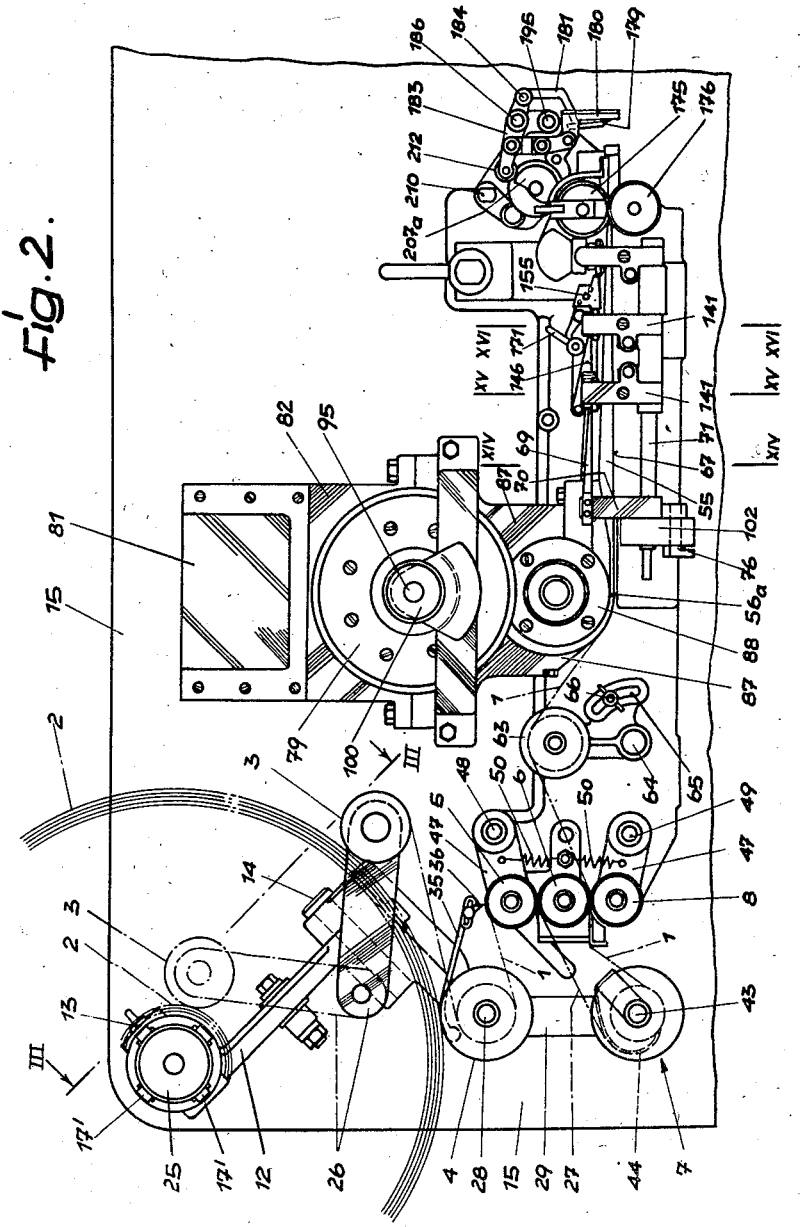
Figure 2 is a slightly more detailed elevational view of the strip feeding and dosing portion.

The means for feeding the strip of material 1 comprises a bobbin 2 with adjustable spindle from which the strip of material 1 is drawn by two drawgears. From the bobbin 2 the strip 1 next runs over a guide disc 3 which is fixed to the mounting of the machine by means of a bracket 26 and is arranged to pivot in such a manner that it always rests on the bobbin 2 and approaches the spindle with decrease of diameter of the bobbin (Figures 1 and 2). From this guide disc 3 which, through the pull of the strip 1, is pressed automatically against the bobbin, the strip runs in a loop about hub 33 of guiding disc 4 to the first drawgear which consists of two feed rolls 5 and 6. The strip 1 partially winds around one of the feed rolls 5, then runs in a further loop over a shuttle 7 to the second drawgear which consists of the feed roll 6, already mentioned, and a third feed roll 8. The drawgear 5 and 6 draws the strip 1 off the bobbin 2 and the drawgear 6 and 8 carries the strip further. The guide disc 3 is provided with opposed strip contacting surfaces converging towards the axis.

The purpose of the shuttle 7 is to allow the strip, after leaving the drawgear 5 and 6 and before entering into the drawgear 6 and 8 to be aligned in time. This arrangement is made in such a way that the drawgear 5 and 6 for a time does not feed the strip 1 and for a time feeds it faster than the drawgear 6 and 8. Consequently the loop 27 of the strip 1 provided between the two drawgears 5 and 6, and 6 and 8 respectively, becomes alternately longer and shorter. When the loop 27 is becoming longer, i. e. when the drawgear 5 and 6 feeds the strip 1, the shuttle 7 throws; when becoming shorter, i. e. when the drawgear 5 and 6 does not feed the strip 1, the shuttle strikes back again. The part of strip 1 which forms fold 27 is thereby aligned in time, as will be further explained below.

Figure 8:
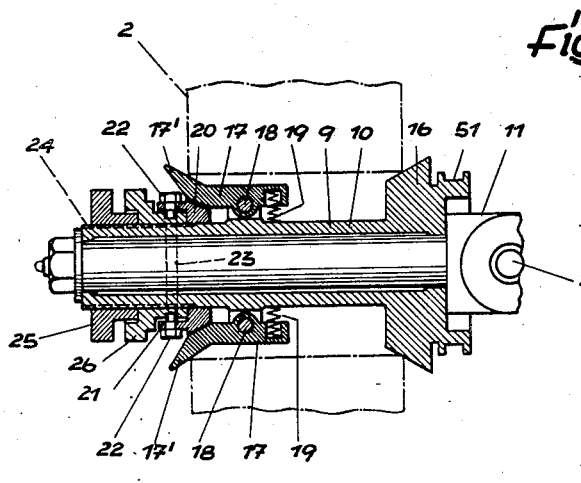
Figure 8 is a sectional view of the hub of the paper supply mounting.

In detail the arrangement is as follows: The bobbin 2 is situated on a sleeve 9 (shown in Figure 8) which is mounted on a pin 10. On the extension 11 of pin 10 (see Figure 3) are two levers 12, running parallel, and pivoted at one end about rodpins 13, in such a manner that the rodpins 13 stand at right angles to the pin 10 and the extension 11 of the pin. The other ends of levers 12 are pivoted to the frame of the machine 15 around rodpins 14 which are parallel with rodpins 13. These levers 12, together with extension 11 of pin 10 and the part of the frame 15, form together a joint parallelogram, so that bobbin 2 situated on sleeve 9 is adjustable in its axial direction. As a result of the peculiar nature of the joint parallelogram, a small displacement, parallel to the bobbin axle, takes place, but it is insignificant for present purposes.

At one end of sleeve 9, which carries bobbin 2 (see Figures 3 and 8) a truncated cone shaped disc 16 is coaxially attached; and at the other end of sleeve 9 radially disposed about it, two-armed levers 17 are located, having their axles 18 running tangentially to the sleeve 9. The ends 17' of levers 17 are pressed against a tapered ring 20 by spring 19 attached to the other ends of levers 17, which, on the one side rest against sleeve 9, and on the other side, against the two-armed levers 17. The surfaces of lever-ends 17' away from sleeve 9 are conically formed and attached, in reflected image, to the truncated cone shaped disc 16 of sleeve 9. One of the surfaces of lever 17 facing sleeve 9 also is conically formed and pressed against conical ring 20 by spring 19. This assembly is adjustable and lockable in axial direction on the sleeve 9 so that the diameter of the interrupted, conical disc formed by lever 17 can be changed in accordance with the diameter of bore of bobbin 2. The conical ring 20 which is adjustable in axial direction on sleeve 9, is provided with a circularly running collar 21 concentric to the axle of sleeve 9, on which are mounted inwardly projecting parts about the periphery, i. e. screws 22, which catch in an annular groove 23 of a collar on adjusting nut 26, which is axially adjustable on thread 24 provided on sleeve 9. A lock nut 25 is provided for locking the adjusting nut 26.

The sleeve 9 which carries the bobbin 2 is provided with a brake. For this purpose the truncated cone-shaped disc 16 is provided with a small brake drum 51 (Fig. 8) around which is placed, by means of an angle arm 53, a brake band 52 which is fixed to the extension 11 of the pin 10 (see Fig. 3). Adjustment is obtained at 54 by means of a screw cap so that sleeve 9 can be tightened and locked.

The arrangement which causes the strip 1 between the first drawgear 5 and 6 and the second drawgear 6 and 8 to form alternately a longer and shorter loop 27 (Figures 2, 5 and 6), functions in such a manner that the feed roll 5, which together with feed roll 6, pulls the strip 1 off the bobbin 2, is periodically removed from the center feed roll 6 so that periodically no strip 1 is pulled off the bobbin 2.

Figure 5:
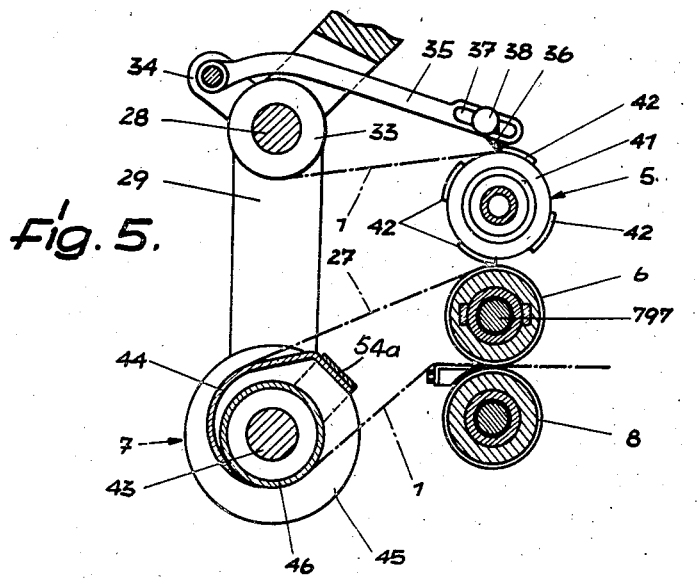
Figures 5 and 6 are vertical sections taken through the paper aligning device showing the shuttle in the "struck back" and "thrown" positions respectively.
Figure 6:
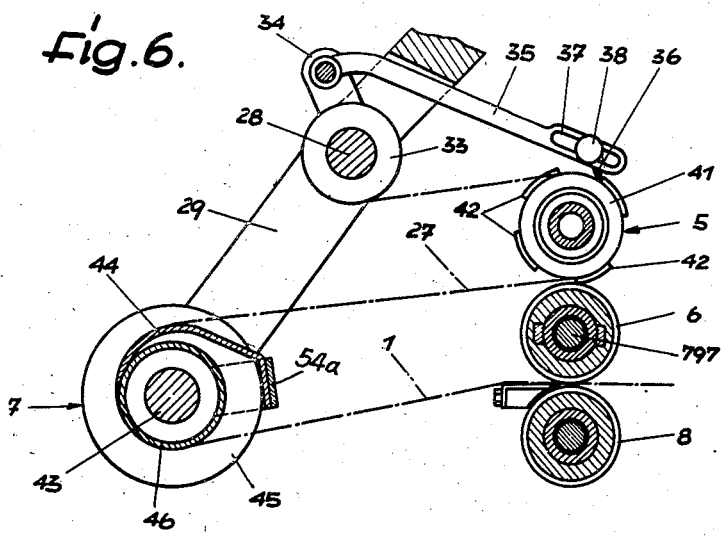
Figure 7:
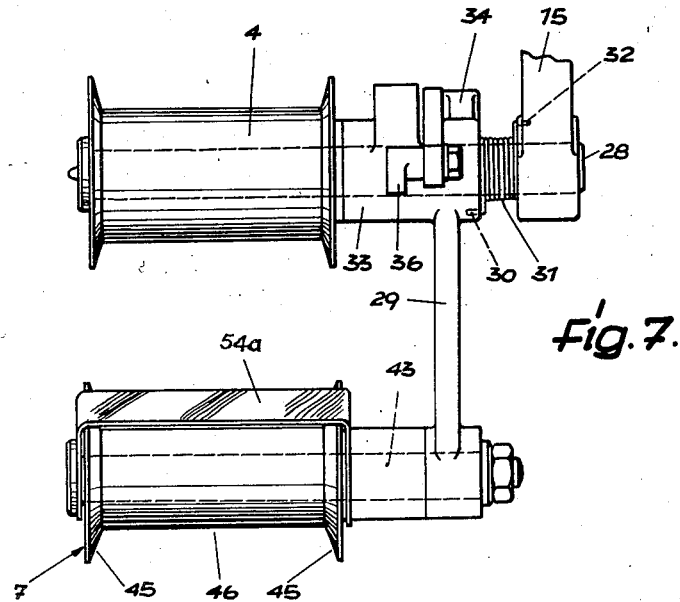
Figure 7 is an end view of the mounting for the shuttle.

Referring to Figures 5–7 the shuttle 7 is rotatably mounted on one end of an arbor 29, the other end of which is mounted on a shaft 28 attached to the frame of the machine. One end 30 of a torsion spring 31 mounted on the shaft 28 is attached to the end of arbor 29, and the other end 32 is attached to the framework of the machine 15.

The shuttle 7 is urged by the torsion spring 31 in such a manner that it seeks to throw, i. e. it seeks to draw out fold 27 of the strip 1.

A lever 34 (Fig. 5) is firmly connected to hub 33 of arbor 29 on shaft 28, and one end of lever 35 is connected thereto, while a pawl 36 is mounted on the other end of said second lever. Pawl 36, being mounted in a slit 37 of lever 35 by lock screw 38, is adjustable and lockable along lever 35. Located on the shaft 39 of feed roll 5 is a loosely rotating ring 41 (Fig. 4), provided with notches 40 with which pawl 36 functions to rotate feed roll 5 when the shuttle 7 reaches its longest throw. The slotted ring 41, furthermore, has peripheral segments 42 which, when it is being rotated, runs on feed roll 6, so that feed roll 5 is temporarily lifted off feed roll 6.

In Figure 5 the shuttle 7 is shown not thrown and a peripheral segment 42 of the slotted ring 41 is shown about to leave feed roll 6 which has lifted feed roll 5 therefrom, so that the drawgear 5 and 6 will again feed the strip 1 and throw the shuttle 7 under the action of the torsion spring.

Figure 6 shows the shuttle 7 thrown and fold 27 drawn out just after the slotted disk 41 has been moved by pawl 36 in such a manner that the next peripheral segment 42 will run on feed roll 6, in order to again interrupt the feeding of strip 1. During this interruption of the feed, shuttle 7 is returned against the action of the torsion spring 31 to the extent to which the drawgear 6 and 8 takes up the strip 1 and thereby shortens fold 27.

A guide 44 is attached to the shaft 43 of the shuttle 7 by means of a bracelet like clamp 54a (Figures 5-7). Preferably the guide should be made of sheet metal. The guide is stationary and fixed about the rotating shuttle 7. The guide is, in essence, a spirally curved track, overlying a part of the shuttle between the truncated cone-shaped discs 45 (Fig. 7) and extending with decreasing radius in the direction of feed of strip 1 from adjacent the outer diameter of the truncated cone-shaped discs to the casing 46 of the shuttle 7.

The feed rolls 5 and 8 are pivotally connected to the machine framework 15 by means of arbors 47 mounted on shafts 48 and 49 respectively and are drawn against the central feed roll 6 by tension spring 50 (see Fig. 2).

*Channel and tube forming*

Figure 10:
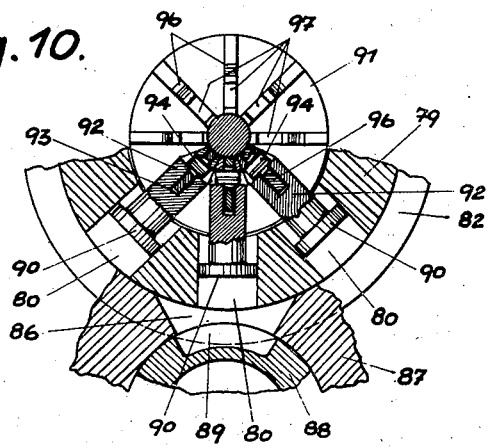
Figure 10 is a partial section taken through the dosing wheel at right angles to the axis thereof.

Strip 1 is made into a tube by folding the longitudinal edges of this strip, the final steps of which are shown in Fig. 24. The tube is made on a form 55 which is made in the following manner: Figure 13 shows a thin truncated cone-shaped tube 55a from which the form 55 is cut. From a point 56 near one end 56a of the tube, a curved segment, limited by curve 57, is cut out from tube 55a towards end 56a, in such a manner that the curvature matches that of the bucket wheel 88 (Fig. 10) to be described later on. From another point 58 on the circumference of the tube 55a, the tube is cut on a straight line 59 towards the other end 58a, which cuts across the tube at point 58 and at all cross-sections between point 58 and the end of the tube 58a, representing chords of the tube, all of the chords running parallel to each other. Furthermore, the tube is completely cut through on a line 60 which starts at end 56a in the vicinity of curve 57 at 61 and ends at end 58a in the vicinity of the intersections of line 59 with the circumference of the tube 55a at 62. In Figure 13 the form is bound by the following points and lines: 56, 57, 61, 60, 62, 59, 58. The remaining parts of tube 55a are not used. Figure 12 shows a side view of the form, Figure 11 a top-plan view. Form 55a, as described above, forms an open bottom which becomes flatter in the direction of feed of the strip 1 and is cut out from above, in front and behind in such a manner that only that part of the vertex of the channel which lies between points 56 and 58 of Figure 13 is intact.

Following the pair of feed rolls 6 and 8 in the direction of feed of the strip 1, a guide-roller 63 for strip 1 is mounted for pivotal movement around pin 64 on the machine frame and is lockable by means of slit 65 and lock screw 66 (Fig. 2).

Beyond this guide-roller 63 is the apparatus for periodic feeding and dosing of the quantities of substance which are to be put on strip 1. This arrangement shows, among others, a bucket wheel 88 (Figures 9 and 10), contained in housing 87, the buckets of which 89 are emptied down onto strip 1. The strip 1 is carried below this housing 87 and about the bucket wheel 88. The guide-roller 63 causes strip 1 to run close to the bottom of the housing 87, which joins form 55 with end 56a under the lower vertex of the bucket wheel 88.

Strip 1 runs along form 55 with its central part about the bottom 67 formed by sectional plane 60. The parts of strip 1 overlying on both sides of bottom 67 are laid around form 55 to form a tube by the means described in the following paragraphs.

Figure 14 is a sectional view of the tube forming means at position XIV—XIV of Figure 2. One sees the form 55 in one section which lies between the points 56 and 58 in Figure 13. Strip 1 is carried along the bottom 67 of form 55 with the substance quantities 78 lying thereon at distances set off by the apparatus for feeding and dosing described above. On both sides of form 55, which is attached to housing 87 from above by means of bracket 68, guide fingers 69 are installed, which bring together at the proper moment the parts of strip 1 which overlie the bottom parts 67 of form 55 and thereby prepare the strip for the forming of the tube. Upon the initial feeding of strip 1, the overlying parts of strip 1 are fed by hand inside these fingers 69. In order to make this easier, the fingers 69 can be swung down towards the sides. This is done by attaching the fingers 69 to levers 70, each of which is fixed to a rocker shaft 71 situated parallel to the direction feed of strip 1. The levers 70 are formed as double-armed levers and have at the ends, which do not carry the fingers 69, projections 72 and 73 which can be regulated by an eccentric 74 which lies on a pin 75 mounted underneath rocker shafts 71 and which can be actuated by means of a hand lever 76. For fine adjustment of the fingers 69 there are provided longitudinally adjustable rods 77, which contact rod 101 fixed longitudinally below form 55. In the sectional drawing along line XIV—XIV the rocker shafts 71, pin 75 and rod 101 are fixed in a plate 102, which is attached to the machine frame by means of an arbor 103. The fingers 69 are so adjusted that they converge in the direction of feed of strip 1 (see Fig. 11). Moreover, at their adjacent ends the fingers are provided with a groove 734 and a ridge 735, between which the parts of strip 1 that overlie the bottom parts 67 of form 55 can be easily clamped (Fig. 12a).

Figure 15:
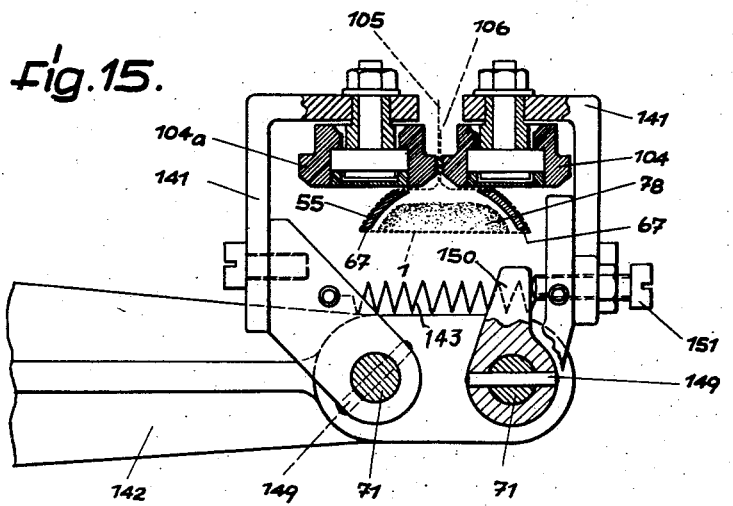
Figure 15 is a sectional view taken on line XV—XV of Figure 2.

Figure 15 is a sectional view of the means for the forming of the tube taken on line XV—XV of Figures 2, 11, 29 and 30. The form 55 is cut here at a point where the mold is open not only at the top but also at the bottom. The parts of strip 1 overlying the bottom 67 of form 55 which in the sectional view along line XIV—XIV are held up by fingers 69, are here picked up over the central axis form 55 by two knurled wheels 104 and 104a, in such a manner that the edges 105 and 106 of strip 1 stand up vertically and parallel to each other.

Figure 16:
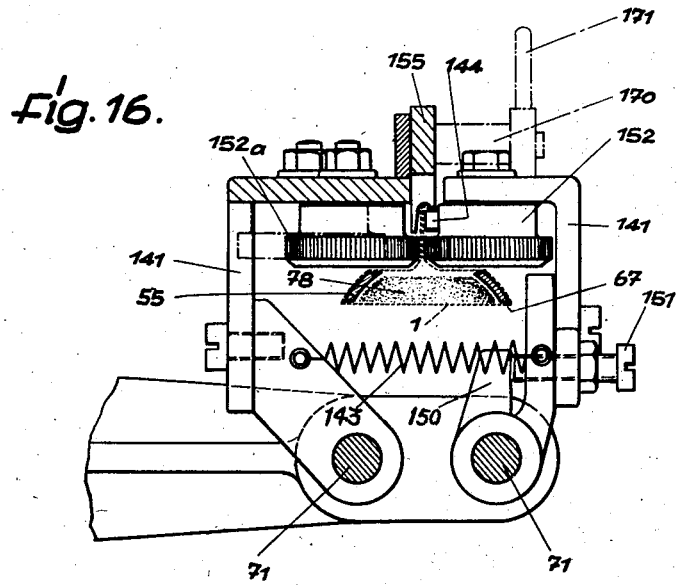
Figure 16 is a sectional view taken on line XVI—XVI of Figure 2.
Figure 39:
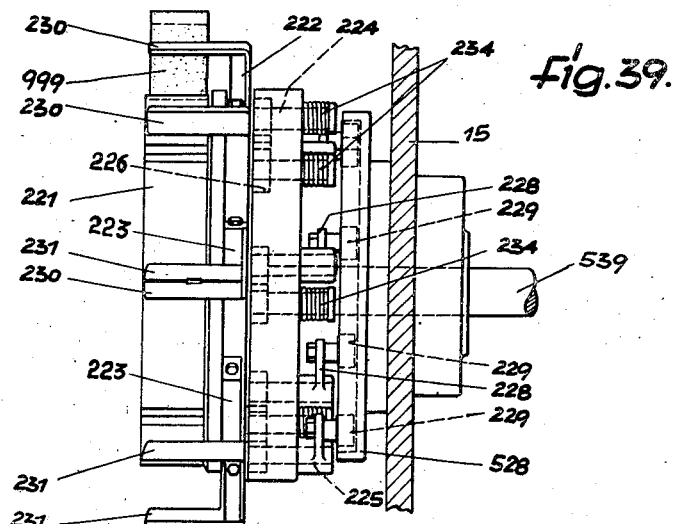
Figure 39 is a top plan view of the conveyor wheel of Figure 38.

The strip is guided from the beginning beneath the wheel 88 and beneath the form 55 in such a way that in raising the edges 105 and 106 the edge 105 extends beyond the edge 106 to a degree sufficient to form the initial fold of the longitudinal seam 140, as illustrated in Figures 16 and 20. The knurled wheels, the drive of which will be described later, compress the lateral longitudinal parts of the strip 1 and move the material along the form 55.

In order to initially insert the longitudinal parts of the strip 1 between the knurled wheels 104 and 104a, these wheels, like the fingers 69, can be swung down on each side, being mounted on arms 141 which are fitted on the rocker shafts 71. The arms 141 are connected to each other by a tension spring 143, which urges the knurled wheels 104 and 104a together. Arm 141, which holds wheel 104a, is fixed on rocker shaft 71 by cross bolt 149, while the other arm 141 is rotatable on the corresponding shaft 71. However at this point a dog 150 is fixed to the corresponding locker shaft 71 by a cross bolt 149, and a regulating screw is fitted on the corresponding arm 141 which is pulled by spring 143 against the dog 150. This construction makes it possible to arrange the knurled wheels so they can touch each other in any case. In this cross-section the rocker shafts 71 are mounted on arbor 142 which in turn is fastened to the machine frame 15.

As can be seen from Figure 19, the part of the strip 1 which is limited by edge 105 and extends above edge 106 is bent over beyond this cross-section XV—XV in the direction of feed. For this purpose a folding device is provided in which the edges 105 and 106 of strip 1 are led between wall 148 and rail 144 so that the edge 105 is bent over rail 144. This bending is initiated by a finger 145 which is positioned in the path of edge 105 and over the rail 144 and moves edge 105 to the side. After edge 105 is moved to the side, a pivoted folding blade 146 further folds it over from above. The blade 146 touches the surface 147 of the finger 145 and folds edge 105 over the rail 144 which is placed in such a way that it is flush with the wall 147 of finger 145. In Figure 17 these parts are sketched broken apart; Figure 18 shows a cross-section of these parts assembled.

In the feeding direction beyond these folding parts, another pair of knurled wheels 152 and 152a is placed, which can be seen in Figure 16, which is a sectional view taken on line XIX—XIX in Figures 2, 29 and 30. The mounting of these wheels 152 and 152a is the same as that of wheels 104 and 104a, described in connection with Figure 15.

Behind these wheels 152 and 152a, the single fold 153, made by the parts shown in Figures 17 and 19, is bent, by a similar structure, around edge 105 as shown in Figures 20 to 22, thus making a double fold 154. In this structure there is again a rail 144a alongside which fold 153 runs in such a way that edge 105 runs alongside the upper edge of rail 144a. Above rail 144a a second pivoted folding blade 155 is mounted, the under face of which is in the form of an inverted chute overlying fold 153, which chute increasingly overlaps rail 144a in the direction of feed of strip 1. This chute bends fold 153 around edge 105 and around the upper edge of rail 144a toward the tube as sketched in Figure 22. The result is an upstanding double fold 154, as sketched in Figures 20 and 24.

This double fold 154 is compressed by a pair of knurled wheels 157 and 158 which are positioned next in line after the parts sketched in Figures 20 to 22 and shown in section in Figure 23, which section is a view taken on line XXIII—XXIII in Figure 30. The wheel 158 is mounted in the corresponding rocker shaft in the same fashion as the wheels 104 and 152. The wheel 157 is mounted on a bracket 159 which also carries the drive wheel 160 for a number of knurled wheels. This drive wheel has a cylindrical rim 161, driven by the drive and a conical rim 162 which meshes with another conical rim 163 of the knurled wheels 157. As can be seen from Figures 29a and 30a, the drive goes from knurled wheel 157 via an intermediate gear 164 to knurled wheel 152a and from there via another intermediate gear 164a to knurled wheel 104a. These intermediate gears 164 and 164a are mounted along with knurled wheels 104a and 152a on pivoted arm 141. The knurling wheels 104, 152 and 158 are moved simultaneously by being pressed against their opposite wheels.

Beyond knurled wheels 157 and 158 in the direction of feed, fingers 165 and 166 are positioned (see Figures 23, 25, and 26) which press the so far vertical standing double fold 154 flat on the tubular strip. In this flat position the double fold 154 constitutes the previously mentioned longitudinal seam 140 of the tube. Finger 166 is fastened on arm 141 which carries knurled wheel 158. Finger 165 is fastened to a part 168 which in turn is fastened to the arbor 142 which holds the rocker shafts 71. The arm end of the tension spring 143 is also fastened to this part 168 (Fig. 23).

The folding blades, sketched in Figures 17, 18, 21 and 22 are, as described above, pivotally mounted in order to be swung up before insertion of the material strip 1 and then to be pressed down on the edges 105, 106 and the fold 153. The position and the methods of operating these folding blades 146 and 155 are described in connection with Figures 27 and 28. In Figure 27 the blades are sketched in non-operating position and in Figure 28 in operating position.

The folding blades are pivoted around pins 169 which are mounted directly on machine frame 15. Also mounted directly on frame 15 is a rotatable bolt 170 which can be rotated by a lever 171 as shown in Figure 16. This bolt 170 has two cams 172 and 173 which work against the surfaces 146a and 155a of the folding blades 146 and 155 respectively. These cams are constructed and fitted in such a way that while turning bolt 170 counterclockwise in Figure 27, cam 172 moves against surface 146 and pushes folding blade 146 down. After this has been done, cam 173 moves against surface 155a of folding blade 155, causing the blade 155 to move downwardly as folding blade 155 is a double-arm lever. In order to have the folding blades 146 and 155 maintain contact between the surfaces 146a and 155a and the cams 172 and 173, both blades are connected to each other by a tension spring 174.

Referring to Figures 29 and 31 a pair of draw-rollers 175 and 176 is mounted beyond the fingers 165 and 166 in the direction of feed, which catches the tube only at the lateral edges. To accomplish this, the rollers 175 and 176 are fitted with collars 177 at their ends (Fig. 31) which run on top of each other, leaving a free passage between the collars 177 for the middle part of the tube which contains at spaced intervals the substance quantities 78.

These rollers 175 and 176 are driven by the main drive of the machine, the shaft 200 of the upper roller 175 receiving the drive. Gear 202 is also mounted on shaft 200 besides upper roller 175. This drives gear 203 which is mounted on sleeve 204 which is fixed on lower roller 176. Sleeve 204 and the lower draw-roller 176 are mounted on a shaft 201 which is fastened directly on the machine frame.

In addition, the gear 202 drives the rim gear 161 (Fig. 29a) which drives the knurled wheels through the pair of conical rim gears 162 and 163.

*Feeding and dosing of the substance quantities*

Figure 9:
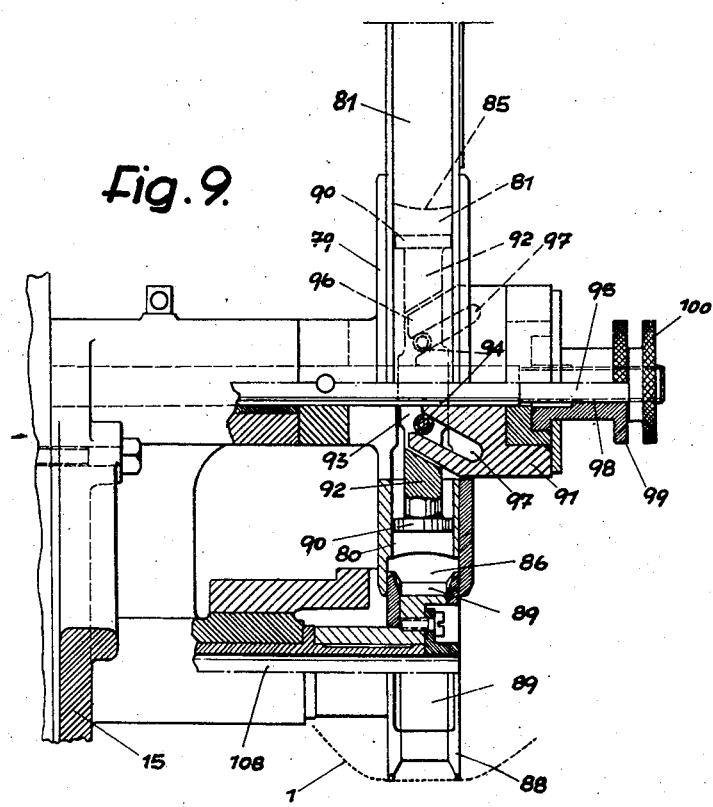
Figure 9 is a vertical partial section taken on the axis of the dosing wheel.

The device for feeding and dosing of the substance quantities 78 (Fig. 14), which have to be deposited at intervals on the strip of material 1, is a circular bucket wheel 79 (Fig. 9). The substance flows from a container 81 into the cells 80 of the bucket wheel. Around the bucket wheel is a case 82 which has in the upper part an opening 85 for feeding and in the lower part an opening 86 for runoff. Below the case 82 is a second case 87 into which the substance quantities contained in the cells 80, enter one after the other through the lower opening 86 of the first case 82. A second bucket wheel 83 is in the second case 87 and takes over the substance quantities in its cells 89 and deposits them through an opening in the lower part of case 87 on the strip of material 1 which is already arched channel-like at this point.

To achieve exact dosing of the substance quantities 78 in the cells 80 of the first bucket wheel 79 the bottoms 90 of the first bucket wheel 79 are radially adjustable. A cylindrical slidable core 91 is mounted inside the circular bucket wheel 79 so as to be axially movable and lockable on the shaft 95 of the first bucket wheel. The bottoms 90 of the cells 80 are constructed like pistons whose radially adjustable piston rods 92, which lead into the cylindrical core, have a slit 93 in radial direction. A cross bolt 94 is fixed transversely in the mouth of each slit. The core 91 has radially arranged vanes 96 which fit into the slits 93 of the piston rods 92. The vanes 96 have slits 97 which lie at an angle to shaft 95 and which engage cross bolts 94. A nut 99 mounted on a collar 98 of the shaft 95, is connected with the core 91 in such a way that core 91 remains axially fixed adjacent nut 99 which turns in accordance with shaft 95. Through this nut, core 91 can be moved, even during the operation of the dosing device, in axial direction, causing the cross bolts 94 to move within the slits 97 and leading the pistons 90 in radial direction outward or inward. To fix nut 99 a locknut 100 is provided.

Cutting the tube

Next in line in the direction of feed beyond the pair of draw-rollers 175 and 176 is a cutting device which cuts the endless tube 167, which is closed longitudinally and contains at spaced intervals substance quantities 78. This device is arranged to cut tube pieces of the same length such that each piece contains two substance quantities 78 and can be formed into one double chamber bag.

Figure 32a shows the method of dividing the tube. Tube pieces 178 contain the substance quantities, while between the tube pieces 178 are other tube pieces of length a and a', being of equal length, because the substance quantities 78 are deposited at equal intervals on the strip of material 1 which passes the dosage device at a constant speed.

According to the present invention the tubular sections which form the double chamber bag are of such dimensions and shape that after being brought together one tubular section overlaps the other, i. e. one is longer than the other. This creates a special advantage in the forming of the locking fold of the bag which will be described later. To obtain this it is necessary to use a special method of cutting the tubular pieces which form the bags out of the endless tube. The cutting does not take place in the middle between two tubular parts 178 (Fig. 32a), but in such a way that every second tubular part of the length "a" is divided into segments "b" and "c," "b" being approximately half as long as "c" and the sum of "b" and "c" equaling "a." The pieces "a'" which are inbetween the pieces "a" are of equal length with "a" but are not divided, serving to form the bottom of the double chamber bag, the construction of which will be described later. The length of the tubular pieces which have to be cut from the endless tube therefore is twice piece 178 plus "a'" plus "b" plus "c." Such a tubular piece is marked 167' in Figure 32a.

The cutting device has two blades 179 and 180. These blades have to make two movements; first a cutting movement, sliding across each other and second a turning or traveling movement in such a way that they move along in a steady forward pace with moving tube 167 in order not to slow the tube while gripping it.

To accomplish both these movements, the cutting device is constructed in the following way:

The blades 179 and 180 which are arranged transversely to the direction of feed of tube 167 are fitted (Fig. 37) on levers 181 and 182. These levers are connected with a two-armed lever 183 which runs in the direction of feed of the tube and is mounted above the top of the tube. They are connected by forks 192 and 193 at 184 and 185 respectively. This two armed lever 183 is connected with a plate 187 which has for precision adjustment a slit 188, to which the bolt 189, forming the connection between the two-armed lever 183 and plate 187 can be attached. Bolt 189 has a collar at one end which grips the lever 183.

Plate 187 is fixed on bolt 195 at 194. This bolt is directly fixed on machine frame 15. A lever 196 is also fixed on bolt 195 and is connected with its other end 197 with the forked part 193 of lever 182 which carries blade 180.

On bolt 198, indirectly fixed on machine frame 15 (Figures 29a, 30 and 30a), a toothed wheel 199 is mounted which is driven by toothed wheel 202, which in turn is mounted on shaft 200 (Figure 29a). The latter wheel drives two identical built cam plates 205 and 206 (Figures 30 and 30b) and another cam plate 207a (Figures 29 30), by, for example, fixing these cam plates and wheel 199 on the same sleeve (not shown) which is rotatably mounted on bolt 198.

Rolls 207 and 208, which are mounted on a crank lever 209, move on cam plates 205 and 206 (Figures 30b, 33, and 34). This lever 209 is hinged at one end 210 to a fixed point of machine frame 15. At its other end, lever 209 is hinged at 211 to plate 187. Through the rolling of the rolls 207 and 208 on the driven cams 205 and 206 tthe lever 209 is given an oscillating movement around point 210. This oscillating movement is transferred from lever 209 to plate 187 which consequently oscillates similarly around bolt 195. Since, as described above, plate 187 is firmly connected with two-armed lever 183 by bolt 189, lever 183 with its pivotal point 186 also oscillates around bolt 195. The drive and the shape of the cam plates 205 and 206 is adjusted so that this oscillatory movement causes the pair of blades 179 and 180 to move longitudinally a short distance with tube 167 at an identical pace and to then return.

A second movement is imparted to the blades 179 and 180 in order to cut tube 167 transversely at the very point where the pair of blades 179 and 180 turn back to move in opposite direction to the travel of tube 167. This movement is produced by cam plate 207a (Fig. 29), on which a roll 212 rolls (Fig. 37) which is hinged on one arm 183a of the two-armed lever 183. Through the movement of this cam 207 the two-armed lever is rocked so that the two blades 179 and 180 perform a sliding movement in their tangential plane. Blade 180 is below the tube 167 and blade 179 above the tube. Thus this sliding movement in their tangential plane causes the edges 179a and 180a to cut the tube.

The lever 181 of the blade 179 is crank shaped to bring the blades 179 and 180 into a smooth fitting side by side relationship. In addition the forked parts 193 of lever 182 are also cranked in such a way that the levers cross, therefore placing blade 179 before blade 180 in the direction of travel of the tube, even though Figure 37 may give the opposite impression. In fact, lever 181 reaches over and between the forked parts 193 below the lever 196, as can be seen from Figures 35 and 36.

To hold roll 212 constantly against cam 207, a plate-like part 213 is rotatably mounted on bolt 195 at 216 and also on bolt 189 at 214. Between plate 213 and two-armed lever 183 a spacer 215 is mounted. In the plate 213, hole 217 is made in which rests one end of pressure spring 218. This spring presses with its other end against a spring-plate 219 which is formed by the extended end of bolt 220, on which the lever 196 is hinged to the forked parts of lever 183.

Forming the bottom-fold

Next in the direction of feed beyond the above described tube cutting device is another device which picks up the single cut tube pieces one after the other; puts the tube pieces 178, which contain the substance quantities, side by side; forms the bottom fold of the bag; and leads the partially formed double-chamber bag to the succeeding devices. These succeeding devices accomplish the forming of the sealing fold, the sealing of said fold by means of a staple, the simultaneous fastening of a thread or string to the bag and the release of the bag to another conveyor device.

For this purpose a circular intermittently rotating conveyor wheel 221 (Fig. 38) is fixed on a shaft perpendicular to the direction of feed of the tube 67 in such a way that the apex of its perimeter lies in the plane of the tube 167.

Spaced about the conveyor wheel at equal intervals eight pair of levers 222 and 223 (Fig. 40) are rotatably hinged to the bolts 225 and 224 respectively which are mounted on the conveyor wheel 221. The hubs of the two levers are connected to each other by the toothed wheels 226 and 227. The lever 222 is constructed as a two-armed lever with a roll 229 hinged to one arm 228 which has a steering cam mounted thereon, which will be described below.

The levers 222 and 223 have at their ends, fingers 230 and 231 mounted perpendicularly to the lever arms, so they can meet face to face and clamp the ends of a cut tube piece 167 between them. Lever 223 consists of two parts conected by screw 232. These levers 222 and 223 are bent so that they will remain inside the conveyor wheel while in unoperated position. The fingers 230 and 231 then lie in slots 233 of the conveyor wheel. Mounted on the bolts 225 of the levers 223 are torsion springs 234 (Fig. 42) which urge the levers 223 and the connected levers 222 toward the unoperated position inside the conveyor wheel 221. The cam rolls 229 therefore force the levers to move against the effect of the torsion springs 234.

Between the pairs of slots 233, which hold the fingers 230 and 231 of a lever pair 222 and 223, eight pairs of slots 235 (Figures 38 and 45) triangular in cross-section are cut in the periphery of said conveyor wheel in such a way that part 236, wedge-shaped in cross section, is formed between them. The slots 235 and part 236 serve as a bottom die in the formation of the bottom fold of the double-chamber bag.

The tube 167, which has to be cut, moves before being cut between the blades 179 and 180 to such an extent that at the moment of cutting, a section "a'" (Fig. 32a) of tube 167 is positioned with its midpoint above the apex 237 of the wedge shaped part 236, which at the time of cutting is situated exactly at the apex of the circular path described by the periphery of the conveyor wheel 221. The impressing of tube piece 167' into the matrix which is formed by the parts 235, 236 and 237 is done by two folding swords 238 (Fig. 44) made out of elastic material, for instance spring steel, which are brought from above and one side of the path of tube piece 167' across and down over the path simultaneously. This double movement is effected in the following way: The two folding swords 238 are fastened between two plates 239 (Figures 43–46) which do not touch the lower part of the folding swords. Therefore those lower parts can be forced apart. The plates 239 have extending arms 240, through which they are connected to a fork, both ends 241 and 242 of which form coaxial journal boxes. These boxes are mounted on a shaft 243 which is mounted on a web 244. At each end of this web, journal boxes 245 are mounted with their axes perpendicular to the axes of boxes 241 and 242. Boxes 245 are mounted on shafts 246 on which the journal boxes 247 are mounted on both sides of boxes 245. These boxes 247 are firmly connected by arms 248 to parallel boxes 249 which in turn are fixed on shafts 250. The shafts 250 are mounted in plates 251. Between boxes 249 spacer sleeves 249a are fixed on shafts 250. The result is a parallelogram, the axes of which are formed by the shafts 246 and 250.

The up-and-down movement of folding swords 238 is accomplished by a lever 252 (Figures 47 and 50) which is fixed on the upper bolt 250 and which is moved in an oscillatory manner by a driving rod 253. This driving rod is flexibly connected by a bolt 254 to the end of lever 252 which is formed with an eye therein. The connection is made in such a way that bolt 254 is adjustable in the longitudinal direction of driving rod 253. Driving rod 253 is hinged at 255 to a two-armed lever 256, whose other arm carries a roll 257 which runs on cam section 258 of plate 259. This cam section 258 effects an oscillating movement of lever 252 and consequently the up-and-down movement of the folding swords 238. The cam plate 259 is driven by the main drive of the machine.

The lateral swinging in and swinging out of folding swords 238 is effected by curve section 260 in the plate 261 which is fixed on plate 251 by an angular piece 262 (Fig. 47). Plate 261 is fixed in a plane perpendicular to the axis of shaft 243. Box 242, which is mounted on this shaft, carries a lever arm 263, on the end of which a roll 264 is fixed to run in the curve section 260. This curve section is fitted in such a way, that through the up-and-down movement of the folding swords which correspond with the up-and-down movement of shaft 243, the folding swords are being swung into the path of tube piece 167' while lowering, and being swung out of the path while raising.

Between the lower ends of folding swords 238 a finger 265 (Figures 43–46) is fixed which is hinged to the arm 240 of plates 239 and exposed to the pressure of spring 266 which tries to swing it downward. The down-swinging effect is limited by a stop 267 in order that finger 265 cannot extend below plates 238. Therefore finger 265 always holds the lever ends of folding swords 238 apart a bit. The lowest edges of swords 238 are furnished with U-shaped rails 268.

The folding swords 238 move according to the following sequence. When tube piece 167' is positioned with the middle of its length "a'" above the apex 237 of the matrix, the folding swords 238 are swung down and in toward tube piece 167' from their rest position. At the same time finger 265 presses tube piece 167' on the apex 237 of the matrix and the folding swords slide down along the walls of the slots 235 which form the apex 237 to the bottom of the slots and press simultaneously the caught parts of tube piece 167' into the slots 235. Through this movement the bottom fold (Fig. 51) is formed out of the length "a'" of tube piece 167' and at the same time the sections adjoining both sides of length "a'" of tube piece 167' are folded upward.

Figure 40:
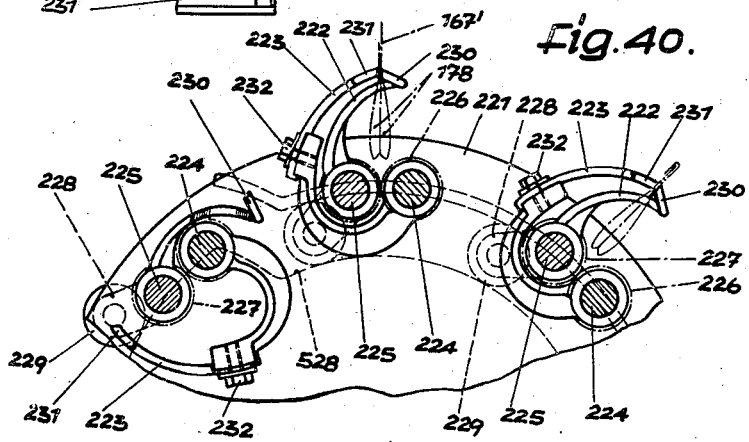
Figure 40 is an enlarged partial side view of the upper portion of the conveyor wheel of Figure 38 showing the operation of the conveyor arms.

While being folded upward the parts are caught by a pair of levers 222 and 223 with fingers 230 and 231, as shown in Figure 40, in such a way that the tube sections 178 which are filled with substance quantities 78 are brought side by side. Fingers 230 and 231 of levers 222 and 223 catch the ends b and c of tube piece 167'. Inasmuch as the lengths a of tube 167 are divided by blades 179 and 180 in an uneven proportion, the larger part c will overlap part b when sections 178 are placed side by side (Fig. 51).

The forming of the bottom fold 269 and the bringing together of sections 178 of tube piece 167' is done immediately after the cutting off of tube piece 167' from tube 167. The fingers 230 and 231 of levers 222 and 223 catch the ends b and c of tube piece 167' while sections 178 are being raised during the process of forming the bottom fold. After the levers 222 and 223 have caught the now formed double chamber bag, the folding swords 238 and finger 265 are moved out of the bag and swung up to the side. This happens in such a way that the folding swords 238 raise a little first, but finger 265, because of spring 266, presses bottom fold 269 on blade 237 a short additional length of time, in order to prevent the folding swords from taking the double chamber bag upward. This is made possible by the construction of stop 267. The bag, held by levers 222 and 223 on the conveyor wheel 221, is led to the next device which forms the sealing fold of the double chamber bag, as the conveyor wheel rotates one step ahead.

To prevent the substance quantities from squirting out of the ends of tube piece 167' during the process of bringing the sections 178 of tube pieces 167' side by side, a special device is provided which is shown in Figures 52 to 57.

Attached to angle-plate 262 which is fixed on one of the plates 251 (Fig. 47) is a downwardly oriented angle 270. A bearing 271 is fixed on this angle above the path of tube piece 167' and transverse to the direction of feed. On bearing 271 arched guides 272 are fixed between which tube piece 167' will run. The yoke 273 of arched guides 272 is similarly formed so that the bend of the yoke equals approximately an arc around the apex of the corresponding notch 235 of the matrix of the conveyor wheel 221 at the time when the blade 236 is situated in the vertex of the circular path of the conveyor wheel.

The guides 272, finger 231 and yoke 273 cause the length $b$ of tube piece 167' to be bent at the lower edge of the arched part 273, while tube sections 178 of tube piece 167' are being raised.

A shaft 274 is fixed in bearing 271 and angle 270. On it a bearing (Fig. 57) is mounted between angle 270 and bearing 271, which carries a housing which is composed of side pieces 276, cross-piece 277 and a bent yoke 278. This housing can be rotated upward around shaft 274 by a connecting piece 280 between angle 270 and bearing 271. The curvature of yoke 278 corresponds with a circular arc around the blade 236 of conveyor wheel 221, when the housing 276, 277 and 278 is situated in its lowest position.

The shaft 274 extends through the machine wall 15 and has at its further end a lever 281 (Fig. 47). Lever 281 carries at its end a roll 282 which runs in a curve-section of a disc 283, which describes an oscillating movement. The curve-section and the oscillating movement of disc 283 are arranged in such a way, that the housing 276, 277 and 278 is rotated upward around the axle of bolt 274 (Fig. 55) and clears the way for the double chamber bag and the levers 222 and 223, when the conveyor wheel 221 is moved ahead clockwise.

The bent yoke 278 of the housing 276, 277 and 278 is extended toward the side away from the path of tube piece 167' (Fig. 54) and there has an eye 284 in which a bolt 285 is fixed. On this bolt a flap 286 is mounted which partly enters between the sidewalls 276 of the housing. This flap has an arched guide 287 which receives the front-end of tube piece 167', when the housing 276, 277 and 278 is in its lowered position. In addition the flap has a horseshoe shaped guide 288, which projects into the lower portion of the housing 276, 277 and 278 with its apex extending oppositely to the direction of feed of tube piece 167'. Before the start of the formation of the bottom fold the leading edge of tube piece 167' is situated between these parts 287 and 288.

Simultaneously with the forming of the bottom fold and the placing of parts 178 side by side, flap 286 swings in such a way that parts 287 and 288 move upward. Through this movement part $c$ of tube piece 167' is bent, as can be seen in Figure 53. Following this movement, finger 230 of lever 222 moves part $c$ upward, extracting it out from between the guides 287 and 288. This piece then slides upward along the inner side of arched yoke 278. The swinging of flap 286 with its guides 287 and 288 is effected by a lever 289 on bolt 285, on which the flap is fixed, which in turn carries a roll 290 driven by a cam 291. This cam 291 is fixed on an arm 292 which is fixed on bolt 250 and consequently oscillates with arms 248.

*Driving mechanism for the parts of the machine described so far, Figures 172–175*

It is important in starting of the machine that the drive for the material strip 1 is switched on first and then the dosing device. In stopping the machine, this obviously has to be reversed. To obtain the above sequence, the drive of the parts so far described has a serial coupling to the switching device.

A shaft 108 is rotatably mounted in machine frame 15, and a toothed driving wheel 107 is also rotatably mounted on a coaxial stationary bearing 117. Next to wheel 107 another toothed wheel 109 is rotatably mounted on the shaft 108, which serves to drive the material strip 1 and the tube 102, formed from the strip. This wheel 109 drives through intermediate wheel 110 (Fig. 169) a wheel 111, which in turn drives the middle feed roll 6.

Shaft 108 drives the lower bucket wheel 88 and through toothed wheel 115 fixed thereto a toothed wheel 116, which is fixed on shaft 95 of the upper bucket wheel and thus drives it also.

The coupling is arranged in the following way: On the fixed bearing 117, in which shaft 108 is rotatably mounted and on which drive gear 107 is rotatably mounted upon an intermediate sleeve of a second bearing 133. The drive gear 109 is fixed upon an intermediate sleeve of a third bearing 134.

A control bearing 118, mounted on shaft 108 for rotary and axial movement, has thereon two bolts 119, parallel to shaft 108 and fixed on the surface which faces the hub 120 of the drive gear 109. These bolts are axially movable in the holes of hub 120. On the side of drive gear 109 opposite control bearing 118 a disc 122 with attachments 123 is fixed on the periphery of hub 121 of drive gear 107. The bolts 119 can move into this disc when control bearing 118 is shifted.

Next to control bearing 118 a dog 124 is fixed on shaft 108. It can be engaged when the control bearing 118 is moved axially by the teeth 125 which are fixed on opposite front surface of control bearing 118. Therefore, when catches 124 and 125 are engaged, the drive gear 107 through the attachments 123 on disc 122, bolts 119, the control bearing 118 and the catches 125 and 124 is coupled with shaft 108 and consequently also with toothed wheel 115 which is fixed on shaft 108.

To give bearing 118 a two step axial movement, a two-armed lever 126 is provided, one end of which rides in the track 127 of control bearing 118 in such a way that control bearing 118 can pivot around lever 126. A control rod 128 is provided which is mounted in a bearing 129. This bearing has a stepped longitudinal slot 130, in which a cam 131 (Fig. 173) fixed on control rod 128, is movable. By moving control rod 128 and cam 131 up to the point where cam 131 touches the step 132 of slot 130, driving gear 109 is coupled with driving gear 107. After rotating control rod 128 counterclockwise out of step 132, cam 131 can move into the second part 130' of the slot 130 and the driving gear 115 is thereby coupled with driving gear 107. The rod 128 which has a control knob 137 is held in its various positions by a spring urged pin 135 which can enter a corresponding depression of sleeve 136 of rod 128.

The lever 126 is fixed on arbor 139 at 138 which is fixed on machine frame 15.

*Device $F_1$, $F_2$ for sealing the bag (Figs. 58–71)*

The bag 999 is sealed by a nose-sealing fold which is formed in two steps. In the first step the edges 297 (Figures 66, 66a) are folded, and in the second process the trapezoidal part 298, which was left at the top during the first process, is folded.

The bag 999 is led to both devices for forming the fold by the intermittently moving conveyor wheel 221, during which process the bag is held by levers 230 and 231. During the time the conveyor wheel 221 stops, bag 999 stands opposite one of the two folding devices. These devices are spaced around the conveyor wheel at the same arcuate distances in relation to the axis of the conveyor wheel as are the lever-pairs 230 and 231. Similarly the other devices, which are served by conveyor wheel 221, are arranged around the conveyor wheel (Fig. 38).

Figure 58:
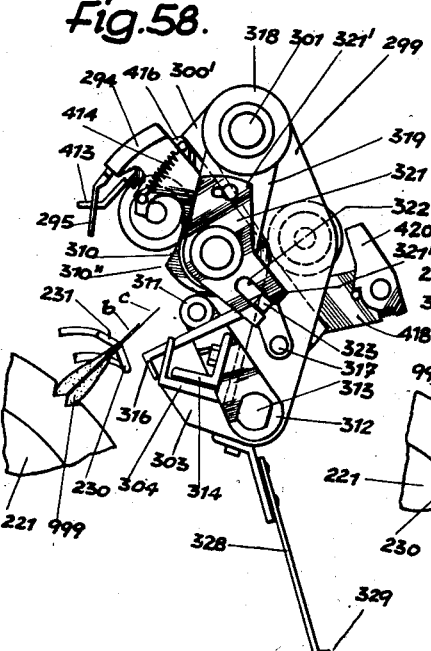
Figure 58 is a side view of the first sealing-fold forming device shown in its initial position.

Figure 58 shows the starting position of the first folding device and the conveyor wheel with bag 999 in rest position. The first folding device consists of a rocking lever 299 whose hub 300 (Fig. 63) is rotatably mounted on a bolt 301 which in turn is fixed in eye 302 of bearing 296 which is fixed on machine frame 15. At the end of rocking lever 299 opposite hub 300, block 303 is mounted on which an angle plate 304 is fixed.

Angle plate 304 has in its upright portion 304' a slot 305 adjacent the plate bed portion whose width corresponds to that of bag 999 and to which a second slot 305' joins, said second slot reducing in aperture toward its upper edge.

A rocking shaft 293 is mounted in bearing 296 which is driven by lever 306 whose hub 306' is fixed on rocking shaft 293. On the end of lever 306, opposite hub 306', a roll 307 is mounted to run in a slot of an oscillating driving disc which gives an oscillating movement to rocking shaft 293.

A cam disc 308 is fixed on rocking shaft 293 which moves an angle lever whose angle arms 300' and 300" are fixed on hub 300 of lever 299. Each side of the angle lever carries a roll 309, which runs on cam disc 308. Thus the oscillating movement of rocking shaft 293 is transmitted to lever 299.

Also fixed on rocking shaft 293 is a folding lever 294 which carries a folding blade 295. This blade (see Fig. 65) is shaped to correspond to the nose of the bag 999 after it has been folded the first time. The folding lever 294 has a curve 310 on its hub on which a roll 311 runs. Roll 311 is mounted on a lever 312' which forms part of a frame 312 which is hinged at 313 to the block 303. On this frame 312 an angle plate 314 is fixed, which serves to compress the finished fold.

Figure 59:
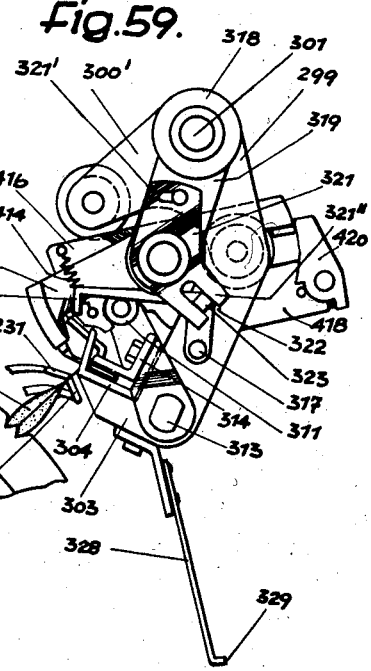
Figure 59 is a view similar to Figure 58 showing the device in its final position.
Figure 64:
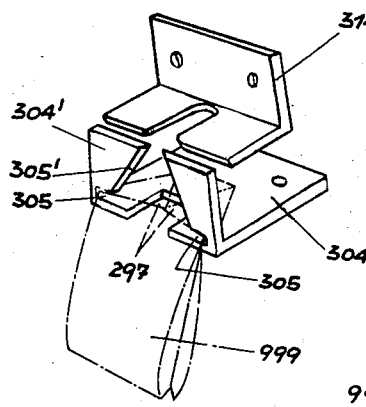
Figure 64 is a perspective view of the sealing-fold forming plates of Figure 58.
Figure 65:
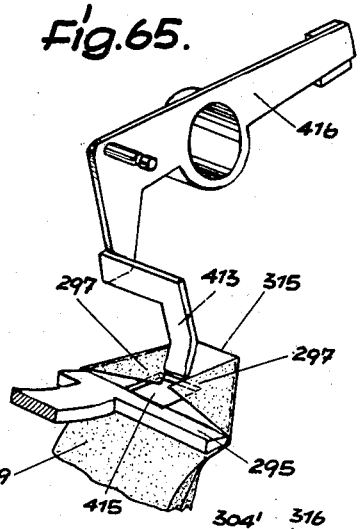
Figure 65 is a perspective view of the bag feeling device of Figure 58.
Figure 66:
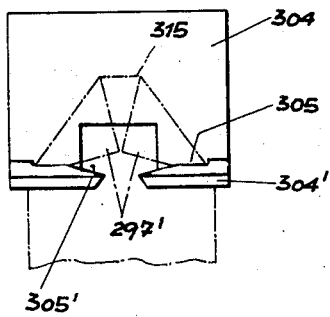
Figure 66 is a top plan view of the bag after the first sealing-fold is completed.

The sequence of operation is as follows:

Through a rotation of rocking shaft 293 (counterclockwise in Fig. 61) lever 299 with angle plate 304 is swung toward bag 999 from the position shown in Figure 58 into the position shown in Figure 59. During this movement the end of the bag which is supposed to form the fold, contacts the upper part 304' of angle plate 304. At the same time folding lever 294 starts swinging (counterclockwise in the drawings) so that the folding blade 295 can penetrate slot 305 as soon as lever 299 has reached its end position which is marked by the running of roll 309 of angle side 300' to the end of concentric part 308' of cam disc 308. Entering the slot 305, the folding blade 295 catches the upper end of bag 999 at the spot which lies in front of slot 305. In this way the flap portion of bag 999 is brought through slot 305 and 305' and the end of the bag is brought into the slot which is formed between angle plate 304 and angle plate 314. Angle plate 314 then approaches angle plate 304 because of the movement of lever 312' from curve 310 over the roll 311.

At the end of the stroke of folding blade 295 the edges 297 of bag 999 are folded (Fig. 66) and then pressed on blade 295 by the angle plate 314 through segment 310' of curve 310.

In reversing, caused by the movement of rocking shaft 293 in a clockwise direction, the folding blade moves back first. After blade 295 has left slot 305, the angle plate 314 is pressed firmly on the lower part of angle plate 304 by the running of roll 311 of lever 312 on the apex 310" of curve 310, to form sharp folds at the edges 297.

Further during the reverse motion of rocking shaft 293 the roll 309—fixed on angle side 300"—runs onto the concentric part 308' of curve disc 308 and roll 309 fixed on angle side 300' runs off the concentric part 308', causing lever 299 to swing backwards. Through this motion the fold of bag 999 extracts itself out of slot 305.

Figure 67:
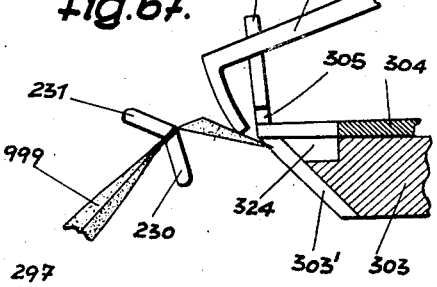
Figure 67 is a partial sectional view of the clearing arm for removing the bag from the first sealing-fold forming assembly.

In order to avoid entanglement of the fold after extraction out of slot 305 and during the further movement of conveyor wheel 211, a hammer-shaped lever 316 (Figures 58, 59, 60, 67) is installed to press the fold of bag 999 below the oblique area of surface 303' of block 303 (Fig. 67). The hammer-like lever 316 is formed as an angle lever and is hinged at 317 on lever 299.

An eye 318 fixed on bolt 301 is connected to a bearing 320 for the rocking shaft 293 through an arm 319. A two-armed lever 321 is rotatably mounted about rocking shaft 293 on arm 319. One side 321' of lever 321 is adjustably connected with arm 319. The other side 321" has a stop in which a stud 323 can move. This stud is fixed on the angle apex of the hammer-shaped angle lever 316. In this way the hammer-shaped angle lever 316 receives the desired motion through the movement of lever 299.

A two-armed lever 416, rotatably mounted on rocker shaft 293, has on one end thereof a detector 413 which acts to indicate whether or not a bag has been inserted into the device for the forming of the first fold, which in turn determines (as will be explained later) whether or not the wire for forming the staple which keeps the fold together is to be fed to the forming device. Lever 416 is connected with folding lever 294 through a tension spring 414 in such a way, that detector 413 moves through an opening 415 in folding blade 295 into a cavity 324 in block 303, if there is no bag present to stop it.

The second folding device (Figures 68–71) is constructed in a similar manner to the first one. The hub 1300 of a rocking lever 1299 is rotatably mounted on a bolt 1301 which is fixed in the eye of a bearing, which in turn is fixed on machine frame 15. At the end opposite hub 1300 the rocking lever 1299 carries a block 1303 on which a plate 1304 is fixed.

The rocking shaft 1293 is like rocking shaft 293 of the first folding device and is similarly driven to give it an oscillatory motion.

On rocking shaft 1293 a cam disc 1308 is fixed which drives an angle lever whose angle sides 1300' and 1300" are fixed on hub 1300 of lever 1299. Each side of the angle lever carries a roll 1309 which runs on cam disc 1308.

Furthermore there is fixed on rocker shaft 1293 a folding lever 1294 which carries a folding blade 1295 whose width corresponds to the width of plate 1304. The hub of folding lever 1294 forms a curve 1310 on which roll 1311 runs, roll 1311 being mounted on a lever 1312', which forms part of frame 1312 which is rotatably hinged at 1313 to block 1303. On this frame 1312 an angle plate 1314 is fixed, which together with plate 1304 forms the matrix for the second fold and is used for compressing said fold. For this reason plate 1304 has at its end a step 325 and angle plate 1314 has at the corresponding spot a bar 326 which fits into step 325.

Figure 66A:
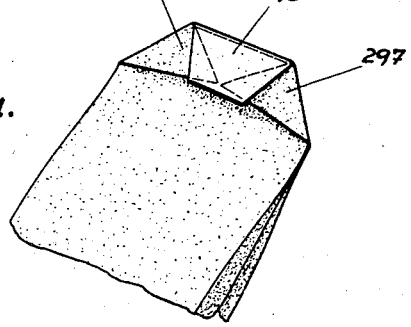
Figure 66a is a perspective view of the bag after completion of the second sealing-fold is completed.
Figure 79:
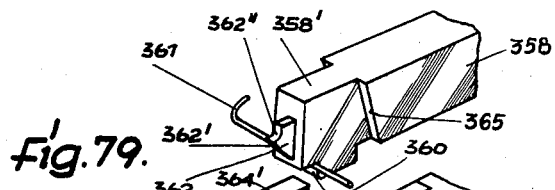
Figure 79 is an exploded perspective view of the staple forming portion of the device of Figures 72–74.

The device, shown in Figures 68 to 71, has to fold a trapezoidal piece 298 at the sealing end of bag 999, so that the fold shown in Figure 71 may be formed into the fold shown in Figure 66a.

The sequence of operation of this second folding device corresponds approximately to the method of the first one. The difference is that the sealing end of bag 999 is forced into the matrix which is formed by step 325 of plate 1304 and bar 326 of angle plate 1314 by folding blade 1295, while at the same time folding up edge 315 as shown in Figure 70.

Figure 68 shows the position at the start, Figure 70 shows the end position of the forward stroke of the device. In reversing, folding blade 1295 is withdrawn at the start as in the first folding device and then through the roll 1311 running on apex 1310" of curve 1310 the compressing of the formed second fold takes place between bar 326 and step 325, both of which release the fold later on during the reverse motion. A regulating finger 328 with folded end 329 is provided, to hold the edges 297 folded flat, as they were folded by the first folding device, and to press the ends 297' against the front side 327 of plate 1304, before folding blade 1295 contacts the sealing end of bag 999. This regulating finger 328 (see Fig. 58) is fixed on block 303 of lever 299 of the first folding device and receives the necessary motion therefrom. After completion of the folding process, effected through the second folding device, the bag seal is in the form shown in Fig. 66a, which now has to be fastened by the staple 369.

A special device attaches staple 369. This device is spaced from the second folding device an arcuate distance equal to that from the second folding device to the first folding device. Therefore the bag 999, after one step of conveyor wheel 221, is positioned in front of the stapling device for affixing the sealing staple and for attaching a thread.

*Device for attaching the sealing staple and the thread*
*(Figures 176–186)*

The parts which form the sealing staple are to be differentiated from the parts which attach the sealing staple to the sealing fold and at the same time fasten the thread. The device is constructed in such a way that in one working operation one sealing staple is formed and simultaneously the sealing staple, formed by the previous working operation, is forced into the sealing fold.

The preferred form of the device for attaching the sealing staple and the thread is shown in Figures 176 to 186.

In forming the sealing staple the following parts are used:

On a shaft 1352, which is driven by the main drive of the machine and mounted on machine frame 15 by means of a bearing 1351 (not shown), an outer cover 1353 is rotatably mounted, which in turn is pivoted around shaft 1352 on a die bearing arm 1354 which is fixed on shaft 1352. The outer cover 1353 carries on one arm 1353' a staple guide which consists of outer guides 1353" fixed on arm 1353' and inner guide 1355 which is preferably interchangeably mounted on arm 1353'.

The staple guide, consisting of parts 1353" and 1355 which form a channel 1356, is positioned against anvil 1357 at the end of the pivotal movement of outer cover 1353, during which movement the sealing fold of bag 999, led in by conveyor wheel 221, is being placed between anvil 1357 and the front surfaces of parts 1353" and 1355.

A guide 1358 for wire 1361 is slidably mounted under the pressure of a spring 1359. This guide 1358 has a cavity 837 (Fig. 177) on its front side in which the wire 1361 lies parallel to shaft 1352. The staple 1369 is made from this wire. On the front side of guide part 1358 a nose 1362 is mounted extending outward.

The die bearing arm 1354 carries a pair of parallel bending dies 1364 and 1364' which slide on their inner sides along part 1358' of guide 1358, as they reach guide 1358 upon pivoting and, upon further pivoting, the notches 838 mounted on their inner sides engage the ledges 839 which are arcuate in form and mounted on the inner guide 1355.

As the bending dies 1364 and 1364' are swung along the front part 1358' of guide 1358, they contact wire 1361 lying in cavity 837 after the portion of the wire 1361 which is going to be formed into a staple 1369 has been cut off the continuous wire by one of the bending dies 1364 which acts like a blade. This cutting off is performed by the moving of bending die 1364' along a counterblade 1366 which is mounted on a part 1367 which in turn is fixed on outer cover 1353.

During this movement of bending dies 1364 and 1364' the wire 1361 which is located in cavity 837 is led along the slanting front part 840 of part 1358' and along front part 1362' of nose 1362. At the same time guide 1358 moves radially inward against the spring pressure, because wire 1361 itself cannot move radially outward inasmuch as channel 1356 is filled with ledges 1372 of die 1371 as will be explained later.

As soon as the wire meets the undersurface 1355' of guide part 1355, it is above a step 1362" in nose 1362, thus enabling guide 1358 to move radially outward again under the pressure of spring 1359 and thus positioning the wire 1361 between step 1362" of nose 1362 and undersurface 1355' of part 1355.

During the further pivotal movement of bending dies 1364 and 1364' the sides 1369" of the staple 1369, to be formed out of the wire 1361, are bent upward by the edges 841 of bending dies 1364 and 1364', by which process staple 1369 is completed.

Die bearing arm 1354 carries, in addition to bending dies 1364 and 1364', the previously mentioned die 1371 (Fig. 182) which effects the punching of staples 1369 into the sealing fold 998 of bag 999. This die 1371 can be adjusted according to the swinging movement of the dies, toward or away from the bending dies 1364 and 1364'. This adjustment is done by an adjusting screw 1373 which is screwed into an eye 1354' of die bearing arm 1354 and lies with its head 1373' on one end of die 1371.

Ledges 1372 of die 1371 and 839 of part 1355 form a chute as long as die 1371 stands during its swinging movement opposite ledges 839. The sides 1369' of staple 1369 are located in this chute as long as web 1369' of staple 1369 is situated between undersurface 1355' of part 1355 and stop 1362" of nose 1362.

At the same time when staple 1369 is being formed at this point, the die 1371 is punching into fold 998 of bag 999 staple 1369 which was formed during the earlier operation.

As die arm 1354, which carries bending dies 1364 and 1364' and die 1371 moves back, the channel 1356, up to this time filled with ledges 1372 of die 1371 becomes free as soon as the front part of die 1371 moves below the undersurface 1355' of part 1355. In this way the guide part 1358 is released to move radially outward under the pressure of spring 1359 and to press staple 1369 outward into the channel 1356. Now staple 1369 is in position ready to be punched in (Fig. 180).

During the following swinging forward of the die arm 1354 this staple 1369 is punched in and the next staple is formed from a new piece of wire fed in by the wire feeding device described below. While moving forward, the front part of die 1371 meets the web 1369' of staple 1369 and pushes the staple ahead through the chutes into channels 1356.

During this forward-pushing movement, the sides 1369" of staple 1369, if they are not already in the channels 1356, meet guideways 842 which form a bridge from the front surfaces of ledges 839 to the front surface of 1355 which borders channels 1356, and lead the sides 1369" into the channels 1356 in which the sides are further guided until they are punched into the sealing fold.

In case the sides 1369" are not bent exactly at right angles to web 1369', convergent surfaces 1356' of channels 1356 are provided to adjust sides 1369".

The drive of outer cover 1353 and die arm 1354 is produced in the same way as described hereafter for outer cover 353 and die arm 354.

An alternative embodiment for the staple forming and attaching mechanism is as follows (Figures 72–90):

An outer cover 353 is rotatably installed on a shaft 352, driven by the main drive of the machine and mounted in machine frame 15 by a sleeve 351, and is rotated around shaft 352 by a die bearing arm 354 which is fixed on shaft 352 (as will be described later).

Figure 89:
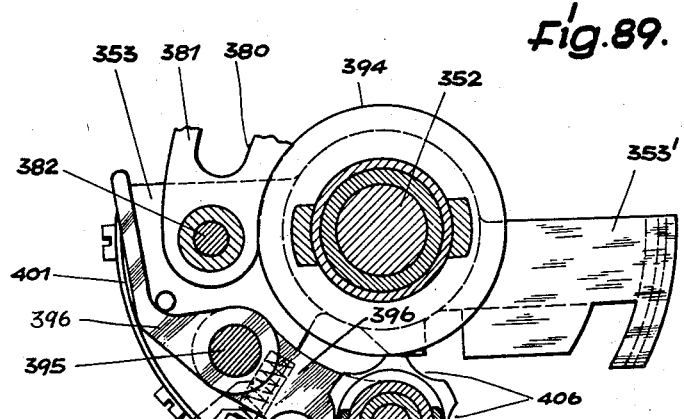
Figure 89 is a sectional view taken on line LXXXIX—LXXXIX of Figure 88.
Figure 90:
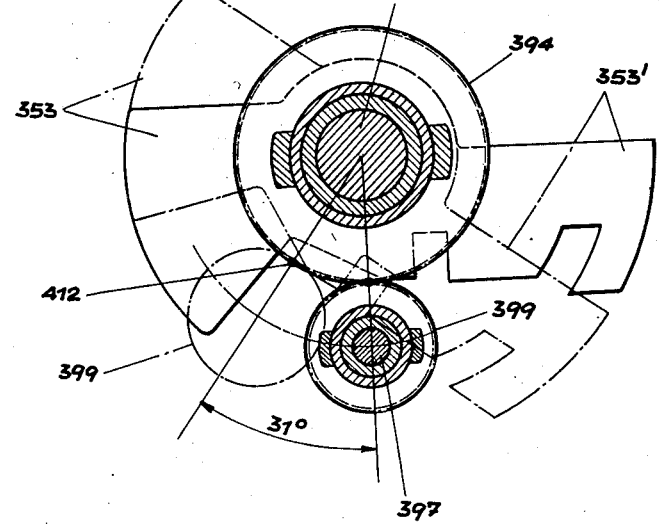
Figure 90 is a sectional view similar to Figure 89 with certain parts removed and showing the initial and final positions of the arm 253.

Referring to Figs. 87–89 the outer cover 353 carries on one arm 353' a staple guide which is composed of the outer guide part 353", which in turn is fixed on arm 353, and an inner guide part 355 (Fig. 83), which is removably installed. The staple guide, consisting of parts 353" and 355, forms a channel 356, at the end of the rotation against anvil 357, through which the staple may be fed to the sealing fold of the bag introduced between anvil 357 and staple guide 353", 355, 356 by conveyor wheel 221.

On the arm 353' a bending die 58 is removably positioned opposite to work against a spring 359. This bending die 358 has a step 360, in which wire 361, from which the staples are formed, lays, and which is parallel to shaft 352. On the front of bending die 358 a nose 362 is removably positioned so as to be urged outward by spring 363.

The die bearing arm 354 carries two parallel bending die faces which are led with their inner sides at the attachment 365 of the bending die, as soon as they catch up with the bending die upon rotation. The attachments 365 are bent archlike around the axis of shaft 352.

The bending dies 364, while being swung along the front part 358' of guide 358, catch the wire 361 lying in step 360 and fold it around the sides of part 358' after the part of the wire 361, which has to be formed into a staple, has been cut off from the continuous wire by the bending die 364', which acts as a blade. This cutting is effected by the movement of bending die 364' along a blade 366 (Fig. 88) which is fixed on a plate 367 which is fixed on the outer cover 353.

The bending dies 364 have sliding surfaces 368 at the sides facing each other, which receive the sides 369" of the formed staple 369 and pushes the web 369' of staple 369 outward. Below the sliding surfaces 368 a fork-shaped conveyor die 370 is installed which is fixed on die bearing arm 354 adjacent the bending dies 364. Outside this conveyor die 370 another die 371 is installed. This die 371 is led by rails 372 in corresponding guides of die bearing arm 354 and is adjustable in the direction of rotation of the bending dies 364 and the conveyor die 370. This adjustment is effected by a regulating screw 373 which is screwed into one eye 354' of die bearing arm 354 and lies with its nose 373' at one end of die 371.

Die 371 forms a channel together with the parts 374 of bending dies 364, which are next to the sliding surfaces 368. This channel is concentric with channel 356 but displaced inward one wire diameter and the inside width of the channel is a bit wider than the diameter of the wire.

As already mentioned, web 369' is pressed outward during and after bending of staple 369 by the sliding surfaces 368, so that web 369' is pushed into the channel formed by die 371 and surface parts 374, where the web is placed on the front side of conveyor die 370.

During this movement the sides 369" of staple 369 pivot around the edges which are formed by the surface parts 374 and the sliding surfaces 368, and at the same time staple 369 rises in such a way that its sides 369" lie tangentially to the arc of the front surface of conveyor die 370 as die bearing arm 354 swings around shaft 352.

In raising the staple 369 this way, its web 369' is brought out of step 360 and is carried by the conveyor die 370 around nose 362 which at the same time partially retracts against the compression spring 363. After web 369' of staple 369 has advanced part way along frontside 362' of the retreating nose, web 369' enters a step 362" of the nose after the nose, under the action of spring 363, has temporarily entered notch 370' of the conveyor die 370.

The nose 362 presses the web 369' of the staple outward with its step 362" in such a way that web 369' first lies at the inner surface of die 371 and later, after retreat of die 371 at the inner surface of guiding part 353". While staple 369 is being led around nose 362 through the conveyor die 370, the sides 369" of staple 369 are placed against a sliding surface 355' of the inner guide part 355. This has the effect that die 371, while advancing later, catches web 369' of staple 369 and the sides 369" of the staple are led into the channel 356. As the die advances, the staple 369 is pushed by die 371 through the channel 356 until its sides 369" are knocked through the sealing fold of the bag against anvil 357, whereupon the sides 369" are folded behind the sealing fold. The anvil 357 usually has a cavity 357' for this purpose.

In either of the above embodiments simultaneously with the knocking in of staple 369 into the sealing fold of the bag, a thread is also fastened to the bag, the other end of which will be attached to a label which will form part of the wrapper, all of which will be described later. In the device for attaching the sealing staple and the thread, the bags 999 are first connected to a continuous thread 375 which later is cut between adjacent bags.

The drive of outer cover 353 and of die bearing arm 354 works as follows, as the remaining operations, including the drive, are the same in both embodiments that will be described in relation to one only.

Die bearing arm 354 is fixed on shaft 352 which is driven in an oscillatory manner by the machine drive. Moving forward, the die arm moves around an angle of about 57°, for example. In the starting position the outer cover 353 as a lead of, for instance, 26° over the die arm 354. Both start swinging simultaneously. Taking this example, outer cover 353 has arrived at anvil 357 after a turn of 31°, while die bearing arm 354 still has to cover a distance of 26°. Coming back, die arm 354 runs back first 26° and then takes outer cover 353 with it for the balance of the way of 31°.

This sequence is effected by the following (Figures 72, 75): The die bearing arm 354 has fixed thereon a lever 376, whose end has an eye 377, in which a bolt 378 is fixed, which carries a roll 379. This roll runs in a closed curve 380 which forms part of a lever 381, which is hinged at 382 to the outer cover 353. The curve 380, which with lever 381 lies initially in an arc concentric with the shaft 352, has at its end, at which roll 379 rests in the starting position, an outward bend 380' (Fig. 72). The nose 381' of lever 381 is depressed during the above mentioned rotation of 31° by a cam surface 383 such that roll 379 cannot enter the concentrically formed part of curve 380 during the initial 31° rotation period of lever 381. The cam surface 383 is connected with the mounting 384 for shaft 352 and the entire device for attaching the sealing clamp and the thread. In this way outer cover 353 is led over this road from 318 by die bearing arm 354. After completing 31° of the way the nose 381' moves clear of the cam surface 383. At this time, the outer cover 353 is in contact with anvil 357. Outer cover 253 is therefore stopped, so that roll 379, urged further in an arcuate direction by die arm 354 tries to advance inside the curve 380. In this way the roll 379 swings lever 381 outward and moves out of bend 380' of curve 380 to enter the other part of the curve and make it possible for die arm 354 to finish the remaining 26° of the swinging movement. During this movement of 26° of die arm 354 the nose 381' contacts a sliding surface 383' of cam surface 383, providing a frictional force sufficient to maintain outer cover 353 against anvil 357.

Figure 80:
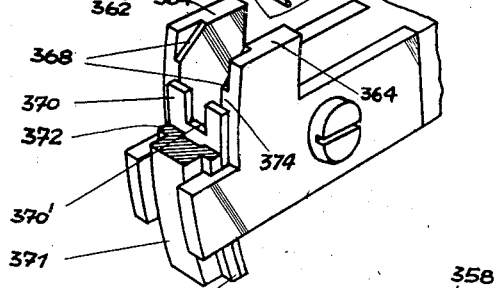
Figure 80 is a perspective view similar to that of Figure 79 showing the parts in their assembled position.
Figure 81:
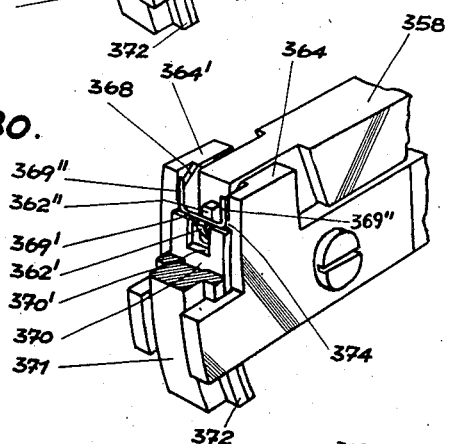
Figure 81 is a partial sectional view of the staple forming dies in intermediate position.
Figure 82:
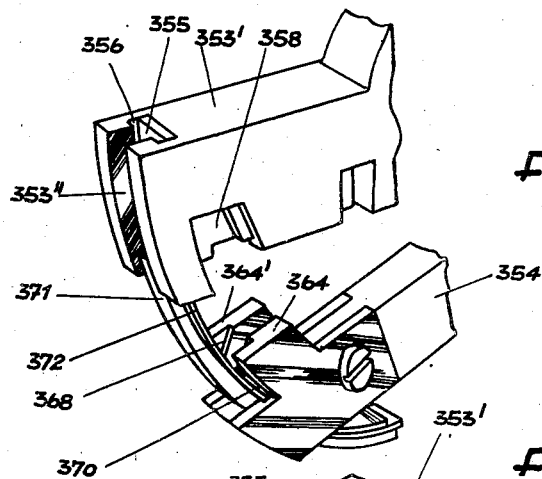
Figure 82 is a partial perspective view of the staple driving and forming dies.
Figure 83:
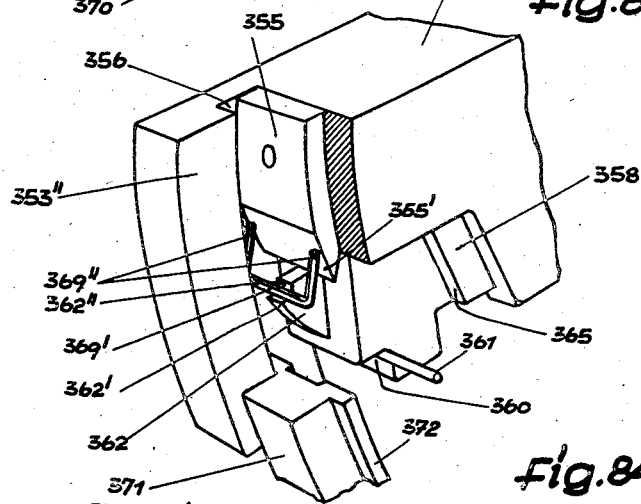
Figure 83 is a detailed perspective view of the final staple position preparatory to driving thereof.
Figure 84:
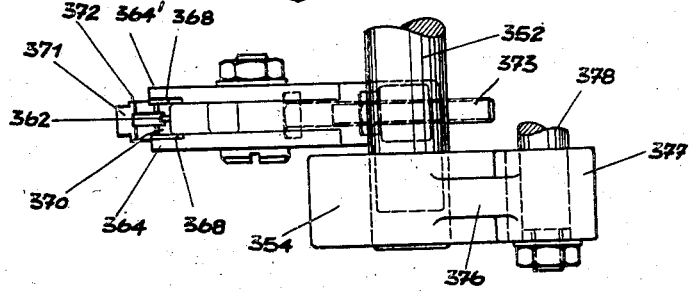
Figure 84 is a partial top plan view partly broken away taken approximately on line LXXXIV—LXXXIV of Figure 74.

Figure 72 shows the starting position. Figures 73, 82 and 83 show the positions after rotations of 31°. Figures 77 and 81 show the intermediate positions after die arm 354 has rotated further, and Figures 74, 78 and 80 show the final position after completion of the rotation of 26° by die arm 354 alone in addition to the common rotation of 31° of die arm 354 and outer cover 353. Figure 78 shows a staple 369, driven in by the anvil 357 during the balance of the rotation, and a staple 369 prepared for the next stitching, which waits to enter the channel 356. After the staple has been driven in by die 371, the die bearing arm 354 alone rotates back for an angle of 26°. As this rotation takes place, roll 379 runs along in curve 380. At the end of this rotation of die bearing arm 354, the roll 379 reaches the bent part 380' of lever 381 and enters therein, so that during the further rotation of die bearing arm 354 over the remaining 31°, outer cover 353 is coupled with die bearing arm 354, because the nose of 381' of lever 380 is again depressed under the cam surface 383.

To insure the proper orientation of the sealing fold 998 of bag 999, which is between anvil 357 and outer cover 353 by the rotation of conveyor wheel 221 in a proper way, the anvil 357 is given a rotating motion such that it is swung out of the binding position while the nose-sealing fold 998 is swung into the binding position, and that anvil 357 after the nose-sealing fold 998 is in position is again swung into the binding position. Now the nose of sealing fold 998 lies against the lower side of anvil 357. The rotation of anvil 357 is effected by mounting anvil 357 on the end of lever 385 which is fixed on a bolt 386, which in turn is rotatably mounted on mounting 384. Also fixed on bolt 386 is another lever 387 which carries a roll 388 at its end. A surface 390 bent cylindrically around the axis of shaft 352 is fixed on shaft 352 by a radial pin. This surface 390 has a closed curve 391 in which a roll 388 runs. The curve is bent according to the desired movement of anvil 357.

While being swung into the binding position, the sealing fold 998 of bag 999 enters the path of thread 375 which is fed from above and runs down to the previously bound bag.

Through the combined motion of anvil 357 and outer cover 353, the thread 375 is put around sealing fold 998 in such a way that, while binding, it is caught on both sides of sealing fold 998 by the clamp 369.

*Feed of the wire for forming the staple (Figures 91–100)*

The feed of the wire for forming the staple is effected by the following parts: Ratchet wheel 392, toothed wheel 393 and a wire-feeding roll 394 which has a knurled periphery are rotatably mounted as a unit. Toothed wheel 398, which gears into wheel 393, and a wire-feeding roll 399, with knurled periphery, which works with feeding roll 394, and a locking wheel 400 are mounted on lever 396, which is rotatably mounted at 395 on outer cover 353 through bolt 397. On outer cover 353 a flat spring 401 is installed, which presses against lever 396 and causes the toothed wheels and the wire-feeding rolls to engage one another. On lever 396 another two-armed lever 403 is fixed at 402, one side 403' of which is placed under the effect of a pressing spring 404 which is fixed on a step 396' of lever 396. On the other side of lever 403 a roll 405 is fixed which engages locks 406 which are installed on the periphery of locking wheel 400. A guide 407 is installed in the direction of feed of the wire in front of wire feeding rolls 394 and 399 which leads the wire in between the feeding rolls. Behind feeding rolls 394 and 399 the wire 361 runs through an arc-like guide into step 360 of bending clamp 358.

The toothed wheels 393 and 398 work like planetary gears. If wire feeding is to take place, a lock pawl 411 (Fig. 91) is in engagement with ratchet wheel 392, but if no feeding is contemplated, the lock pawl 411 is out of engagement.

The wire feeding takes place during the 31° while outer cover 353 and die bearing arm 354 are moving back. Therefore, while these two parts advance, no wire feeding takes place.

The outer cover 353 completes a rotation, through which movement lever 396, fixed on the outer cover at 395, is rotated likewise. On lever 396 the lower wire feeding roll 399, the toothed wheel 398 and locking wheel 400 are fixed. Locking wheel 400 and consequently wheel 398 and the lower wire feeding roll 399, all three of them being fixed as a unit, are secured against rotation by roll 405, fixed on the two-armed lever 403. Roll 405 is urged by spring 404 into a lock 406 of locking wheel 400. Toothed wheel 393 is geared to wheel 398. Wheel 393, wire feeding roll 394 and ratchet wheel 392 are also joined as a unit.

During the feed of outer cover 353 the toothed wheel 398 is arrested, while wheel 393 which meshes with 398, is rotatable on shaft 352. Therefore wheel 393 and also ratchet wheel 392 are taken along with toothed wheel 398 and cover 353. As can be seen from Figure 91 which is a view from the opposite side of the assembly from Figures 87, 89 and 90, locking wheel 392 has to move clockwise, while the effect of pawl 411 is eliminated. Therefore no relative movement between toothed wheels 393 and 398 takes place and neither therefore between wire feeding rolls 394 and 399. Thus the wire is taken along. The spot 412 of the wire, where it is caught by the wire feeding rolls, moves therefore through an arc of 31°, which corresponds to the periphery of the upper wire feeding roll 394.

The regular wire feed takes place relative to outer cover 353, while the outer cover 353 follows the die arm 354 to complete the remaining 31° after the latter has completed 26° of the return, since the wire remains arrested and the outer cover 353 completes its backward movement.

From Figure 91 it can be seen that in this case the pawl 411 arrests the lock wheel 392 and therefore also toothed wheel 393 and upper wire feeding roll 394. Consequently, while outer cover 353 goes back, wheel 398 has to rotate like a planetary gear around the arrested wheel 393, while locking wheel 400 rotates against roll 405 and locks 406 against the pressure of spring 404. Consequently the lower wire feeding roll rotates correspondingly, i. e., it rolls along the wire while pressing it on the upper wire feeding roll 394. The wire therefore does not move in its longitudinal direction but has, at the end of the backward movement of outer cover 353 in relation to the original contact points on the wire feeding rolls 394 and 399, received a relative feed which measured in wire length is $31\%_{60} \times \pi \times D$ where D corresponds to the diameter of the upper wire feeding roll 394 plus the diameter of the wire 361. This wire length equals the stretched length of a staple 369.

From the above it follows that no wire feed takes place, if during the backward movement of outer cover 353 pawl 411 is released. The release of pawl 411 is effected through a mechanism to be explained below, which is provided for the purpose of arresting the wire feed so that no staple is formed or knocked on the anvil 357, if no bag 999 is led into the binding device.

To illustrate the sequence of operation and interlocking relationship of this mechanism, reference is made to Figures 94 through 97 which characterize the different phases.

As mentioned before, during the rotation of outer cover 353 and die arm 354, a prepared staple 369 is knocked into the sealing fold 998 of a bag 999 by the driving die 371, and at the same time a second staple 369 is formed by the bending dies 364 and brought into feeding position by the conveyor die 370. During the joint backward movement of the outer cover 353 and die arm 354 a sufficient length of wire is fed for the forming of a staple 369.

In Figures 94 through 97 the conveyor wheel 221 is schematically inscribed with a number of positions I to VI, on which bags 999 are held in radial direction by levers 230 and 231.

Figure 94:
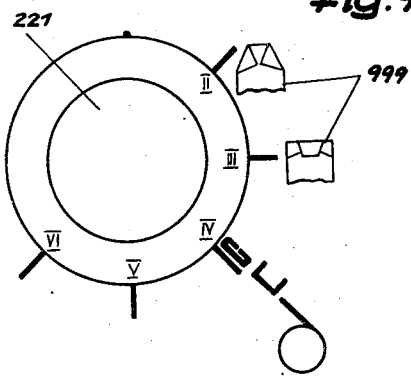
Figures 94 through 97 are schematic illustrations of the interlock between the sealing-fold forming device and the wire feeding and staple forming device.
Figure 95:
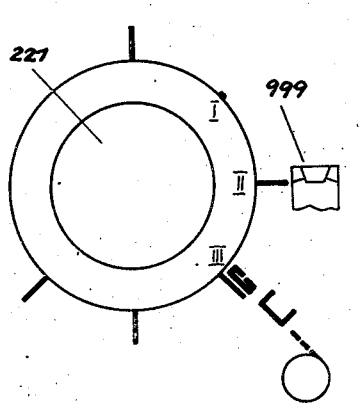
Figure 96:
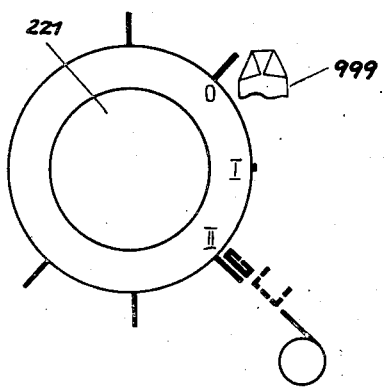

In Figure 94 it can be seen that at position I for some reason no bag has been picked up by levers 230 and 231. At point II the bag there receives the first sealing fold, at point III the bag there receives the second sealing fold and point IV is just opposite the binding device. At the binding device one staple is knocked into the fold, a second staple is formed, and the wire fed for the next operation. If point I, which has no bag, is moved one step of the conveyor wheel (Fig. 95), the bag of point III is opposite the binding device, while the bag of point II receives the second sealing fold.

In this position of the conveyor wheel the feeling device, mounted on the device for forming the first fold, does not find any bag at point I. This feeling device therefore controls the wire feeding in such a way that no wire feed takes place.

If the conveyor wheel 221 turns another step (Fig. 96) point I is in front of the second fold-forming device, and point II is opposite the binding device. Now the clamp, which was formed during the previous step, is knocked in, but no new clamp is formed and prepared, because during the preceding operation no wire feed took place. But now a wire feed takes place, because a bag is now again at point O opposite the device for forming the first fold.

Figure 97:
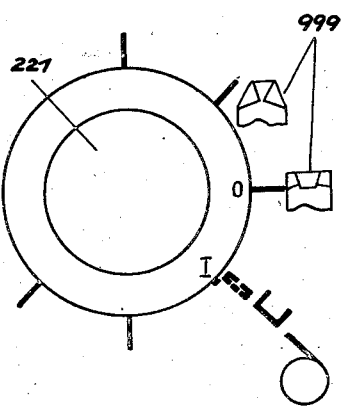

In Figure 97 point I is opposite the binding device. It is obvious that as there was no bag at point I no bag was prepared and no clamp can be knocked in, because no clamp was formed and placed in prepared position during the preceding operation. But now again a clamp is formed and prepared from the wire piece fed in the last operation and the wire again is fed.

To accomplish this, the previously mentioned two-armed lever 416 is furnished with a feeler 413 which finds out whether a bag has been fed to the first fold-forming device.

Figure 91 shows in its upper portion the position of the two-armed lever 416 when the feeler 413 cannot move through the breakthrough 415 of folding blade 295 because of the presence of a bag 999 in the folding device. As described above, rotation of lever 416 during folding is counterclockwise.

On sleeve 296 a bolt 417 is fixed on which lever 418 is rotatably mounted, which in turn is fixed to lever 419, also rotatably mounted on bolt 417. A pawl 420 is mounted at the end of lever 418 at 421. Pawl 420 is urged counterclockwise by the pressure of spring 422 and has a limiting stop pin 423.

As folding lever 294 with two-armed lever 416 moves from the starting position (Fig. 98) before the folding process, into the final position (Fig. 91), pawl 420 is affected only very slightly, if a bag is positioned in the folding device. However, if there is no bag fed into the folding device, feeler 413 can penetrate the breakthrough 415 of folding blade 295 permitting further counterclockwise movement of two-armed lever 416 from that shown in Figure 81 to the position shown in Figure 99. In this position pawl 420 can move under pressure of spring 422 below nose 424 of two-armed lever 416, until stopped at pin 423.

The folding lever 294 and also two-armed lever 416 return in a clockwise direction (Fig. 99), after the folding operation so that when no bag was present nose 424 of two-armed lever 416 presses against the front surface 420' of pawl 420 and turns lever 418, which carries pawl 420, clockwise around the axis of bolt 417, until the nose 424 has slid down off the front surface 420' of pawl 420 and passes the pawl. This point is shown in Figure 100.

This rotation of lever 418 is transmitted through lever 419 fixed thereto to one end of a rod 410, the other end of which is pivoted to lever 409 (Figs. 91 and 100). Lever 409 is fixed on bolt 408 on which lock pawl 411 is also fixed, bolt 408 being rotatably mounted on mounting 384.

Therefore, the movement of lever 418 at the beginning of the reverse movement of folding lever 294 moves lock pawl 411 out of locking wheel 392. Lock pawl 411 is held in this position by catch 425, formed like a two-armed lever, which is rotatably mounted on bolt 426, which is also mounted on mounting 394. One side of catch 425 is pulled against lever 409 by tension spring 427. Both lever 409 and catch 425 have a nose 409' and 425', respectively, which hold lever 409 in its released position, therefore maintaining lock pawl 411 released, after nose 424 of lever 416 has passed pawl 420.

The release of pawl 411 as explained above, renders the wire feeding device inoperative.

Simultaneously with the reverse movement of folding lever 294 of the first fold-forming device, the reverse motion of outer cover 353 of the stapling device takes place. This reverse movement is effected by a rotation of shaft 352. This shaft carries the bent surface 390, which contains closed curve 391 for controlling the movement of anvil 357.

At the end of the reverse motion of outer cover 353 the edge 390' (Fig. 100) of the bent surface pushes against the side 425' of catch 425 and rotates it around bolt 426. Nose 425' of catch 425 then moves along nose 409' of lever 409 until the edge of nose 409' has passed the edge of nose 425'. Tension spring 427 is temporarily stretched by this operation and thus pulls lever 409 rotating lock pawl 411 so that it comes into engagement again with lock wheel 392 after the edges 409' and 425' have passed since it cannot move catch 425, because the catch is held by bent surface 390. Figure 93 is a view of the assembly of the side opposite to that shown in Figures 91 and 100.

*Cutting and guiding the thread, Figures 101 to 108a*

Positioned opposite the next stop of conveyor wheel 221 is the device for the cutting of the thread and immediately preceding it, in the direction of rotation of the wheel, is a guiding device for the thread.

The device for guiding the thread consists of a disc 428 mounted on shaft 429. This shaft 429 is mounted in a bearing 430 which is directly fixed on machine frame 15, and is driven by the machine drive in such a manner that disc 428 makes half a rotation counterclockwise in Figures 101 and 102, and in Figure 104 clockwise, as conveyor wheel 221 passes from one position to the next (Fig. 38).

A cam disc 431 is fixed to bearing 430 so as to guide two angle levers 434 and 435 hinged to plate 428 at 432 and 433, respectively. These angle levers are provided to guide and clamp the thread 375 at the appropriate moments. A roll 436 is rotatably mounted on the end of sides 434' and 435' of angle levers 434 and 435 respectively. The rolls 436 are maintained in contact with the cam disc 431 by springs 437 which are fastened at one end to disc 428. A hook 438 (Fig. 105) provided with a groove 439, is mounted on the end of the other sides 434'' and 435'' of angle levers 434 and 435 respectively. The front surface of the hook is indicated by the numeral 440.

At diametrically opposite points the disc 428 is provided with cutouts 441, in the bottom of which a flat spring 442 is mounted, whose free end is bent to form a hook 443. The hooks 443 of the springs 442 and the cutouts 441 are positioned on disc 428 in such a way that the hooks 438 of angle levers 434 and 435 can swing inside the hooks 443. The disc 428 also has on its periphery a groove 444 in which the thread can be inserted.

The device for cuting the thread is fixed on plate 445 which is mounted on eye 446 of a device which will be described later. A shaft 447 is also mounted in the eye which, as will be described, rotates in an oscillatory manner. The hub 448 (Figs. 106, 111) of a tooth segment 449 is mounted on this shaft 447. Segment 449 is in turn geared to a tooth segment 450 which is mounted on one end of a two-armed lever 451. This lever 451 is rotatably mounted on shaft 453 which is mounted in a hole 454 of plate 445. At the other end the two-armed lever 451 carries a shear blade 455. A second shear blade 456 is fixed on a lever 457 which is rotatably mounted on a second shaft 458. This second shaft 458 is mounted in a second hole 459 of plate 445.

A tooth segment 460 is also rotatably mounted on bolt 453 and is rotated by lever 451 through two pins 461. This segment 460 meshes with tooth segment 462, which is rotatably mounted on shaft 458 and connected with lever 457 through a pin 463. Through the tooth segments 460 and 462, lever 457 is driven by lever 451 so that the shear blades 455 and 456 perform a shearing movement.

Shaft 453 and the other end of shaft 458 are mounted in holes of plate 467 which, together with plate 445, encloses the gears of levers 451 and 457 and their tooth segments 460 and 462.

On bolt 453, next to plate 445, eye 452 is rotatably mounted (Fig. 108). On its periphery a flat spring 464 is mounted in such a manner that its ends 464′ and 464″ project radially therefrom. In addition these ends 464′ and 464″ are broadened to overlap plate 445. The end 464′ is designed to touch surface 465 of plate 445, to seal the top of a cutout 466 in this plate, so that a slit is formed between end 464′ and cutout 466.

The other end 464″ of flat spring 464 is engaged on its upper surface by pin 469 which is fixed on lever 451 (Figs. 107a, 108a). End 464″ is under the pressure of spring 470 which is mounted in hole 471 of plate 445 and presses against the under side thereof. Spring 470 urges end 464′ against surface 465, while pin 469 can effect the opposite movement of end 464′.

In front of plate 467 a plate shaped part 472 is rotatably mounted on bolt 453 and held by a cap 453′. A vertically extending flat spring 473′ is mounted on an axially extending arm 473, of plate 472, which carries a plate 473″, running transversely to the axis of bolt 453 and which has a cutout 473‴, open at the top. The plate 472 has an extension 472′, directed downwards, whose front surface 472″ can butt against adjustable stop 777 mounted in eye 778. This eye 778 projects outwardly from plate 467 and is threaded. Extension 472′ is urged against stop 777 by tension spring 782, one end of which is attached to plate 472 through pin 781 and the other end of which is attached to plate 467. Plate 472, however, can be moved against spring 782.

Additionally there is mounted on lever 451 a plate 780 having a nose 779 which contacts the upper edge of arm 473 while the shear blades 455 and 456 are open.

Thread piece $375_1$, which had connected bag $999_1$ with the preceding bag and which was cut during the earlier operation, is led at this phase by bag $999_1$, through the cuting device and is clamped in the cutout $441_1$ on the periphery of disc 428 between spring $442_1$, and hook 438 in such a manner, that a small piece still hangs down. In this position the thread piece $375_1$ lies in the notch formed by nose 779 of plate 780 and spring 473′ which are contacting each other at this time.

Figure 101:
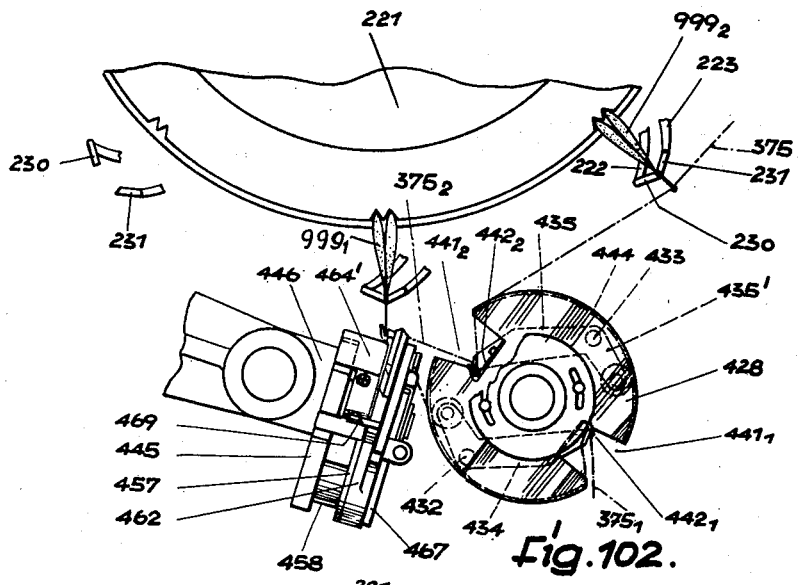
Figure 101 is a partial side view of the thread guiding and cutting station for the first conveyor wheel showing the conveyor wheel, with a bag positioned thereon, stopped opposite the cutting device.

Figure 101 shows the position of the conveyor wheel 221 just after being arrested.

While the device opposite bag $999_2$ starts operating to knock in the sealing staple and attach thread 375 to bag $999_2$, as explained above, shaft 447, also starts rotating. This movement is transmitted by segments 449 and 450 to lever 451 and by segments 460 and 462 to lever 457 in such a way that shear blades 455 and 456 cut thread piece $375_2$ at a spot which is close to bag $999_1$. The rotation of shaft 447 is short. During the reverse rotation the shear blades 455 and 456 part again.

While thread piece $375_2$ is being cut by shear blades 455 and 456, the plate 780 mounted on lever 451 moves away from spring 473′ so that thread piece $375_1$ falls into notch 473‴. When the shear blades 455 and 456 part again, plate 780 starts moving again toward spring 473′, while nose 779 prevents the escape of thread piece $375_1$ out of notch 473‴ (Fig. 107). Simultaneously, the front wall 451′ of lever 451 contacts arm 473 so that the thread piece is clamped lightly therebetween.

Figure 102:
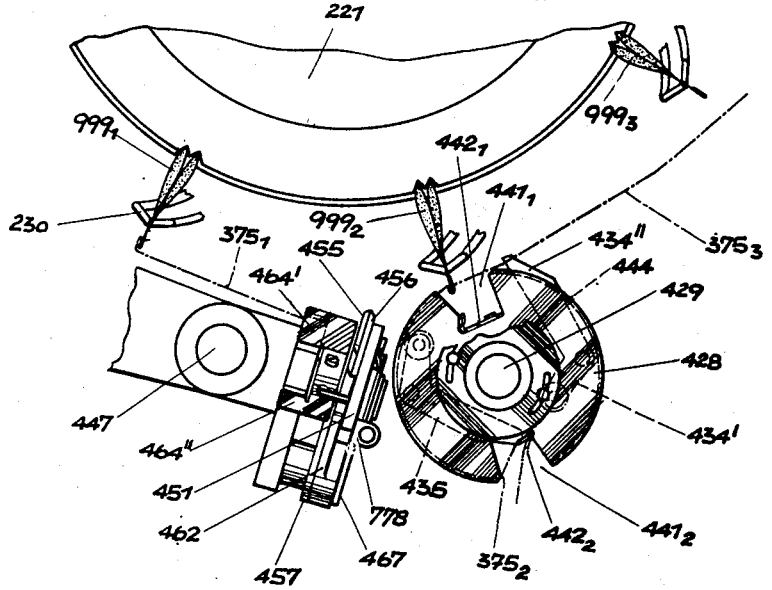
Fig. 102 is a view similar to Figure 101 showing the conveyor wheel in an intermediate position.

As the conveyor wheel 221 moves from the cutting device to the next position, disc 428 continues to rotate (counterclockwise in Fig. 101). During this process bag $999_1$, and cutout $441_1$, of plate 428 are moving apart, and therefore thread piece $375_1$ is pulled by bag $999_1$ from between spring $442_1$ and hook 438 of lever 434 and thence between flat spring 464′ and cutout 466 of plate 445, since it is clamped between wall 451′ of lever 451 and arm 473 (Figs. 102 and 108).

As yet flat spring 464′ does not lie on surface 465 of plate 445. As soon as the following thread piece $375_2$ has been cut by shear blades 455 and 456, the pressure of bolt 469 on end 464″ is released and the flat spring 464, attached to eye 452, moves in such a way that the end 464′ contacts surface 465 of plate 445.

The cutout 466 is of such dimensions that in this instance thread piece $375_1$ is lightly clamped between the end 464′ of flat spring 464 and the surface of cutout 466 so that thread piece $375_1$ can be pulled through.

Simultaneously thread piece $375_1$ is released from the front wall 451′ and the arm 473. Therefore flat spring 464 and cutout 466 on one side, and front wall 451 and arm 473 on the other side, alternated in clamping thread piece $375_1$. The pulling through of thread piece $375_1$ between end 464′ of flat spring 464 and the surface of cutout 466 is effected, as will be described, through the movement of tongs 478 and 479.

By rotation of disc 428 the part of thread piece $375_2$ which is situated between spring $442_2$ and bag $999_2$ is rolled in the groove 444 on the periphery of disc 428, to the same extent as bag $999_2$ follows thread piece $375_2$. In this way an intermediate position is created (Fig. 102), in which bag $999_2$ has not yet arrived in front of the cutting device, but is situated in front of cutout $441_1$. In this position the thread piece $375_3$, pulled by bag $999_2$, is caught by hook 438 of lever 434 which, guided by curve 431, has loosened itself from spring $442_1$, and has been swung out of cutout $441_1$.

As the rotation is continued lever 434 passes with its sloped front surface (Fig. 103) along thread piece $375_3$ until the thread piece snaps under the hook 438. Next bag $999_2$ moves in front of the cutting device, while thread piece $375_2$ moves between the open shear blades 455 and 456 and, as it is being held at its other end by flat spring $442_2$, snaps under nose 779 of plate 780 and enters cutout 473‴ of plate 473″. At the same time the upward pointing flat spring 473′ is pressed sidewards against the effect of the weak tension spring 782 by the rotation of the plate shaped part 472 around bolt 453.

During the same period spring 442 and lever 434, through the rotation of disc 428 and guiding of lever 434 by curve 431 assume the same position as spring $442_2$ and lever 435 had been in before the start of the movement as shown in Fig. 101. During this process the part of thread piece $375_3$, which is situated between lever 434 and bag $999_2$, is positioned around hook 438 of lever 434, into the groove 439 of hook 438 and is clamped between groove 439 and spring $442_1$, in such a manner that it can later be pulled through between them. As soon as bag $999_2$ arrives in front of the cutting device at the same spot where bag $999_1$ was before (Fig. 101), the cutting process is repeated, as described above.

*Transfer of bag from first to second conveyor wheel (Figures 109–122)*

After a bag has left its position in front of the cutting device because of a new partial rotation of conveyor wheel 221, it arrives, at the end of this movement, at a device which takes the bag from the conveyor wheel 221 and places it on a second conveyor wheel, which is differently formed, but which also rotates intermittently.

The device for the transfer of the bag consists principally of a reversing wheel 475 which has two chambers 476 and 477. Bag 999, which has arrived opposite a chamber, for instance 477 (Fig. 110), is caught by tongs 478 and 479, which enter chamber 477 through a slit 480 of the chamber wall 481 and simultaneously released by levers 230 and 231. Tongs 478 and 479 pull bag 999 into chamber 477 after bag 999 is released.

Next, the reversing wheel 475 completes half a rotation during the period required for both conveyor wheels to move one step forward. The bag 999 in the chamber 477 (Fig. 110), after the completion of a half a revolution of reversing wheel 475, reaches the position of bag 999' in chamber 476 in Figure 112. While bag 999 is led by tongs 478 and 479 into chamber 477, bag 999' is expelled from chamber 476 by a tool 482 which holds it during expulsion. The bag is separated from the tool by a stripper 483, after having been caught by a flap 530 and plate 546 which are fixed to the second conveyor wheel 474.

Figure 115:
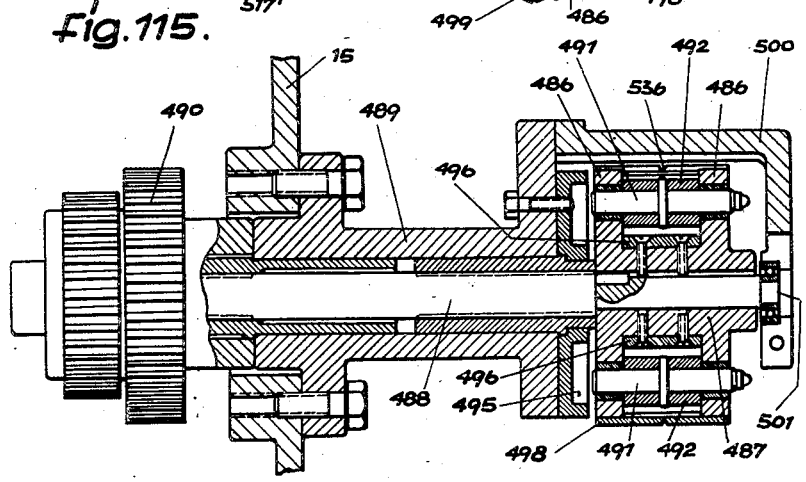
Figure 115 is a sectional view taken on line CXV—CXV of Figure 112.

The reversing wheel consists of two plates 486 which are joined through a common hub 487 (Fig. 115). This hub is mounted on shaft 488 which is mounted in bearing 489 which is fixed on machine frame 15. Behind the machine frame the driving wheel 490 is fixed on shaft 488. On bearing 489 an angle arm 500 is also mounted which projects over reversing wheel 475 and down the side where the other end of shaft 488 is mounted at 501. Two bolts 491 are fixed parallel to shaft 488 in plates 486. Hinged to each of them by an eye 492 is a chamber wall 481. The chamber walls extend along the plates 486 spaced a short distance from them, and together with the side walls of plates 486 form two chambers. The chamber walls 486 are arcuate, corresponding to the arcuate movements of tongs 478 and 479 and of tool 482. Each chamber wall 481 has thereon an eye 493 on which a roll 494 is mounted. These rolls 494 run in a closed curve 495 which is fixed to bearing 489.

On hub 487 two plates 496 (Figs. 115 and 118a) mounted diametrically opposite each other, carry a pair of forks 497 to hold bag 999. Plates 498 are mounted on the end surfaces of plates 486 and carry the guide pieces 499, which engage the sides of bag 999 as it is drawn into chambers 476 and 477 respectively.

Bearing 489 carries two parallel frames 502 (Fig. 111) whose ends have eyes 503 which are axially aligned in pairs. In the one pair of eyes 503' is mounted the previously mentioned shaft 447 which carries the tooth segment 449 for the working of the shear blades 455 and 456.

On shaft 447 an angular lever 504 (Fig. 117) is mounted whose bent side forms the side 478 of the tongs 478 and 479 and has therein a slit at the end (Fig. 118). The other side of the tongs 479 is formed like a two-armed crank lever and is fixed on side 478 at 505. The other arm 506 of this two-armed crank lever carries at its end a roll 507, which runs on a curve 508 which is mounted on a plate 526 carried by the eye 503' next to it.

The side 479 of the tongs is biased by a spring 509 which is fixed in a hole in angular lever 504. The spring 509 tends to urge the sides 478 and 479 of the tongs together.

Figure 121:
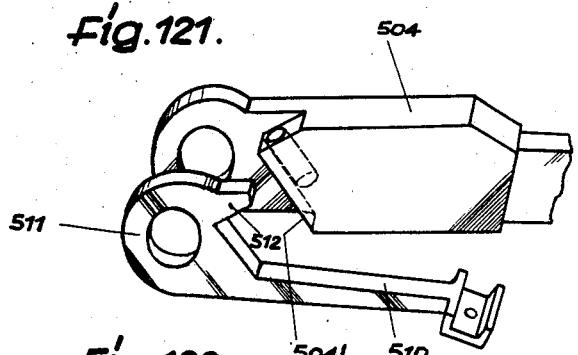
Figure 121 is an exploded perspective view of the tong lever 504 and guiding lever 510.
Figure 122:
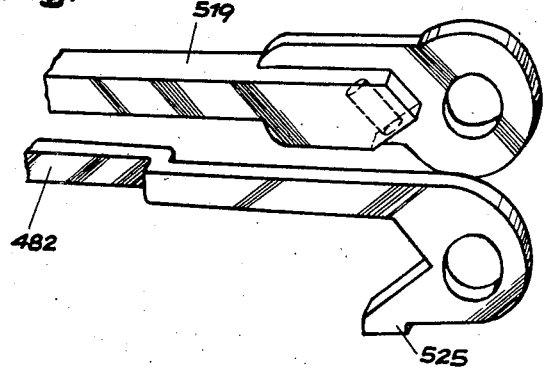
Figure 122 is a view similar to Figure 121 showing the hub arrangement of the bag expelling arms.

Also rotatably mounted on shaft 447 is another lever 510 whose hub 511 has a nose 512 (Fig. 121). The width of the hub of lever 504 is reduced about the hub 511 of lever 510, so that lever 504 has a sep 504' in which a spring 513 is mounted so as to press against the nose 512 of hub 511 of lever 510. A block 514 is fixed on the free end of lever 510 forming a step thereon which works together with a nose 515 of arm 506. The block 514 is pressed by spring 513 against nose 515 while nose 515 is positioned in front of block 514 during that portion of cycle in which the tongs are closed.

A shaft 516 is mounted in eyes 503" which is also driven by the main drive. A hammer-like arm 482 is rotatably mounted on this shaft. The head 517 at the end is formed with a lip 517' capped at the tip thereof by a flat spring 518, so that the tip of head 517 and spring 518 together form a resilient gripping device. Head 517 of tool 482 is surrounded on three sides by stripper 483 which also is mounted on hammer-like lever 519, which in turn is fixed on shaft 516.

Head 517 of tool 482 and stripper 483 are curved in an arc around shaft 516.

The hub 520 of tool 482 is thicker than the tool, while hub 521 of lever 519 is thinner than lever 519. Therefore, two steps 520' and 482' are situated opposite to each other. In a hole in step 482' a spring 522 is installed which presses on step 520' of tool 482 in such a way that head 517 of tool 482 is pressed into stripper 483. On frame 502 a stop 524, provided with a step 523, is fixed, which works together with a nose 525 of hub 520 of tool 482.

Figure 112:
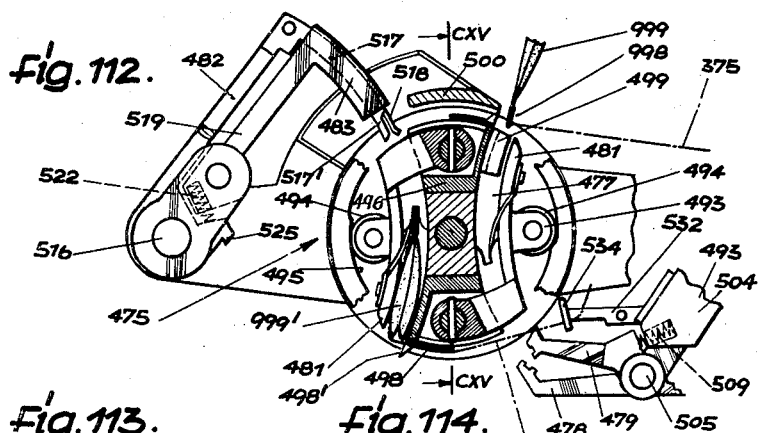
Figure 112 is an enlarged detailed view partially broken away of the transfer wheel of Figure 109.

The operation of the device for transferring the bag from the first conveyor wheel 221 to the second conveyor wheel 474 is as follows:

When the conveyor wheel has come to a stop at the device for transferring the bag, bag 999 is positioned in front of chamber 477 of reversing wheel 475. The open tongs 478 and 479 are outside of reversing wheel 475 (Figs. 109 and 112). As soon as conveyor wheel 221 has come to a stop, the shafts 447 and 516 start rotating. The rotation of shaft 447 also rotates angular lever 504. Through this movement the ends of tongs 478 and 479 enter chamber 477 through the slit 480 of chamber wall 481 and pass through it until they surround the sealing fold 998 of bag 999.

Lever 510 swings initially with lever 504, because spring 513 presses on nose 512. By a stop 527, movably attached to plate 526 (Fig. 109), a lever 510 is partially held back toward the end of the rotation of angular lever 504 (Fig. 110). Through this slight retarding of lever 510 against the effect of spring 513, nose 515 of arm 506, positioned initially (Fig. 109) in the step between the end of lever 510 and block 514, is moved by spring 509 in front of stop 514 (Figs. 110 and 117), through which movement tong 479 approaches tong 478 to catch the sealing fold.

Because the tong sides 478 and 479 are slit (Fig. 118) the thread 375, pulled by bag 999, is no obstacle, as the slit of tong 479 picks up thread 375.

Figure 41:
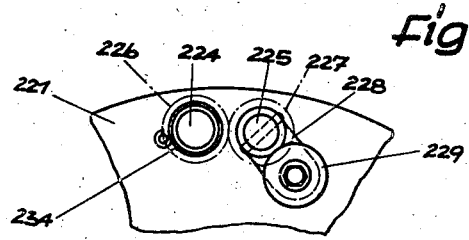
Figure 41 is a fragmentary side view of the conveyor arm hubs and control cam for one position on the conveyor wheel.
Figure 57:
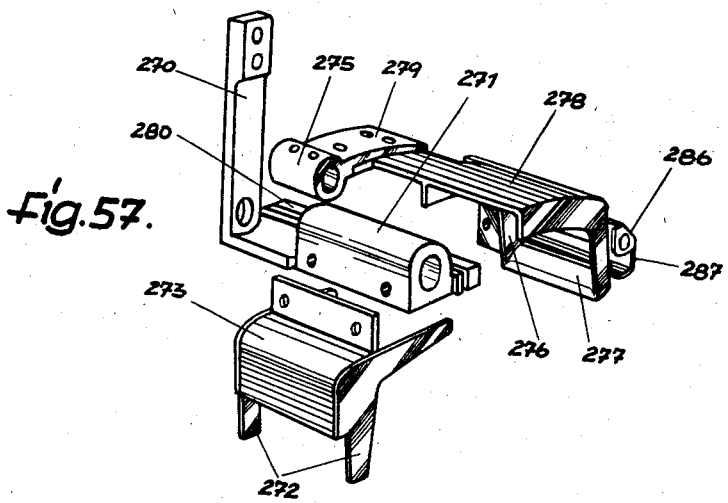
Figure 57 is an exploded perspective view of the folding device of Figure 52.

As soon as tongs 478 and 479 have caught sealing fold 998 of bag 999, the levers 230 and 231 of conveyor wheel 221 release bag 999. This is done by a short rotation of curve 528 located about the outer portion of conveyor wheel 221 (see Figs. 38, 40 and 41) which moves rolls 229 which rotate levers 230 and 231, as described earlier, through the rotation of curve 528. Simultaneously, the levers 230 and 231 of the lever pair, which are opposite the device, which forms the bottom fold of a bag, grip a new bag.

After bag 999 has been caught by tongs 478 and 479, shaft 447 reverses its rotation and through tongs 478 and 479 pulls bag 999 into chamber 477 until sealing fold 998 is stopped in the forks 497 (Fig. 118a). At the same time tongs 478 and 479 are opened by a roll 507 mounted on side 506 of tong 479 which runs on edge 508' of curve 508 to pull nose 515 from the face of block 514 into its initial position in the step between the end of lever 510 and block 514 where it is caught and held by the action of spring 513. The tongs are thus once again in their initial open position.

Now the reversing wheel 475 rotates half a revolution during which time the conveyor wheel 221 brings the next bag into proper position. During the half revolution of reversing wheel 475 the rolls 494 of sidewalls 481 of chambers 476 and 477 run on curve 495 in such a manner that, on the one hand, roll 494 of chamber 477 runs on an elevated part of curve 495, by which movement the wall 481 of this chamber is rotated around the corresponding bolt 491 and clamps bag 999, while on the other hand roll 494 of chamber 476 runs off an elevated part of curve 495, so that wall 481 of chamber 476 is rotated around the corresponding bolt 491 in such a way that bag 999', clamped between chamber wall 481 of chamber 476 and the sidewalls of plates 486, belonging to chamber 476, is released.

After the half rotation of reversing wheel 475, bag 999 is situated at the spot at which bag 999' is sketched in Figure 112. In the description, bag 999' is of course the one which ran on conveyor wheel 221 ahead of bag 999.

While therefore bag 999 is put into the chamber 477 by tongs 478 and 479, bag 999' is expelled from chamber 476 by tool 482. Tool 482 moves together with stripper 483, on account of the rotation of shaft 516, during which movement tool 482 and lever 519 pass through a slit of wall 481 of chamber 476 and catch at the same time sealing fold 998' of bag 999' between lip 517' and flat spring 518. In this way bag 999' is pushed out of chamber 476 sufficiently far to be placed between a pair of fingers 529 and a flap 530, both of which form parts of second conveyor wheel 474 (Fig. 123). As soon as the bag is placed between these two parts, nose 525 of tool 482 contacts step 523 of stop 524, which stops further movement of arm 482. Arm 482, rotatably mounted on shaft 516, has been rotated by lever 519 because of spring 522 which is fixed on lever 519. Now lever 519 proceeds alone, and stripper 483 strips sealing fold 998' of bag 999' off the head 517 of arm 482. In this way it is released from lip 517 and flat spring 518.

Now shaft 516 reverses rotation and arm 482 is moved by lever 519, as soon as nose 525 of tool 482 can lift itself from step 523. Arm 482 and stripper 483 move out of the position shown in Figures 110 and 113 and back into the position shown in Figures 109 and 112.

Figures 113, 114:
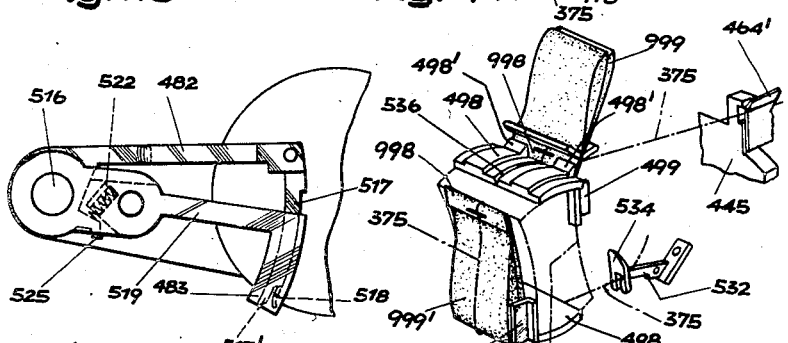
Figure 113 is a detailed plan view of the bag removing arms of Figure 109.
Figure 114 is an exploded perspective view of the thread and bag guiding plates of the transfer wheel of Figure 109.
Figures 119, 120:
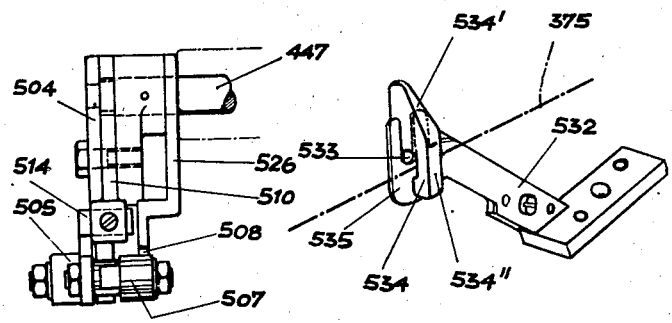
Figure 119 is a bottom plan view of the bag engaging tongs of Figure 117.
Figure 120 is a perspective view of the thread engaging arm 532 of Figure 112.

In addition means for wrapping thread 375, pulled by bag 999 around said bag 999 are provided in connection with reversing wheel 475 as follows:

As is obvious from Figure 38, bag 999, positioned by the conveyor wheel in front of reversing wheel 475, pulls thread 375 which is still clamped at the time of arrival of bag 999 in front of reversing wheel 475 between spring 464 and cutout 466. As tongs 478 and 479 move toward bag 999 in order to catch it, arm 532 (Fig. 112), fixed on angular lever 504, moves toward thread 375. This arm carries at its free end a small plate 534 which is provided with slit 533 (Fig. 120). A sliding surface 534' of plate 534 leads the thread 375 a bit to the side, so that it slides along on sidewall 534" of the plate. When tongs 478 and 479 are moving back, the thread enters slit 533 of plate 534, where it is clamped by a flat spring 535 which is fixed on arm 532 and reaches into slit 533. In addition, thread 375 enters slit 480 of wall 481 of chamber 477, while tongs 478 and 479 are moving back. During the rotation of reversing wheel 475 clockwise in Figure 116, thread 375 is placed thereby along one side of the bag so that, after half a revolution of reversing wheel 475, it runs from the fold 998 to the lower part of the bag to arm 532 as is shown in Figures 112 and 114 for bag 999'. From Figure 114 it can be seen that thread 375 is placed at the same time into the groove 536 of the corresponding plate 498.

*The second conveyor wheel*
*(Figures 123–128)*

In bearing 537, fixed on machine frame 15, a shaft 538 is mounted which is rotated step by step in the same manner as is shaft 539 of the first conveyor wheel 221. A sleeve 540 having thereon a cam 541 is rotatably mounted on shaft 538. Rotatably mounted on sleeve 540 is another sleeve 542 and a wheel rim 543 which is fixed on shaft 538 by a disc 544. The wheel rim 543 has six arms 545 which are bent hook-like at their ends. In the forward front side in the direction of rotation of each arm 545 a plate 546 is mounted which has the previously mentioned fingers 529. Block 547 which has a bar 547' (Figure 127) thereon is fixed on plate 546 which forms therewith a notch 548. On the end of each hook-like arm 545 a plate 550, having a slit 549 therein, is fixed which points over the end of the hook-like lever 545 and which runs approximately tangential therewith (Figures 123 and 128).

Hinged to wheel rim 543 are six levers 551 through bolts 552 and eyes 553. A radially adjustable flap 530 is mounted on each lever 551. Each single flap 530 and each plate 546, furnished with fingers 529, together form a chamber 557. Each lever 551 carries on an eye 553 a lever 554 at whose end a roll 555 is hinged which runs in curve 541 (Figures 124 and 125). The curve is driven by a lever 556 which is hinged to it.

Around the second conveyor wheel separate devices are spaced to perform the following operations: furnish bag 999 with an envelope blank; form this envelope blank into a sealed pocket which surrounds the bag; form part of the envelope blank into a label; connect the free end of the thread which is connected on its other end with the bag to a label; and lead the enveloped bag to a stacking device.

*Preparing and feeding the envelope blank*
*(Figures 129–137)*

It is the function of this device to take the single envelope blanks 559 out of the rack 558; to partially stamp a label 560 therein in such a manner that it remains attached to the blank, but may be easily torn out; and to transfer the blank to the second conveyor wheel. On machine frame 15 a bearing 561 (Figure 132) is mounted on which in turn is mounted a plate 562 which carries through bolt 563 a sidewall 564 on the envelope blank rack. On this sidewall 564 is mounted a fork whose ends 584 are in the form of threaded bearings. In these bearings a screw jack 585 (Figure 129) is installed which can be moved longitudinally by a knurled nut 586 and can be locked by a knurled lock nut 587. On the screw jack an internally threaded collar 588 is mounted, and on the collar a bar 566 is mounted which carries the front part 570' of sidewall 570 of envelope blank rack 558. Part 570' of side wall 570 is mounted on adjustable bolts 567 (Figure 132) which project through holes in bar 566. Bolts 567 have knurled nuts 568 and knurled lock nuts 569 for adjustment thereof.

The main part of sidewall 570 is fixed in a similar way near the opposite end of envelope blank rack 558. But here the bar cannot be adjusted in the longitudinal direction of the envelope rack, but is fixed to sidewall 564. In this way sidewall 570 and part 570' are adjustable transversely to the envelope rack 558 and in addition part 570' is adjustable in the longitudinal direction of the rack, while being urged toward the take off point by spring 589 which is fixed on jack 585.

In envelope blank rack 558 are the blanks 559, made of paper for instance, which are formed as shown in Figure 136, but initially do not possess the cuts 571, 572 and 573 for forming the label 560. The blanks are cut at their end so that the edges 578, running obliquely to the longitudinal direction, are the edges which form a flap of a pocket to receive the bag.

Flat springs 574 (Figure 129) are mounted on the sidewalls 570 and 564 and project into the cutouts 575 of the sidewalls to partly absorb the load of the blanks 559 which are placed in the adjustable envelope blank rack. For the same purpose a flat spring 576 is installed on coverplate 577 of the rack which does not cover the front end of rack 558.

On plate 562 an arm 579 is fixed which carries two sliding flat springs 580 on which the edges 578 of blanks 559 slide along to loosen and separate blanks in the front, lower part of the rack. Similarly, there are provided flat springs 581, mounted at the front part 570' of sidewall 570 which have at their slightly bent ends very fine teeth which separate the blanks 559 which have arrived at the take off pit of rack 558.

On the front end of envelope rack 558 a front plate 582 is mounted which forms with a rectangularly bent part 583 the front part of the bottom of envelope rack 558, which is not otherwise described. Part 583 and therefore also front plate 582 are adjustable in longitudinal and vertical direction of rack 558. This is accomplished through part 583 which is attached to collar 588 by an angle 590, which has a slit 591 and a screw 592 therein.

A bolt 593 in plate 562 is fixed and two-armed angle lever 594 is rotatably mounted thereon, one end of which carries a roll 595 and a stop 604.

Plate 562 furthermore carries a hollow suction union 597 with its exhaust nozzle 597' (Figures 131 and 132). The suction union is connected with two suction cups by means of a hollow bridge 599 in such a way that air can be sucked from the nozzles 598' of suction cups 598 through bridge 599 and suction union 597. The nozzle 597' of suction union 597 carries a flange 600 which abuts on plate 562 and is held longitudinally by plate 601 which is fixed on plate 562. Plate 601 carries an elbow 602 which is connected with a suction pipe.

Furthermore suction union 597 carries an eye 603 eccentrically attached thereto which is hinged to the end of two-armed lever 594, opposite to that on which roll 595 is mounted.

In bearing sleeve 561 a shaft 605 is mounted on which a conveyor roller 606 (Figure 134) is mounted from which runs a second conveyor roller 607 which in turn is rotatably mounted on a bolt 608 which is fixed in bearing 561 also. The other end of bolt 608 is mounted in a plate 609 which also acts as a bearing 610 for shaft 605. The conveyor rollers 606 and 607 are coupled to each other through toothed wheels 611 and 612, attached to the rollers. The rollers 606 and 607 have on their peripheries annular notches 613. Cutting blade pairs 614 and 615 are mounted in these annular notches with their blades concentrically positioned with the axis of conveyor rollers 606 and 607 respectively and extending for only a part of the periphery thereof. The length of the blades corresponds approximately to the length of the longitudinal cuts 571 and 572 of the envelope sheets. The length has to be such that cut 571 extends from the transverse cut 573 almost up to the transverse edge of the sheet, and that cut 572 extends almost to the transverse edge of the sheet from a line extended from the transverse cut 573. The transverse cut 573, which is formed by a cutting device, which will be described later, extends from the longitudinal cut 571 almost to a line extended from the longitudinal cut 572. In this way the label 560 is stamped out of the blank, but in such a manner that it remains connected with blank 559 at the narrow points 614a, 615a and 616a.

The single blades of blade pairs 614 and 615 are fixed by means of small bolts 614' and 615' in corresponding wells of the sidewalls of annular notches 613 of conveyor rollers 606 and 607. Furthermore, each blade pair 614 and 615 is held by two springs 616 each extending therebetween to press them against the corresponding outer sidewalls of annular notches 613. The springs 616 extend through holes 617 of the middle projecting rims 618 and 618' of conveyor rollers 606 and 607. The blades are installed in such a way that a shearing action is obtained. The upper conveyor roller 607 has in its middle rim 618' a notch 620 (Figure 130) in which the front edge 621 of blank 559 is inserted by suction cups 598 to insure that the front edge 621 is led into conveyor rollers 606 and 607.

A cam disc 619 is fixed on shaft 605 on the periphery of which, roll 595 runs to guide the suction cups 598. Cam disc 619, angle lever 594 and the suction cups 598 are formed in such a way that suction cups 598 are positioned against the surface of the front blank 559 of blank rack 558. After sucking up this blank the cups pull it partly out of the rack into the notch 620 of conveyor roller 607, at which point the suction is cut off. The conveyor roller 607 then takes the front edge 621 of sheet 559 and leads it between conveyor rollers 606 and 607 which pull the sheet further and extract it from rack 558.

To further insure the insertion of blank 559 between the conveyor rollers 606 and 607, a roll 622 is mounted between suction cups 598, over which the blank moves. This roll 622 is mounted in two parallel plates 623 which have noses 623' which also help to lead the blank 559 between the conveyor rollers 606 and 607. The two plates 623 are fixed to a bar 624 which is attached by means of angle 625 to bolt 593.

Beyond the conveyor rollers 606 and 607 in the direction of feed of the blank, as can be seen from Figure 137, a guide, consisting of two plates 626 and 626', is mounted (see Fig. 137).

Beyond this guide another guide is mounted which also consists of two plates 627 and 628, spaced a corresponding distance apart, which are bent up from the direction of guide 626 in such a manner that blank 559 can be picked up by second conveyor wheel 474, as will be described later.

The upper plate 626' has two fingers 643 (Figures 130, 135, 137) which engage the annular notches 613' of the upper conveyor roller 607. Furthermore, two fingers 644 are provided which are mounted in line with the annular notches 613 of conveyor roller 606 (Figures 130, 133 and 137). Fingers 643 and 644 make sure that the front edge 621 of blank 559 is led in between the plates 626 and 626'.

The fingers 644 serve the further purpose of arresting the movement of suction cups 509 if, by any chance, a blank crumples or waves between the conveyor rollers 606 and 607 to prevent the feeding of another blank. To accomplish this the fingers 644 are fixed on an angle lever 645, rotatably mounted on bolt 647, which has at the end of the side opposite fingers 644 a nose 646 (Figure 130). As can be seen from Figure 129, nose 646 normally does not contact nose 604 which is fixed on lever 594 which guides the suction cups 598. If paper congestion takes place between fingers 643 and 644, the fingers 644 (Figure 130) are pressed away from fingers 643 and are pressed into the annular notches 613 of the lower conveyor roller 606. This movement causes nose 646 to move in front of nose 604, thus stopping lever 594.

In an eye 648 of bearing 561 (Figure 133) a bolt 649 (Figure 130) is mounted which is mounted at its other end in the lower part of plate 609 (Figures 129 and 133). Between eye 648 and plate 609 an arm 650 is fixed to the bolt; arm 650 carries bolt 647, on which is mounted angle lever 645 by means of fork 651 (Figure 130).

Arm 650 also carries on the end thereof plate 652, on which a guide 634, to be explained later, and the guiding plates 627, 628, 626 and 626' are fixed. The plate 652, as well as the other parts attached thereto, is easily detachable from arm 650. Plate 652 is mounted on a bolt 653 which in turn is mounted on arm 650 and is held against arm 650 by a nut 655 which is furnished with stud 654.

The ends of levers 551 of conveyor wheel 474 are sloped at the sides away from arms 545 (see Figures 128 and 129), and these sloped surfaces as well as the adjoining side surfaces of the ends of lever 551 are surrounded by a fork-like bent sheet 629, whose sides are cut out to form an angle 630. Two small blocks 631 are mounted on the front sides of levers 551 so as to cooperate with the fork-like extensions 632 of plate 550. Bent plates 633 are mounted on these extensions and contact the fork-like sheet 629 to entrap between them sheet 629.

During most of the time while the device for feeding of the sheets is in motion, the second conveyor wheel 474 stands still. The guides 627, and 628 (Figure 137) lead the front edge 621 of blank 559 first into angle 630 of the fork-like bent sheet 629. Because of the continued feeding of the sheet by conveyor rollers 606 and 607, sheet 559 bulges and bends. Because plate 628 extends further in feeding direction than plate 627, sheet 559 bends away from plate 628 into a loop which is formed by another guide plate 634. As blank 559 bends this way, the front edge 621 jumps out of angle 630 into the angle which is formed by sides 632 of plate 550 and the plates 633.

At a distance along the line of contact of conveyor rollers 606 and 607 corresponding to the cut 571 and 572 in blank 559, a blade 635 is mounted which effects the transverse cut 573 in each sheet. The blade 635, running transversely of the blank 559 (Figure 133) is mounted on one end of two-arm angle lever 636, the other end of which carries a roll 637. A tension spring 638, attached between bearing 561 and a continuation 639 of the blade carrying side of the angle lever 636, keeps blade 635 from operation. Roll 637 is guided by cam surface 640, attached to the front surface of cam disc 619, in such a way that it cuts into the sheet 559 at the proper moment. At the same time the blade enters a slit 641 between guide 626 and holder 642 for plates 627 and 628 (Figure 137).

Blade 635 cuts just at the moment, when the back edge of blank 559 has left the conveyor rollers 606 and 607. At this time the back part of envelope blank 559 is stationary because it is not being fed.

Even before blade 635 starts its cutting operation, namely after the front edge 621 of blank 559 has jumped into the angle formed by the sides 632 of plate 550 and the plates 633, the cam disc 541 (Figure 124), rotatably mounted on shaft 538 of the second conveyor wheel 474, starts rotating, which rotation is effected by lever 556, which in turn is driven by the main drive. In this way the levers 551 of conveyor wheel 474 set into action the lever 551' (Figure 129) which appears opposite the envelope blank device for feeding in such a way that it moves towards arm 545' and plate 550. In this way the front part of blank 559 (see Figure 128) is clamped between the little blocks 631 and the sides 632 of plate 550.

Next, the conveyor wheel 474 is rotated by shaft 538, which pulls blank 559, caught therein at its front part. The loop in guide 634 formed by blank 559, is thus pulled out. Before this loop is entirely pulled out, the cut by blade 635 is made. During the further rotation of conveyor wheel 474 the blank 559 is pulled up. The conveyor wheel 474 then stops in front of the next device.

*Envelope blank inserting device*
*(Figures 138 to 144)*

At the above mentioned stop the blank 559 is in the position shown in Figure 138, i. e., it hangs before a chamber 557 formed by a pair of fingers 529 and clamp 530. A pusher 656 is positioned in front of chamber 557 and fastened to an angle lever 657 which is rotatably mounted on a bolt 658. Bolt 658 is mounted on machine frame 15. At the end of the other arm of angle lever 657 a lever 660 is hinged at 659, it in turn being hinged at 661 to the lever 662. The lever 662 is mounted on a bolt 663 which is mounted in bearing sleeve 664 which in turn is attached to machine frame 15. Another lever 665 is fixed on the other end of bolt 663, and a roll 666, which is guided by a cam disc of the main drive, is in turn mounted on lever 665. By this lever transmission the pusher 656 receives an arcuate motion about the axis of bolt 658 such that it enters the chamber 557.

As soon as the second conveyor wheel 474 has stopped with chamber 557 before pusher 656, pusher 656 starts moving and presses sheet 559 into chamber 557, pulling up the hanging end of the sheet.

The pusher 656 is composed of two flat springs 667 and 668 (Figures 141 and 142) joined at one end and spread apart fork-like at the other. A hinge bolt 669 on lever 657 on which the lower flat spring 668 is fixed is mounted with the help of hinge 670. The upper flat spring 667 is rotatably mounted through hinge 671 and the bolt 669 and is pressed by torsion spring 672 mounted between the hinges, against the corresponding end of flat spring 668. Guides 673 are attached along the sides of lower flat spring 668 and extend from both sides of the surface of flat spring 668. The free end of the upper flat spring 667 has a curved portion 667' opening away from spring 668. A roll 674 is positioned within this opening so that it raises the upper flat spring on closing.

When the pusher 656 pushes blank 559 into chamber 557 and has almost reached the end of the chamber, the upper flat spring 667 is raised by roll 674, in order to raise the front edge of the upper flat spring 667 above the bar 547' of block 547 which is mounted at the end of the chamber. The front edge of the lower flat spring 668 enters notch 548 which is formed by bar 547' and plate 546.

Thus, as can be seen from Figure 141, the sheet 559, which is clamped with its front part between sides 632 of plate 550 and the small blocks 631 of lever 551, is inserted into chamber 557. The sheet 559 runs from the front edge of clamp 530 into chamber 557, around the free edges of upper flat spring 667 and lower flat spring 668 and from there to the ends of fingers 529. Between the front edges of flat spring 667 and 668 the blank passes back and forth around bar 547' to pre-form the middle part of the blank 559 to the form of the bottom fold of bag 999, which is going to be inserted therein. In addition, the insertion of the blank 559 into notch 548 insures that blank 559 does not jump out of the chamber when the pusher is withdrawn.

When the conveyor wheel 474 stops in front of pusher 656 and the pusher starts to enter the chamber 557, a feeler 675, shown in Figures 128 and 138, moves between the sides 632 of plate 550 and feels whether a blank 559 is clamped between these sides and the small blocks 631. If there is no blank 559, the feeler penetrates the joined surface of sides 632 and the blocks 631 and moves on towards the front surface of lever 551.

This feeler 675 corresponds with the previously described feeler 413 which controls the wire feeder at the stapling device. Here the feeler 675 controls the wire feeder for a second binding device $H_2$ which is mounted about the second conveyor wheel 474 for the purpose of connecting the free end of thread 375 with label 560.

After the blank 559 is inserted into chamber 557 and pusher 656 has left the chamber, the second conveyor wheel 474 turns one step further and arrives in front of reversing wheel 475. Because the chambers 557 are open on their sides, plates 676 and 676' (Figures 143 and 144) are provided for the lateral aligning of the sheet with the conveyor wheel 474. These plates are through guides 677 fixed on an angle 678 which is carried by a bolt 679, which in turn is fixed on the machine frame 15. The plate 676' is mounted in such a way that with the help of small springs 680 it can be pressed lightly against the corresponding side edges of sheet 559.

The previously mentioned roll 674 which runs in the opening 667' of the upper flat spring 667 of pusher 656 is mounted on a band 681 mounted on plate 676.

*Insertion of bag 999 into chamber 557*

It has been previously described how the bag 999 with the help of tool 482 has been expelled out of chamber 476 of reversing wheel 475 and inserted into a chamber 557 of the second conveyor wheel 474, formed by a pair of fingers 529 and a flap 530. During this movement bottom fold 269 is put on the bar 547'. To insure that the end of blank 559 in chamber 557 does not separate from the fingers 529 and move toward the flap 530, lugs 498' are mounted extending approximately radially on the plates 498 of reversing wheel 475 (Figures 114 and 145) behind which blank 559 is put so that it is held open.

Reversing wheel 475 and second conveyor wheel 474 are oriented in such a way that during the rotation of the one or the other the lugs 498' first pass the fingers 529 which then catch up later.

As can be seen from Figure 112, the thread 375 as the bag marked 999 leaves the chamber 476 is put along one side of the bag and runs from bottom fold 269 of bag 999' through the groove 536 of plate 498 up to lever 532, where it is lightly clamped. Now as the bag is fed into chamber 557 of the second conveyor wheel 474, the piece of the thread 375, running from the bottom fold to lever 532 is put around the bottom fold and up the other side of the bag. In order to let the thread run over the back edge of the blank 559 without damaging the label portion, a spring 682 is attached to angle 678 (Figures 138 and 139) which extends up to the edges of fingers 529 on plate 546.

Fastening the thread to the label (Figure 139)

As soon as the bag is led into a chamber 557 of the second conveyor wheel 474, the conveyor wheel starts moving and stops next before a second binding device H₂. This device is constructed largely in the same manner as the device shown in Figures 72 to 100 or 176 to 186.

On the way from reversing wheel 475 to the second binding device H₂ the thread 375 is led into a guide which consists of two parallel closely adjacent flat springs 683 (Figures 146 and 146a) which are fixed on the lower side of a plate 684, furnished with rectangular slit 684', running longitudinally through the circular surface of the plate 684 (Figures 138, 139, 146 and 146a). The thread, because of the rotation of the second conveyor wheel 474 moves into groove 685 which is formed by the flat springs 683, because it resists to a certain degree the bending of it from the radial direction, which it had inside chamber 557, to the tangential direction which plate 498 gives it. The groove 685 holds the thread exactly in the middle between the longitudinal edges of blank 559, so that the thread lies in the proper position during the attaching of the label thereto.

The flat springs 683 extend in the direction of rotation of the second conveyor wheel 474, over plate 684, as do two flat springs 686 on the sides of plate 684 which are also bent at their free ends to form a small hook 686'. These small hooks 686' are provided to bend back slightly the rear edge of blank 559 when bag 999 arrives in front of the second binding device, so that the anvil 2357 of the binding device does not hit the back end of blank 559 while rotating into the binding position. The anvil 2357 is wedge-shaped at its end and points toward the axis of the second conveyor wheel 474, in order to be able to enter between label 560 and bag 999 (Figures 147 and 148). The outer cover 2353 of the second binding device, which corresponds with the outer cover 353 or 1353 of the first binding device, bends the flat springs 683 downward during the binding operation.

The second binding device is furnished with a wire feeding device, which can be inactivated as in the first binding device. This wire feeding device is controlled by the feeler 675 which has been described in connection with the insertion device for the sheets (Figures 138 to 144).

As soon as the binding is finished, the front part of the sheet 712 (Figure 147), which is next to edge 621 and which is clamped between sides 632 of plate 550 and the small blocks 631, is released. This is done through the movement, clockwise in Figure 139, of lever 551 under the control of curve 541. Because of this movement of lever 551, the flap 530 is pressed against bag 999 in such a manner that the bag and its envelope blank 559 are held firmly between flap 530 and fingers 529 of plate 546. Then the second conveyor wheel starts to move on, during which rotation the front part 712 of sheet 559 can rise and extend radially from conveyor wheel 474.

Folding of the envelope flap (Figures 149–154)

When the conveyor wheel 474 is stopped again, the bag 999 is positioned in front of a device for folding the front part of envelope sheet 712. This device puts the front part of sheet 712 over label 560 and presses the fold flat at the end around which the front part of sheet 712 is folded.

On machine frame 15, a mounting bearing 687 (Figure 151) is fixed in which a shaft 688 is mounted. On an arm 687' of bearing 687 a bolt 689 is fixed, on which an eye 690, fixed on one end of lever 691, is rotatably attached. The other end of this lever carries a roll 693 on a bolt 692. Approximately in the middle of lever 691 is an eye 694 (Figures 153 and 154) on which the matrix 695 is mounted. This matrix consists mainly of a bar 696, which has a step 697 (Figure 153). In its middle the bar 696 has a slot 698 which receives the binding staple 699. Binding staple 699 connects thread 375 with label 560. A second lever 701 is hinged on bolt 700 which is fixed in eye 694 of lever 691. Lever 701 has two eyes 702 on bolt 700 such that eyes 702 surround eye 694. Lever 701, formed like an angle lever, carries at its one end a roll 703 and at its other end the matrix 704. Matrix 704 consists mainly of a plate 705 which comprises two pressing faces 706 spaced a distance from each other corresponding to the width of sheet 559. The pressing faces 706 are formed in such a way that they fit exactly in step 697 of matrix 695. The plate 705 has two fork-like attachments, one of which forms the one side of angle lever 701, while the other carries the second eye 702. In addition, plate 705 carries a nose 707 which serves to bend front part of sheet 712.

Figure 151:
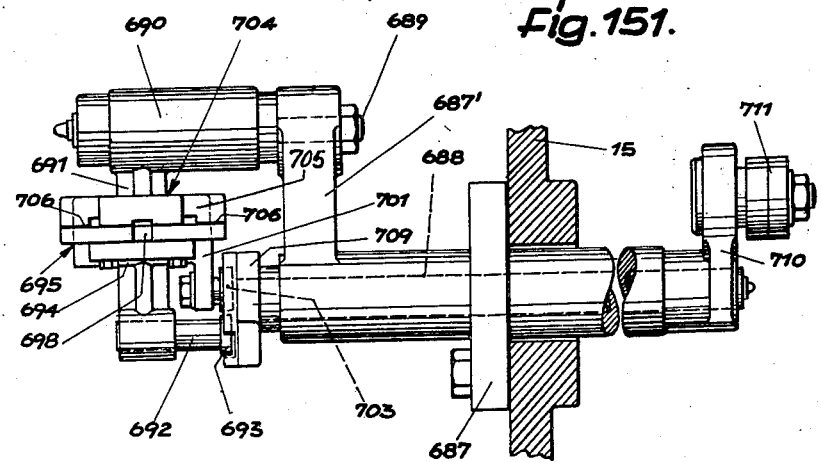
Figure 151 is a plan view of the drive for the mechanism of Figures 149 and 150.

The rolls 693 and 703 of levers 691 and 701 respectively run in the slit 708 of a slit disc 709 which is fixed on shaft 688 (Figure 151). This slit disc, whose slit runs diametrically, is rotated in oscillatory manner around its shaft 688. The rolls 693 and 703 are placed diametrically opposite each other in slit 708, so that during oscillation of slit disc 709 the levers 691 and 701 respectively move in opposite directions. The shaft 688 carries behind the machine frame 15 a lever 710 on whose free end a roll 711 is fixed which is steered by a cam disc of the main drive.

Figure 149:
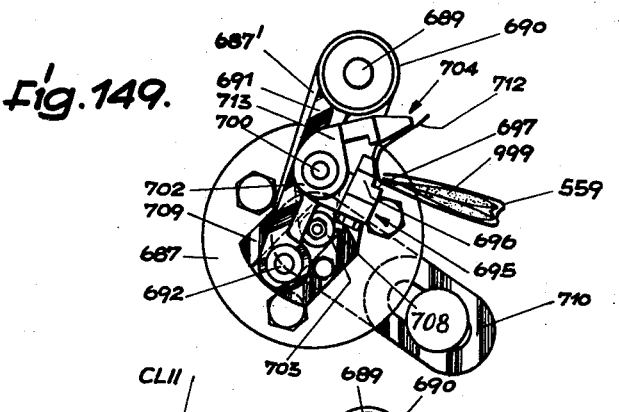
Figure 149 is a side elevation of the envelope flap closing mechanism on the second conveyor wheel.
Figure 150:
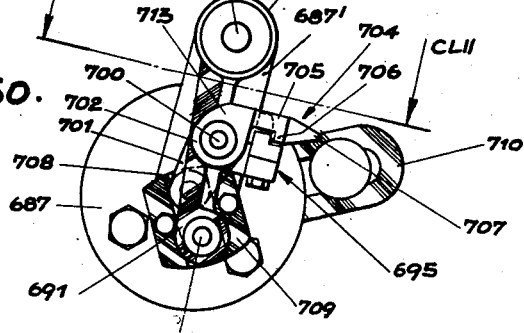
Figure 150 is a side elevational view showing the apparatus of Figure 149 in a closed position.

The sequence of operation of the device for folding the front part 712 of the envelope blank is as follows:

As the slit disc 709 rotates in one direction, the front part 712 of blank 559 behind bag 999, is first bent by nose 707 around front edge 529' of fingers 529 of plate 546 (Figures 127 and 149). During the continuation of the rotation the pressing stamps 706 of matrix 704 place themselves on step 697 of matrix 695. Because the fingers 529 of plate 546 have a cutout 714 (Figure 127) in the orbit of pressing faces 706, the pressing faces can fold the front part 712 of blank 559 sharply along the edges of the blank. A lesser fold is also made between these two outer points where edge 707' of nose 707 of matrix 704 meets the step 697 of matrix 695. The sharp fold in the cutouts 714 of fingers 529 is used to facilitate the knurling of the edges as will be explained later.

Through rotation of lever 691 the lever 701 which is hinged to it also receives a displacement in addition to the rotary movement given by roll 703.

After folding, the slit disc 709 reverses its direction of rotation with shaft 688, which reverses also. Therefore the levers 691 and 701 with matrix 695 and matrix 704 resume their starting positions.

After the folding process has been completed, the second conveyor wheel 474 rotates another step until bag 999 arrives in front of a device for knurling the longitudinal edges of envelope 555 and for stripping the jacketed bag 999 from the second conveyor wheel 474.

Removing the bag from the second conveyor wheel (Figures 155 to 158)

Figure 156:
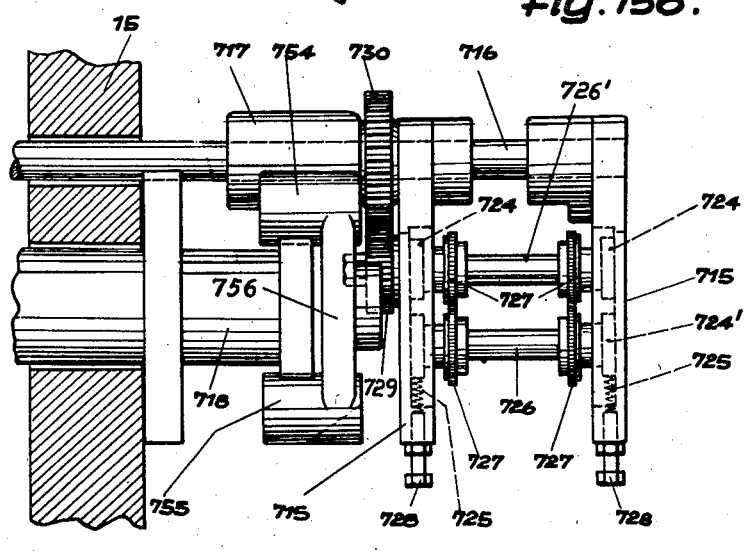
Figure 156 is a top plan view of the drive mechanism for removing the completed bag from the second conveyor wheel and depositing it in the reversing wheel.

This device consists of a pair of levers 715 which are fixed on a shaft 716. The device is geared with an eye 717 of a mounting bearing 718 which is fixed on machine frame 15 (Figure 156). On shaft 716, behind machine frame 15, lever 719 is fixed which carries at its end a roll 720 which is led in a slit 721 of an oscillating disc.

The levers 715 are furnished with longitudinal slits to which wheels 724 are movably attached. The wheels 724' with their connected shaft 726 and the knurling wheels 727 mounted thereon are positioned further from the axis of lever 715 and are urged by springs 725 toward wheels 724. The knurling wheels have very fine teeth and the pressure of springs 725 can be regulated by screws 728. On the one shaft 726' a toothed wheel 729 is mounted to mesh with another toothed wheel 730, which is rotatably mounted on shaft 716. This is driven by a toothed wheel 731 which is mounted on a shaft 732 of the main drive.

Figure 155:
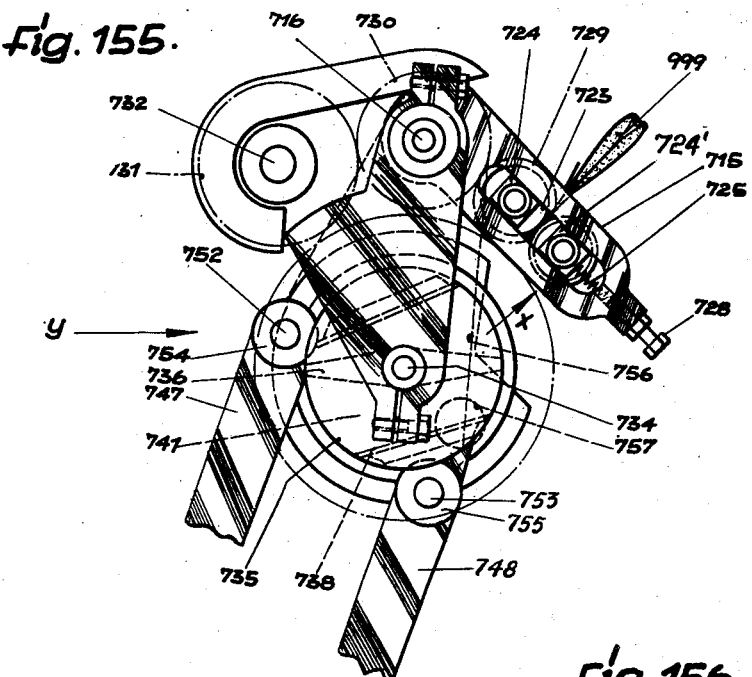
Figure 155 is a side elevational view of the reversing wheel assembly for transferring the completed bags from the second conveyor wheel to the packaging device.
Figure 158:
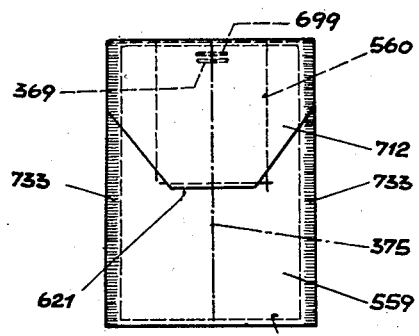
Figure 158 is a plan view of the completed envelope and bag.

The operation of this device for knurling the longitudinal edges of the jacket and for stripping the bag from the second conveyor wheel 474 is as follows:

After the conveyor wheel 474 has arrived in front of the device, the levers 715, which carry the knurled wheels 727, are rotated towards the jacketed bag 999 (Figure 155). The knurled wheels catch the jacket of the bag at the points which are exposed by the cutouts 714 of fingers 529 of plate 546 and extract the packeted bag 999 out of chamber 557, formed by fingers 529 and flap 530, and in so doing form the longitudinal knurled seams 733 of envelope 559. The completed envelope, containing the bag 999, is shown in Figure 158, in the condition in which it emerges from the knurling wheels 727.

*Stacking the jacketed bags (Figures 161 to 167)*

The rack consists mainly of four parallel angle irons 734 positioned so they surround a space whose cross section corresponds approximately with the size of a jacketed bag 999. The sides 743' of the lower angle irons 743, which form the bottom of the rack, are extended and support thereon vertically fixed angle irons 744 which form the rear of the rack. The sidewalls 745 (Figure 163) which are mounted between the vertical sides 743" of the lower angle irons 743 and the vertically mounted angle irons 744 form a chute which is open at the top, into which the jacketed bags 999 fall. A pusher 746 is mounted for movement between the vertical angle irons 744 and the sides 743' of the lower angle irons 743, which form the bottom of the rack. The pusher is moved by a lever parallelogram which is formed of levers 747, 748 and 749 (Figure 163). These are hinged to each other by bolts 750 and 751 in such a way, that lever 749 is positioned with eyes 750' and 751' to one side of the plane of levers 747 and 748 on the bolts 750 and 751. The other ends of levers 747 and 748 are hinged at 752 and 753 to the eyes 754 and 755 of plate 756 (Figures 156 and 162) which is attached to bearing 718.

The lever 748 is extended beyond its pivotal point 753 and carries at its end a roll 757 which runs on a cam 758. This cam is fixed on a shaft 734' which corresponds with the device for turning the shaft 734 in another embodiment to be described below. To hold the roll 757 continually on cam 758, the lever 747 is connected by a tension spring 759 to spur 760 which in turn is fixed on one of the sidewalls 745.

The rack is fastened on the machine frame 15 by means of mounting bracket 761 in such a manner that the jacketed bags 999, standing in the rack, can be pushed up the rack until they arrive at the packaging position.

*Packaging the jacketed bags (Figures 187 to 203)*

Figure 190:
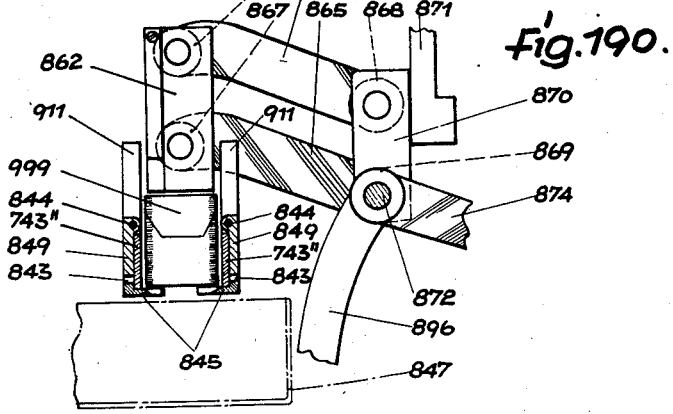
Figure 190 is a fragmentary elevational view taken at right angles to that of Figure 187 showing the mounting and drive for the slider 862 of Figure 187.

Referring now to Figure 187, there are positioned along the extension of the lower angle irons 743 which form the rack (Figures 161 and 162), frames 843, as can be seen particularly in Figures 187 and 190, which are mounted for outward pivotal movement. These frames 843 have hook-like projections 845 at their lower edges which hold the jacketed bags at a certain area of the rack so that these bags cannot drop down by themselves.

Figure 188:
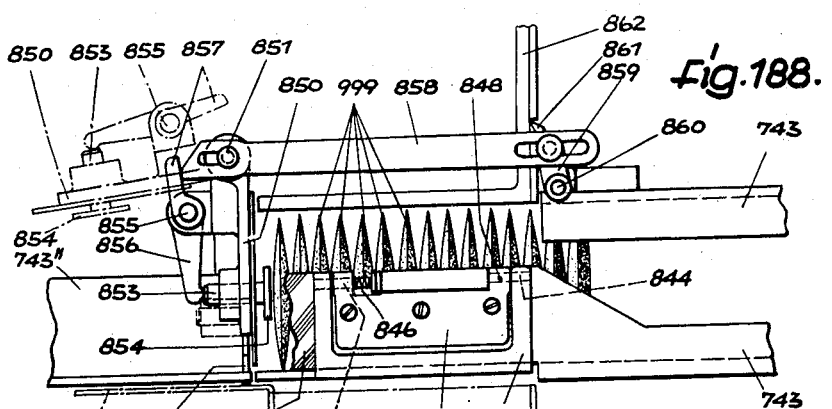
Figure 188 is an enlarged detailed view similar to Figure 187 of the bag counting and depositing mechanism together with the "no carton interlock feature"
Figure 189:
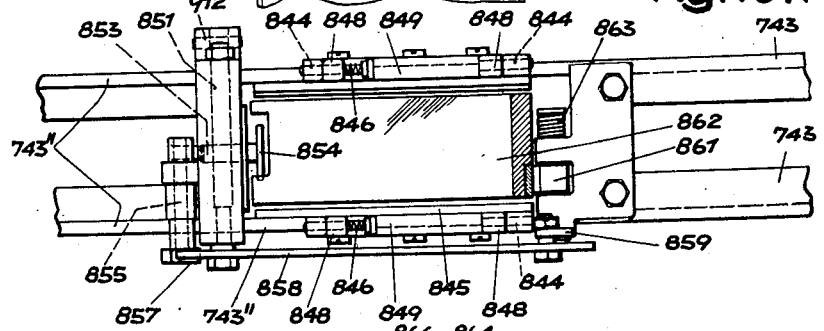
Figure 189 is a top view of the apparatus of Figure 188.

This area comprises that occupied by the bags which are to be deposited in one operation into a carton 847 mounted therebelow. The bolts 844 are mounted in eyes 848 on plates 849 which in turn are screwed on the vertically widened sides 743" of the lower angle irons (Figure 188). Each of the frames 843 is held in its inner position by a torsion spring 846. The lower angle irons 743 continue in the direction of feed with the widened sides 743" beyond this area. The bags are pushed up here if no carton 847 is positioned below this area to receive them.

Normally the extension is blocked by a plate 850 (Figure 188) which is mounted transversely to the conveyor and rotatingly around horizontal bolt 851. This plate is held in its blocking position by a dog 852, as will be described later. In plate 850 is installed a movable ram 853, which has on its lower end (Figure 188) a stop plate 854.

When the jacketed bags 999 are pushed by slider 746 so far that the leading bag arrives at stop plate 854, the ram 853 is pushed in the direction of feed which then presses it against lever 856 which is mounted on bolt 855, and lever 856 in turn moves lever 857 which is also mounted on bolt 855. Lever 857 moves a bar 858 which slidably engages a lever 859 which is mounted on the same bolt 860 on which is mounted lock pawl 861 (Figure 192). Pawl 861 normally arrests slider 862 under the effect of torsion spring 863, but when ram 853 is moved, it releases slider 862 which deposits the bags 999 within its area into the carton 847 mounted therebelow. Torsion spring 863 also urges stop plate 854 of ram 853 through lever 856 in a direction opposite to the conveyor feed.

The movement of slider 862 is effected by two levers 864 and 865 (Figures 190 and 191) which are mounted parallel to each other on plate 870, partly by eyes 866 and 867 on slider 862, partly by eyes 868 and 869. Plate 870 is attached to plate 871 through which the whole assembly is mounted on machine frame 15. In plate 870 a shaft 872 is mounted on which eye 869 is rotatably mounted. Shaft 872 is mounted at its other end in a bearing 873 on plate 871 (Figure 187). On this shaft a lever 874 (Figures 190 and 203) is rotatably mounted under the effect of spring 875. This spring is mounted so that slider 862 presses jacketed bags 999, which are in its area, into carton 847 as soon as lock pawl 861 releases the slider 862. The reverse movement of slider 862 is derived from shaft 734' (previously described—Figures 162 and 187) on which a cam disc 876 is mounted. A roll 879 mounted on one end of an angle lever 878 which in turn is pivoted at 877 rolls on this disc (Figure 187). The curve 876 is formed in such a way that roll 879 does not touch curve 876 while slider 862 moves downwards. The other side of angle lever 878 is connected flexibly with lever 874 by means of a bearing 880, since lever 874 rotates in a plane at right angles to the plane of rotation of angle lever 878 (Figure 202).

The preparation of cartons 847 is accomplished as follows:

The cartons 847 are fed to the device on an oblique supply belt 881 (Figure 193). The cartons may be placed thereon by hand or the belt may be connected with a carton fabricating machine. From the supply belt 881 the cartons 847 are fed to a conveyor chain 882 which has spaced therealong carrying links which in turn have at carton-length intervals pusher catches 884 (Figure 200). The intermittently moving chain 882 transports the cartons 847 to a stop point at which the carton is positioned just under the slider 862.

After one transverse row of jacketed bags 999 has been deposited by slider 862 into the carton 847, the carton moves on the width of one jacketed bag 999 so that the next transverse row of bags 999 can again be deposited by the slider, and so on until the carton has been filled. Chain 882 then moves the filled carton to the end of table 885₁ on which the chain is mounted and through which it passes with its catches 884 and supporting links 883 through a slit 886 of table 885. From the end of the table the cartons can be taken away by hand or the end of the table can also be sloped so that the fixed cartons will slide down to the next processing operation. The oblique supply conveyor 881 and table 885 are fastened to the machine frame by angle arm 887 (only partially shown), and by bolts 888 and by eyes 889 mounted beneath the oblique supply conveyor 881 and table 885.

The supply conveyor 881 is provided with lateral guides 890 for the cartons 847. These are mounted in such a way that the covers 891 are lifted up so that each cover lies on the following carton. In order to keep the covers in this lifted position, a cam groove 892 is mounted above the oblique supply conveyor 881 (Figures 193, 194 and 195). The direction of supply of cartons 847 on the oblique supply conveyor 881 is marked on Figure 193 by arrow X, similarly the conveyor direction of chain 882 is marked by an arrow Y and the conveyor direction of the jacketed bags 999, before being deposited into the carton, is marked by arrow Z.

In order to stop the cartons which move in the direction of arrow X and for the lateral guiding of the cartons in direction of arrow Y, a sidewall 893 is mounted on table top 885.

The chain 882 runs over chain wheels 894 and 895 (Figure 196). The drive of the chain is synchronized with the movement of slider 862. While slider 862, after having deposited one transverse row of jacketed bags 999 into the prepared carton 847, moves back into its original position, the chain 882 moves forward just far enough so that carton 847 can receive the next row of jacketed bags 999 immediately next to the previously deposited row.

The intermittent chain drive is obtained as follows:

A lever 896 fixed (Figures 190, 191, 196, and 197) on shaft 872 is hinged at its free end by means of a driving rod 897 to a lever 898. This lever is mounted in a bearing 899 (Figure 200).

Connected to bearing 899 is a bearing 900 in which a pin 901 is mounted which carries a cogwheel 902 and a toothed wheel 903, both of which are fixed on the pin 901. Toothed wheel 903 meshes with toothed wheel 904 which is mounted on shaft 905 of chain wheel 895.

On lever 898 a lock pawl 906 is mounted which cooperates with cogwheel 902 and is under the effect of spring 907. This spring is fastened at one end to a spur 908 of lock pawl 906 and at the other to a pin 909 which is fastened to lever 898.

The sequence of operation of the chain control is as follows:

When the slider 862 moves downward in order to deposit one row of jacketed bags 999 into carton 847, the lever 896 moves counterclockwise (Figures 196 and 198). Lever 898 is also moved in the same direction. The lock pawl 906 therefore jogs about cogwheel 902.

When slider 862 moves back, lever 896 and also lever 898 move clockwise. In this way lock pawl 906 pushes cogwheel 902 forward one or more teeth in conformity with their spacing. This movement is transferred over the toothed wheels 903 and 904 to the chain drive wheel 895 which moves counterclockwise so that the upper element of the chain is moved in the direction of arrow Y (Figure 193).

Furthermore a safety device has been provided to ensure that the slider 862 does not deposit a row of bags if no carton 847 has been prepared. This device consists of an angle lever 910 (Figure 201), which is fastened at 912 to one of the supports 911 which are fastened to the vertical sides 743″ of the lower angle irons 743 and which carry the bolt 851 on which plate 850 is hinged. This angle lever 910 on whose free end the suppressor 852 is fastened pivots, due to gravity, into the path of the carton 847 which is being prepared. As the carton 847 takes its position beneath the slider 862, the angle lever 910 is pivoted clockwise, by the following lifted cover 891, until suppressor 852 moves behind plate 850 to latch it against pivoting and thus ensuring the filling of the cartons.

If by any chance no carton has been prepared beneath slider 862, the angle lever 910 pivots downward as soon as suppressor 852 releases plate 850. Therefore the bags, arriving beneath the slider 862, pivot plate 850 clockwise (Figure 188) and together with the stop plate 854 pivot the ram 853 and the levers 856 and 857, so that lever 857 cannot actuate the rod 858 as shown in dotted lines (Figure 188).

Lock pawl 861 (Figure 192) is not released so slider 862 cannot move downward under the pressure of spring 875. Inasmuch as the movement of the slider is synchronized with the chain conveyor drive by the lever 896, movement of the chain drive is similarly prevented.

It will be understood, that instead of the ram 853 provided with stop plate 854 another feeling-mechanism may be provided f. i. a counting device, which is adapted to count the bags arrived under the slider 862 and to control the lever 856 corresponding to the number of bags to be moved by the slider 862.

Figure 159:
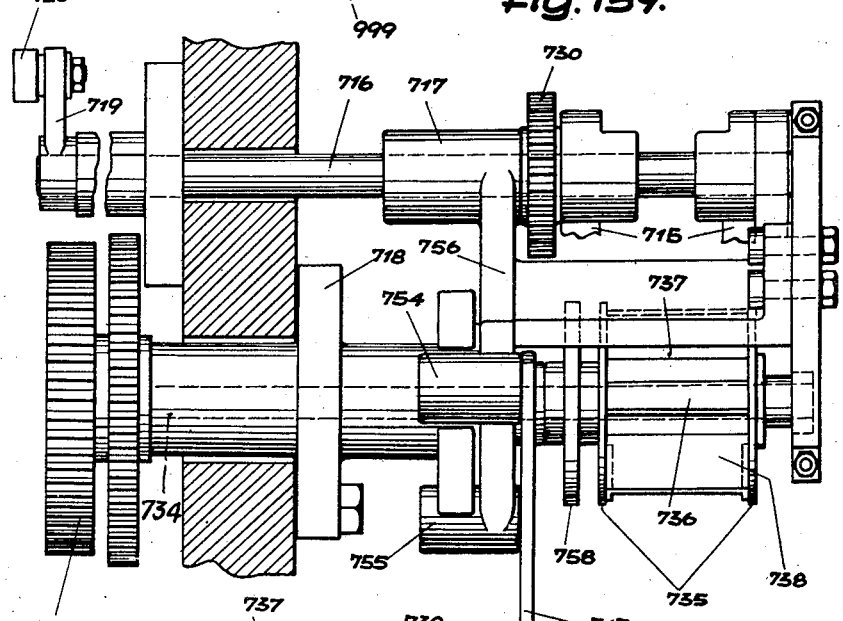
Figure 159 is a plan view of the drive for the reversing wheel assembly.
Figure 160:
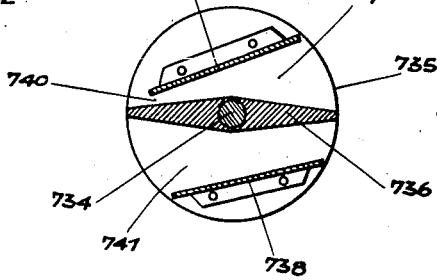
Figure 160 is a sectional view of the reversing wheel, showing the different bag chambers.

*Reversing every second bag (Figures 155, 159, 160)*

The completed, jacketed bags 999 are now stacked. Because the substance quantities 78 contained in the bags moves toward the bottom of an upright bag, lots of space would be necessary if the bags were to be lined up in an upright position. To save space, every second jacketed bag 999 which leaves the pair of knurling wheels 727, is turned 180°, arriving on the rack upside down.

To accomplish this, a turning device is provided which consists of two discs 735 (Figures 159 and 160) spaced from each other on shaft 734, and connected with each other by a diametrical middle wall 736. At both sides of this middle wall 736 walls 737 and 738 are mounted on discs 735 in different positions also axially connecting the two discs 735 with each other. The one wall 737 forms together with the middle wall 736 a chamber 739 which is open at one side, so that a jacketed bag 999 can enter, and is almost closed at the other side 740 to prevent the bag from slipping therethrough. The other wall 738 forms also with middle wall 736 a chamber 741. But the wall 738 is mounted in such a manner that a jacketed bag 999 can enter the chamber 741 at one side and can leave it again at the other side. The larger entrance-opening opposite the exit-opening of chamber 741 is positioned opposite the entrance opening of chamber 739. The shaft 734 is mounted in the previously mentioned bearing 718 (Figures 156 and 159) and carries a driving toothed wheel 742 behind machine frame 15.

The method of operation of the device is as follows:

As can be seen from Figure 155 the jacketed bag, leaving knurling wheels 727, can enter chamber 739. Both the passing of the jacketed bag through the knurling wheels 727, and the entrance of the bag into chamber 739, take place during the same rest period of the second conveyor wheel 474. As soon as the conveyor wheel 474 rotates further, the discs 735 also rotate 180° with shaft 734. Therefore the jacketed bag 999 in chamber 739 is rotated 180°, after which it slides out of the chamber 739 into the rack.

The next bag, taken from the second conveyor wheel 474 by the knurled wheels 727, is led into chamber 741 which is properly positioned by the 180° rotation of the discs 735. The bag then slides through this chamber because of its construction and arrives in the rack without rotation.

On the next rotation of the second conveyor wheel 474 the discs 735 rotate 180° again, and the sequence is repeated.

*Alternative embodiment for bag reversing (Figures 161 to 167)*

In the case of this alternative embodiment, the turning of every second bag is not effected by an intermediate rotating cavity, but by additional parts attached to the rack.

The slider 746 is controlled by curve 758 so that it always pushes ahead, two at a time, the jacketed bags which have fallen into the chute, formed by sidewalls 745 and upright angle irons 744.

The construction of this device can be understood the best from the operation of the slider.

Suppose the slider 746 is in an advance position, i. e., it has entered between the vertical sides 743″ of the lower rack, forming angle irons 743 (Fig. 163).

Figure 165:
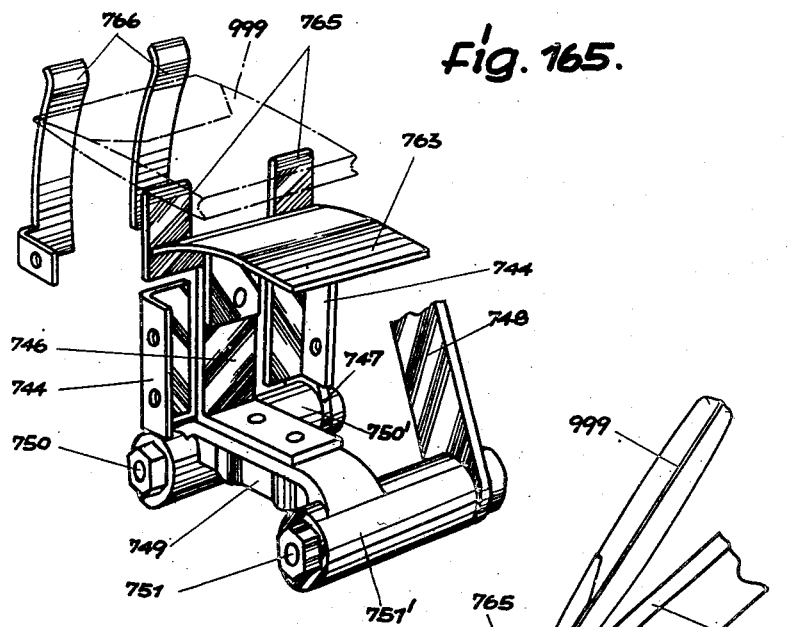
Figure 165 is a partial perspective view of the alternative embodiment for reversing every other bag in the rack.
Figure 166:
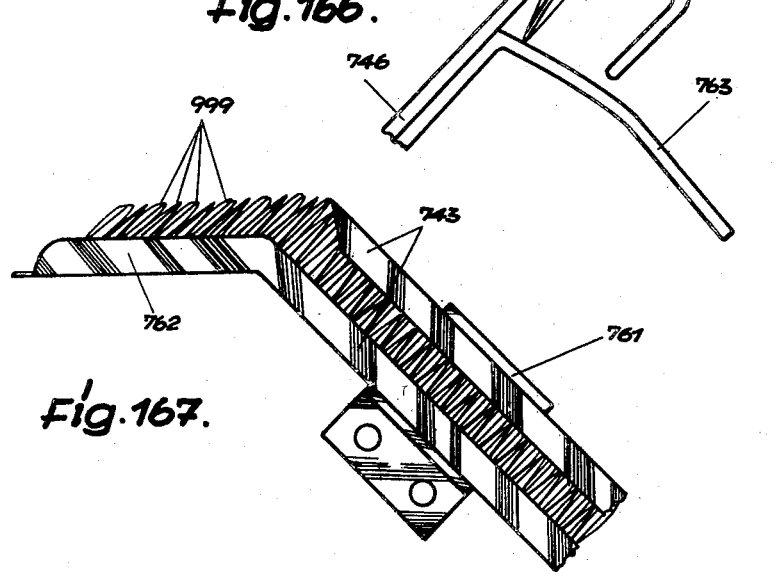
Figure 166 is a detailed partial side view of a bag in the alternative reversing device.
Figure 167:
Figure 167 is a side view of the chute leading from the bag stacking device to the packaging section, showing the alternatively reversed bags stacked therein.

During the reversing motion of slider 746, a jacketed bag 999, released by the knurled wheels 727, falls on a shelf 763 fixed on slider 746 and leans against back wall 764 of the chute because of the oblique position of backwall 764 (Fig. 1). As the slider 746 moves backward, the jacketed bag 999 slides with its edge on the shelf 763, along this part 763 towards fingers 765 which are fixed on the slider 746 (Figures 165 and 166). As the slider 746 goes still further back, the fingers 765 try to pass under the backwall 764 of the rack. In so doing, they bend the jacketed bag 999 by a scissor-like movement between them, and the backwall of chute 764 so far that the bag keeps on falling due to its own weight and completes a rotation of 180°. In this position the bag falls to the bottom of the chute. To prevent the bag while it is bent and falling from leaving the desired orbit, two more fingers 766 are mounted on the sidewalls 745 of the chute.

The return of slider 746 is so fast that the bag with its edge, which first touches the shelf 763, while still rotating arrives behind backwall 764 and cannot therefore continue to rotate after completion of a rotation of 180°. Only after having been so limited by backwall 764, the bag falls entirely to the bottom of the staple which is formed by the sides 743′ of the lower angle irons 743.

The slider 746 returns to its rest position behind the backwall 764 of the chute and there the jacketed bag 999 rotated 180°, leans against the slider and against the vertical angle irons 744.

The slider stays in this rearward position until a second bag has fallen into the chute which, inasmuch as the turning apparatus is not action during the rest position of slider 746, falls in the same position into the chute in which it entered. Now two jacketed bags 999 stand side by side in the chute at the bottom of the rack, the second bag being upside down. Only after two bags have arrived, the slider 746 moves forward again to push both bags into the rack next to the bags already there.

To insure that the two pushed bags are placed close to the bags already in the staple, and that they do not fall back during the return of slider 746, holding springs and cams are provided for holding the last bag. Between the upper angle irons 743 a flat spring 767 is mounted which is provided at its free end with a hook 768 which catches the last bag from above. The flat spring is provided with lateral projections 767′ to prevent it from swinging under the surface of the upper angle irons 743. The flat spring is hinged at its other end to a strap 769 which is rotatably mounted on the upper angle irons 743 at 769′. By means of a spring 774 (Fig. 162) which is connected to strap 769 and to one of the upper angle irons 743, the flat spring 767 is constantly urged into its lowest position which is limited by the position of side parts 767′ on the upper angle irons 743.

Similarly a strap 770 is hinged at 770′ to the lower angle irons 743. On this strap 770 a flat spring 771 is mounted which carries at its free end fork-like hooks 772 which in turn lie in cutouts 773 of the lower angle irons 743 (Figures 161 and 164). The hooks 772 engage the last bag from below.

Between strap 770 and one of the lower angle irons 743, a spring 775 is mounted to pull the flat spring 771 upwards. The uppermost position of flat spring 771 is similarly limited by the lateral extensions 776 of flat spring 771.

*Machine drive (Figures 168 to 171)*

Figure 168:
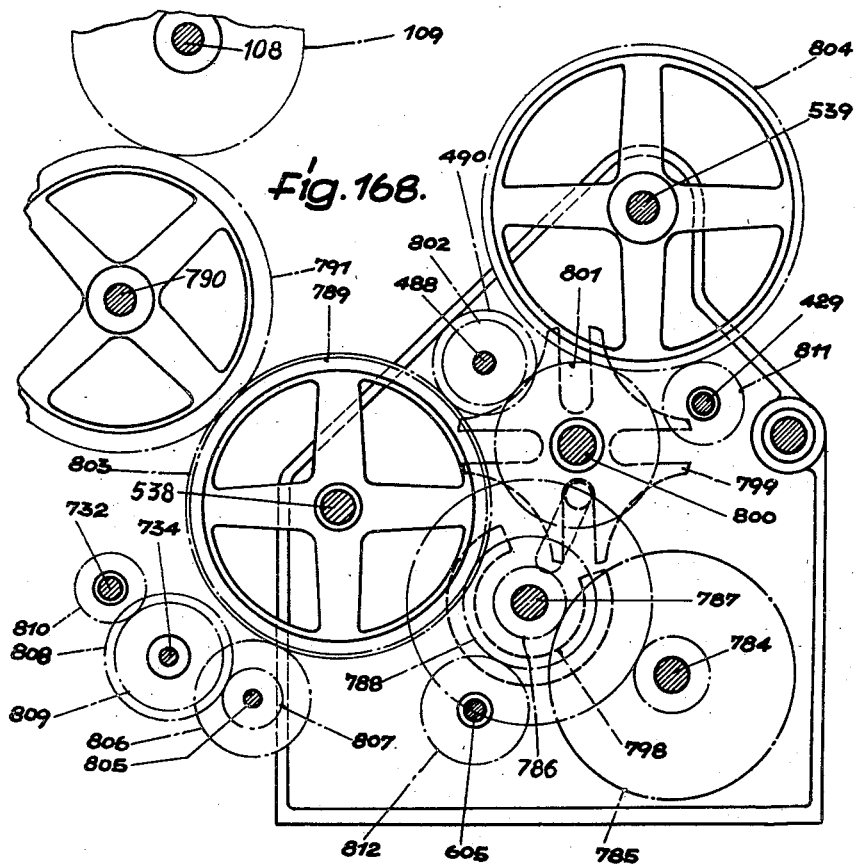
Figures 168–171 are side elevational views of the drive arrangement for the foregoing devices.
Figure 169:
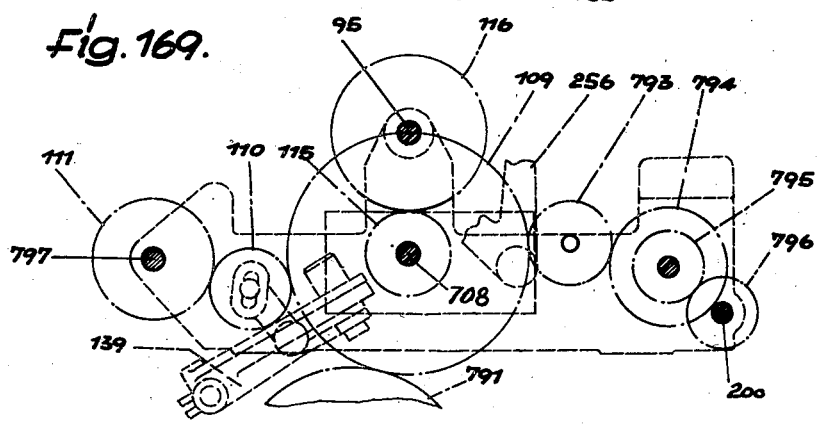

A motor which is not described drives for instance by means of a drive belt an intermediate shaft 784 (Fig. 168). From this shaft the drive is taken to a shaft 787 over toothed wheels 785 and 786. From shaft 787 the drive is taken through toothed wheels 788 and 789 over shaft 538 to shaft 790, from where the drive is taken by toothed wheel 791 to the previously mentioned toothed wheel 109 which is connected with the drive for the strip of material and the device for dosing. From toothed wheel 109, which is fixed on shaft 108, the drive is taken over toothed wheels 793, 794, 795 and 796 to shaft 200 of the upper feed roller 175 (Figures 169 and 31). Furthermore toothed wheel 109 drives over intermediate wheel 110 the toothed wheel 111, on whose shaft 797 the middle feed roller 6 is fixed (Figures 169, 5 and 6).

Also mounted on shaft 787 is a pivot wheel 798 of a Maltese cross 799, which in turn is mounted on shaft 800. By means of Maltese cross 799 with its pivot wheel 798 the rotation of shaft 787 is transformed into an intermediate rotation of shaft 800, which in turn is through toothed wheels 801 and 802 transferred to shaft 488 which carries reversing wheel 475, and from there through toothed wheel 490 to toothed wheel 803. Wheel 803 is mounted on shaft 538 which also carries the second conveyor wheel. Geared with toothed wheel 801 is toothed wheel 804 which is fixed on shaft 539 which also carries the first conveyor wheel.

Toothed wheel 803 drives over wheels 806 and 807, which are mounted on shaft 805, toothed wheel 808, which is mounted on shaft 734, on which shaft the reversing wheel formed by the two discs 735 is also mounted. From shaft 734 the drive is taken over toothed wheels 809 and 810 to shaft 732 which drives the knurled wheels 727 (Figures 168, 155 and 156). Toothed wheel 804 drives wheel 811 which is mounted on the shaft 429 for the guiding of the thread (Figures 168, 101, 103 and 104).

The uniform rotating shaft 787 drives over the previously mentioned toothed wheel 788, toothed wheel 812 which is fixed on the shaft 605 of the device for feeding of the envelope blank (Figures 168 and 134). Furthermore, on shaft 787, curve disc 813 (Fig. 170) is fixed, on which run two rolls 814 attached to strap 815 diametrically opposite each other. This strap is moved backwards and forwards by curve 813 and rolls 814. It transmits this movement to oscillating disc 816, mounted on shaft 538, through pin 817 carried thereon and to which strap 815 is hinged. Furthermore the strap 815 transmits its movement over angle lever 819 pivoted about pin 818, and over lever 820 to disc 821 which oscillates on shaft 539.

The oscillating disc 821 has slits 822 in which rolls are running which are attached to levers, which in turn are fixed on the shafts of the various component devices. For instance in Figure 170, roll 307 is shown with lever 306, which roll works on shaft 293 of the device for forming the first fold for the sealing fold.

In a similar way the shaft 1293 for forming the second fold and the shaft 516 for moving the tool 482 are put into motion.

A lever 823 is also fixed on shaft 818 which is forked at its free ends. In this fork is positioned a roll 824 which over a lever 825 puts into action the shaft 352 of the binding device.

Figure 170:
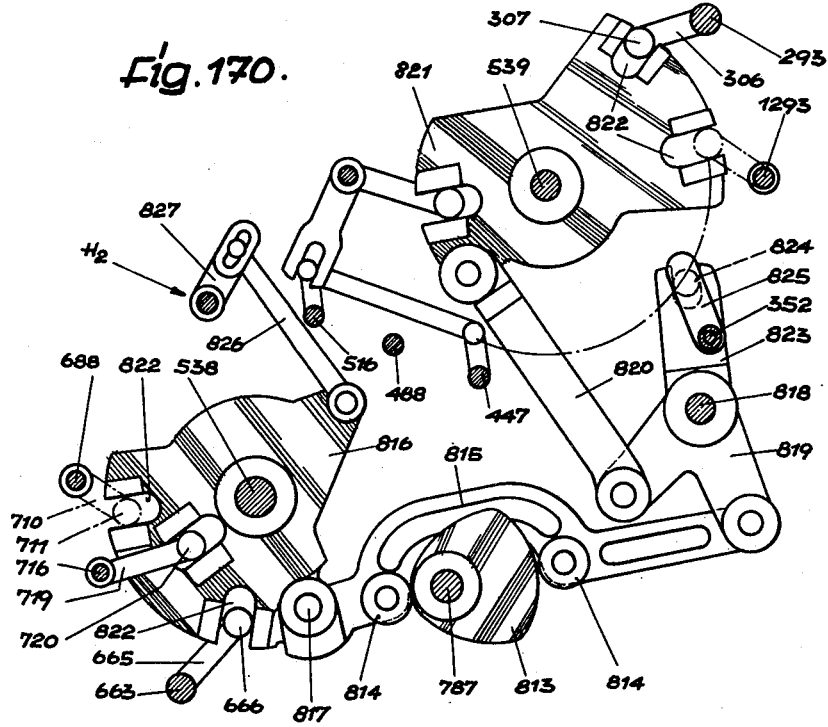
Figure 174:
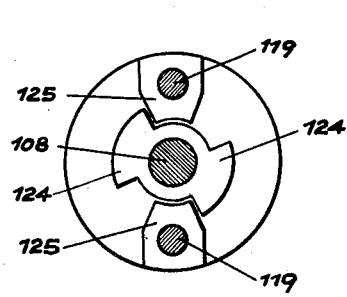
Figures 174 and 175 are sectional views taken on lines CLXXIV—CLXXIV and CLXXV—CLXXV respectively of Figure 172.
Figure 175:
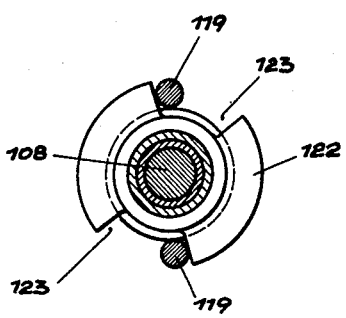
Figure 171:
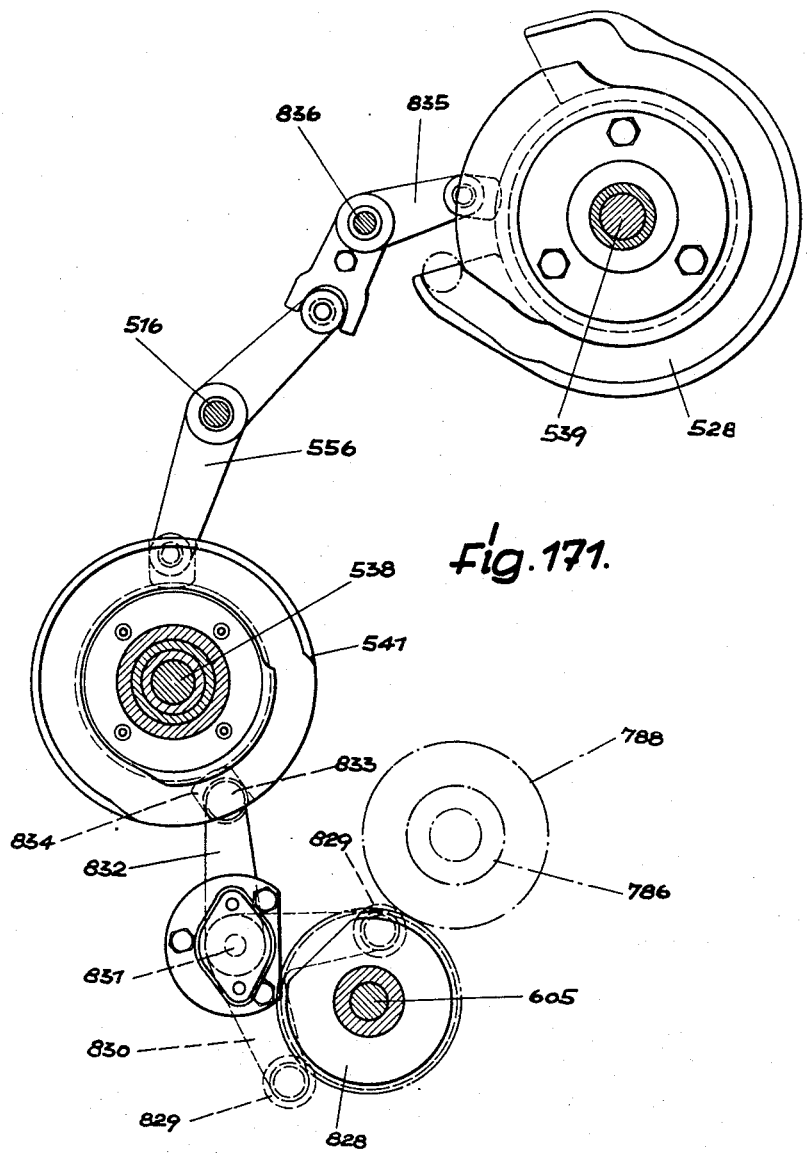
Figure 172:
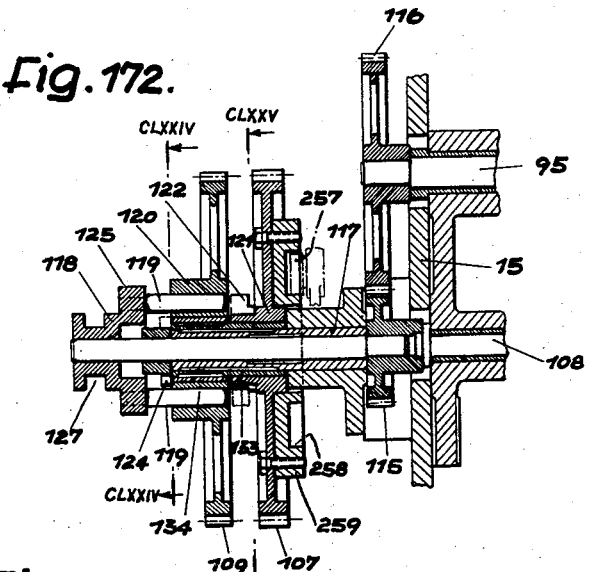
Figure 172 is a sectional view of the sequence control for the drive of the paper feeding and folding devices.
Figure 173:
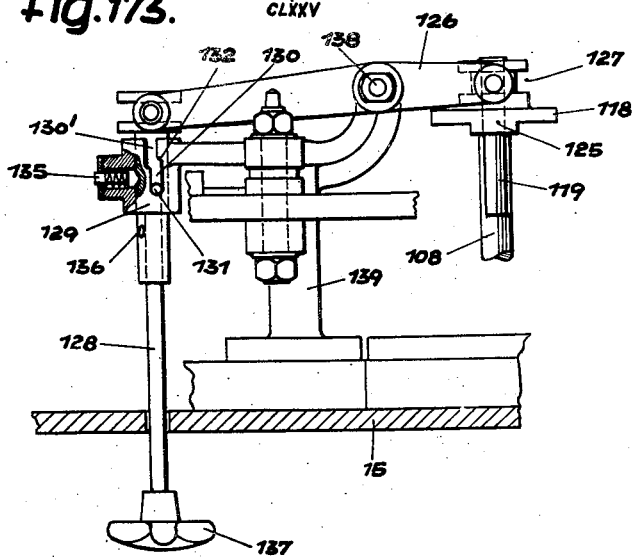
Figure 173 is a plan view of a control for the drive of Figure 172.
Figure 176:
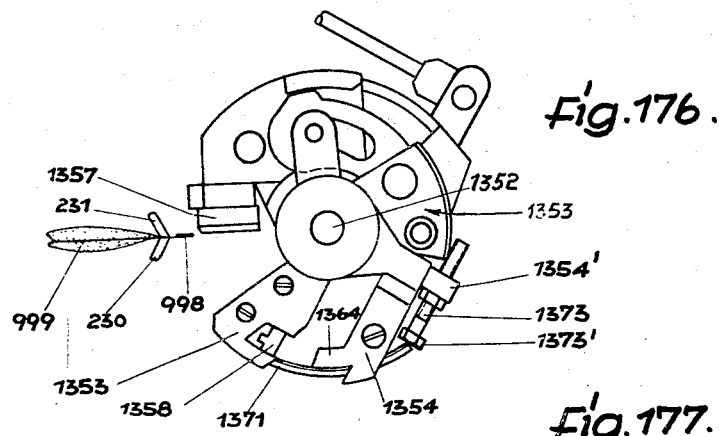
Figure 176 is a side elevation of the stapling device for the first conveyor wheel.
Figure 177:
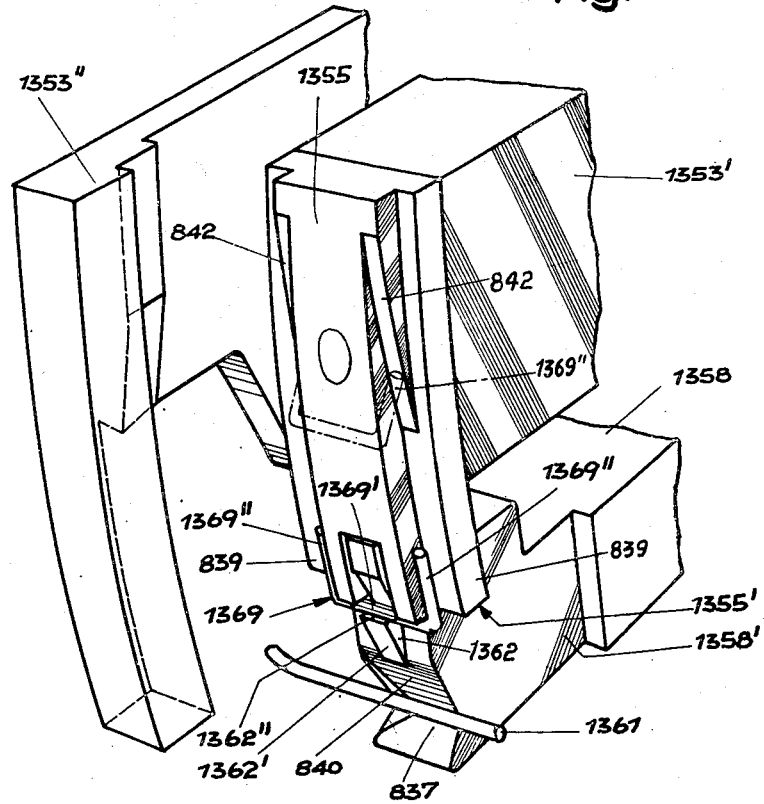
Figure 177 is an exploded perspective view of the staple forming and positioning dies of the device of Figure 176.

Also the oscillating disc 816 has similar slits 822'. Roll 711 is positioned in one of them and drives over lever 710 the shaft 688 of the device for folding the front part of the envelope sheet (Figures 170 and 151). In a second slit 721, adjacent to the hub of the oscillating disc 816, is mounted a roll 720 which drives the shaft 716 over a lever 719 which rotates the knurled wheels 725.

In another slit 822' a roll 666 is mounted which drives over lever 665 a shaft 663 of the device for pushing in the envelope sheet.

A lever 826 is also hinged to the oscillating disc 816 and drives over another lever 827 the shaft of the second binding device $H_2$.

On the uniform rotating shaft 605 (Fig. 171) a curve disc 828 is mounted, on which run two rolls 829 which are mounted on the ends of a forked lever 830. This lever makes an oscillating movement about a shaft 831 on which lever 832 is also mounted. This lever engages, by means of a roll 833, the slit 834 of curve disc 541 which is rotatably mounted on shaft 538. The curve disc 541 steers the flaps 530 of the second conveyor wheel 474. In the same manner this curve disc 541 drives over a two-armed lever 656, which is mounted on shaft 516, and over a second two-armed lever 835, which is mounted on bolt 836, the curve disc 528, which is rotatably mounted on shaft 539 and which steers the levers 230 and 231 of the first conveyor wheel 221.

Subject matter not claimed herein is being claimed in divisional application Serial No. 625,306, filed November 30, 1956.

What is claimed is:

1. A machine for the manufacture and wrapping of individual tea bags and the like comprising means to hold a supply of a strip of liquid-penetratable bag-forming material, a feed roller assembly including a shuttle roller adapted to act intermittently to draw said strip from said supply means to insure a uniform feeding thereof from said assembly, a dosing assembly for depositing doses of tea and the like at spaced intervals along said strip, folding means for forming said strip into a flat tube around said doses, cutting shears for severing segments from said tube, a first conveyor wheel having a plurality of segment-receiving zones spaced thereabout, each of said zones having therein anvil means for forming a W-fold at the midpoint of each of said segments and bag holding arms adapted to grasp the respective segments after said fold is formed, a plurality of devices spaced about the periphery of said first conveyor wheel to form bags including first and second forming devices having therein anvil and blade means for folding the outwardly extending flap portions of said segments, a third forming device having string supply means and anvil and driving means for forming and driving staples to seal said folds and to attach said string thereto, a fourth forming device for cutting said string into the desired lengths and guiding it about said bags, a second conveyor wheel including a plurality of cavity forming members disposed thereabout, transfer means for transferring said bag from said first conveyor wheel to said second conveyor wheel including tong means for drawing said bag into said transfer means and tong means for expelling said bag therefrom into said second conveyor wheel cavities, means positioned about the periphery of said second conveyor wheel for forming an envelope about said transferred bag including an envelope blank stacking rack and pick up and feed means for feeding said blank individually from said rack to said second conveyor wheel, cutting means for partially severing a label from said blank during said feeding operation, a second staple-forming and driving means for forming a staple and attaching said string to said label portion, packaging means for placing said individually wrapped bags in cartons and the like, and transfer means for transferring said wrapped bag from said second conveyor wheel to said packaging means including knurling means for sealing the edges of said envelope, and reversing means for reversing every other wrapped bag.

2. In a machine for the manufacture, filling and wrapping of tea bags and the like from a continuous strip of bag material, wherein the various steps of the operation are divided up in such a manner that each requires approximately the same time to perform its function so that the formation and filling of the bags may proceed at a uniform and constant rate, the combination of means to supply a continuous strip of bag-forming material, means for feeding said strip at a uniform and constant rate, dosing means for depositing equal quantities of tea or the like at spaced intervals along said strip as it moves past said device, guiding means for forming the strip into a loose tube by bringing together the edges of said strip, folding means for simultaneously and progressively forming three folds in the material of said strip adjacent and parallel to said edges to form said strip into a closed and flat tube, cutting means for severing said tube into segments each containing two equal quantities of tea or the like and conveyor wheel means having disposed thereabout devices for forming each of said segments into a two-compartment bag and for enclosing each bag in an envelope and thereafter depositing said bags into packaging apparatus for stacking and packing said completed bags.

3. In a machine for the manufacture, filling, closing and wrapping of tea bags or the like, the combination of means for forming a continuous strip of bag-forming material into a two-compartment bag having a W-shaped fold in the bottom thereof and a sealing fold with a string or the like attached thereto including a first conveyor wheel having disposed thereabout the various devices for so forming said bag, means for forming an envelope and enclosing said bag therein including a second conveyor wheel having disposed thereabout the various devices for forming said envelope and enclosing therein said bag, transfer means for transferring said formed bag from said first wheel to said second wheel, means for partially severing a tag portion from said envelope, and means for fastening said tag portion to the free end of said string or the like.

4. A machine for making and filling and then closing and wrapping tea bags and the like comprising a bobbin for supporting thereon a continuous strip of bag-forming material, a uniform continuous drive for said strip, guide means for forming said strip into a wide-bottom channel, dosing means for depositing quantities of tea or the like at spaced intervals along said channel while it moves at a uniform speed, folding means for folding over the upstanding edges of said channel to form a substantially flat tube moving at a uniform speed and having a longitudinal seam other than along an edge, cutting means for separating said tube into bag length segments each having two of said quantities of tea or the like thereon, means for forming a two-compartment bag from each of said segments and means for closing and for wrapping said bags in envelopes formed therefor.

5. A machine as in claim 4, wherein the bobbin containing the continuous strip of bag forming material is adjustably mounted through a lever-parallelogram which can move transversely of the strip of material, said parallelogram having two of its pivot points mounted on the frame while the two other points carry the axle of the bobbin whereby exact alignment of the strip with the tube-forming device is insured.

6. A machine as described in claim 4 wherein said strip drive comprises three serially related rollers and a shuttle roller mounted in juxtaposition, means for driving the middle roller of the series, means for feeding the strip between the first roller of the series and said middle roller and then around said shuttle roller and then between said middle roller and the third roller of said series, and means operatively associated with said first roller to intermittently move it from said middle roller.

7. A device as described in claim 6 wherein said shuttle roller is provided with opposed strip contacting surfaces converging toward the axis and with a spiral surface around the axis of the shuttle roller between the converging contacting surfaces, said spiral surface being oriented so that the point where the strip of material is fed to the shuttle is further away from the axle than the point where the strip of material leaves the shuttle roller.

8. The apparatus as described in claim 6 wherein said shuttle roller is spring urged away from said drive rollers against the loop of said strip whereby the length of said strip in said loop is alternately increased and decreased.

9. A device as described in claim 8 wherein the strength of the spring of the shuttle roller is great enough so that the shuttle roller can pull the loop out, but weak enough so that the strip of material can be laterally aligned and led through the converging surfaces and the spiral surface in such a way that it is exactly centered with respect to the tube forming means.

10. A machine as described in claim 4 wherein said dosing device comprises a first bucket wheel having therein a plurality of substance cavities of adjustable size, and a second bucket wheel mounted below said first bucket wheel having fixed-capacity cavities spaced about the periphery thereof so as to receive the quantities of tea from said first bucket wheel and deposit them at intervals in the channel-shaped strip of bag-forming material.

11. A dosing device as in claim 10 wherein the cavities of the first bucket wheel each have a bottom formed by pistons which are provided with radial piston rods which carry a slot therein parallel to the axle of the first bucket wheel, each of said slots having mounted therein a cross pin, an axially movable slider mounted on the shaft of the first bucket wheel and having therein slots which engage the cross pins in the slots of the piston rods, said slider slots being oriented at an angle to the axis of the bucket wheel, and said slider being operatively associated with a nut mounted on a threaded portion of the axle of said bucket wheel, so that it can be moved in axial direction while the dosing device is in operation.

12. A machine as described in claim 4 wherein said guide means includes a tube forming member comprising a truncated cylindraform portion mounted in the line of feed of said strip, said portion being tapered from an open bottomed channel-like form at the dosing means to a pair of spaced narrow fingers at the end in the direction of feed.

13. The apparatus of claim 4 wherein said guide means comprises a pair of spaced fingers each tapered from a wider central portion to narrow end portions at each end thereof, said fingers being joined only along the top wider portion thereof adjacent the dosing means, whereby the substance quantities may pass through the guide means without being scraped off because of the flattening out of the forming guide.

14. A device as described in claim 12 which includes a first pair of pivotally mounted driving wheels, and wherein said guide means includes removable converging fingers for leading the edges of the strip of bag material together above said forming member to said first pair of driving wheels.

15. A device as in claim 14 wherein said converging fingers are mounted respectively on one set of arms of a pair of two-armed levers which are rotatably mounted on parallel shafts positioned under said tube forming member parallel to the axis of said member, said other set of arms of said two-armed levers being provided with interengaging cam surfaces which are controlled by an eccentric cam mounted on a hand lever.

16. A device as in claim 15 wherein each of the arms of the two-armed levers which carry said fingers also carry adjustable stops mounted transversely to said shafts so as to contact a rod mounted beneath the forming member and parallel thereto whereby the pressure applied by said fingers may be adjusted.

17. A device as in claim 14 wherein the free ends of the fingers are provided with interlocking means on the inner face thereof comprising a groove in one of the fingers and a corresponding ridge portion in the other whereby said fingers are adapted to grip the lower edge of the overlapping portions of the strip of bag forming material.

18. A device as described in claim 14 wherein said fingers lead the edges of said strip together so that one edge extends above the other, and which includes a first folding blade assembly positioned adjacent said first pair of driving wheels to fold the upper edge portion down over said lower edge portion, a second pair of pivotally mounted driving wheels positioned adjacent said first pair of driving wheels and folding blade assembly together with a second folding blade assembly for folding said folded portion again about the now downwardly extending edge of said strip, and a third pair of pivotally mounted driving wheels and a third folding blade assembly positioned beyond said second folding blade assembly for folding the now twice folded edge portions of said strip flat against the formed tube.

19. A device as in claim 18, wherein the first folding blade assembly comprises a recessed wall portion and a complementary rail portion between which the edges of the strip of bag forming material are led; a finger positioned above said rail in the path of the edge which extends above the other edge and which finger extends diagonally across the axis of said wall and rail so as to lead the overlapping edge of said strip of material to one side and to bend it into an almost horizontal position over said rail; a folding blade pivotally mounted for movement along and parallel to said wall and rail whereby the edge of the strip of material is folded about said rail.

20. A device as in claim 18 wherein the second folding blade assembly comprises a rail along which the fold, formed by the first folding assembly is led; a folding blade mounted for pivotal movement from above the rail and having on its under surface an open groove which increasingly surrounds the rail in direction of feed of the strip of bag forming material.

21. A device as in claim 18 wherein said first and second pair and at least one of said third pair of knurling wheels, are mounted on arms adapted for pivotal movement about an axis parallel to said longitudinal fold, against the effect of springs interconnecting the arms on which said pairs of knurling wheels are mounted.

22. A device as in claim 21 wherein a set screw is mounted on an arm of each of said pairs of knurling wheels and is adapted to cooperate with a firmly fixed stop whereby the spacing of the respective pairs of knurling wheels can be adjusted.

23. A device as described in claim 18 which includes a cam and tension spring interconnecting said first and second folding blade assemblies whereby said first blade assembly operates first and said second blade assembly operates second in point of time when the strip of bag-forming material is first placed under said devices during the initial starting up of the machine.

24. A machine as described in claim 4 wherein said means for separating said tube into bag length segments comprises a pair of pivotally mounted cutting blades adapted to engage and travel forward with said tube during the cutting operation and to return to the initial position after releasing said separated segment.

25. A machine as described in claim 4 wherein said means for forming a two-compartment bag includes a first conveyor wheel having a folding sword assembly mounted opposite one wheel position and pairs of notches so spaced about its periphery as to underlie the central portion of successive tube segments and to cooperate with said folding sword assembly positioned thereabove at one wheel position to form a W-shaped fold in each tube segment between the two quantities of tea or the like therein.

26. A machine as described in claim 18 which includes a pair of rollers adapted to engage said tube along the edges thereof and having therein a channel adapted to pass therebetween the parts of the tube containing the quantities of tea.

27. A device as described in claim 25 wherein each of said folding sword assemblies comprises a plurality of flexible leaves spaced apart, a finger having a spring-urged wedge-shaped tip positioned between said leaves and adapted to maintain the tube segment in contact with its pair of notches during the application and removal of the folding sword assembly, and means to pivot said folding sword assembly into and out of engagement with said pairs of notches.

28. A machine as described in claim 27 wherein said means for closing said bags includes, a plurality of bag-engaging arms mounted on said first conveyor wheel and adapted to fold up and engage said tube segment about said W-shaped fold so that one end extends beyond the other end of said tube, a first folding anvil means for folding over the corners of upstanding portion of the bag to form a central tab, and a second folding anvil means for folding down the resultant tab to form a sealing fold for the top of the bag.

29. A machine as described in claim 28 wherein the bag-engaging arms which are mounted on the first conveyor wheel are mounted in such a way that they can be swung onto the periphery of the conveyor wheel when not engaging a bag.

30. A machine as described in claim 4 wherein the various operating means are divided according to the time necessary to accomplish their function so that each operation requires approximately the same time to complete it, whereby it is possible to dispose the various apparatus for performing said operations about uniformly and intermittently rotating conveyor wheels driven with the other portions of said apparatus by a common drive.

31. In a machine for making, filling, closing and wrapping tea bags or the like having a continuous supply of a strip of bag-forming material, a strip drive for said material comprising a central driving roller, a pair of driven rollers mounted upon opposite sides of said central roller, a shuttle roller aligned with said driving roller whereby a loop of the strip may extend from said driving rollers around said shuttle roller, means mounting said shuttle roller for movement toward and away from said driving roller, means for guiding said strip between a first one of said driven rollers and said central roller around said shuttle roller and thence between said central roller and the other of said driven rollers, and means operatively associated with said first driven roller to intermittently move it from said middle roller whereby said strip is drawn alternately at a faster and then a slower rate between said first driven roller and said central roller and then it is uniformly fed between said other driven roller and said central roller.

32. In a machine for making and filling tea bags or the like having a source of bag-forming material and a supply of filling material, the combination of means to feed a strip of bag-forming material from a source at a variable rate and to move it past a dose-receiving zone at a constant rate, a first bucket wheel having therein a plurality of dose-measuring cavities of adjustable size, a second bucket wheel mounted to receive doses from said first bucket wheel having fixed-capacity cavities spaced about the periphery thereof at such intervals as to receive the doses from said first bucket wheel and deposit them at intervals in said bag-forming material.

33. In a machine for making and filling and closing tea bags or the like having a supply of bag-forming material and tea or the like, a tube-forming assembly comprising a pair of spaced fingers joined adjacent said tea supply and mounted in the line of feed of said strip and tapering to a substantially flat tube form at the end in the direction of feed, guide means for leading together the edges of said bag-forming material above said forming assembly, a first driving wheel and folding blade assembly adapted to receive the material from said guide means and to form a first fold in the edge portions thereof, a second driving wheel and folding blade assembly adapted to receive the material from said first assembly and to form therein a second fold, and a third driving wheel and blade assembly adapted to receive said material from said second assembly and to fold the now twice folded edge portions of said bag material against said material whereby a thin flat tube is formed having a longitudinal fold therein.

34. In a machine for making and filling and closing tea bags or the like having a substantially continuous supply of bag-forming material, the combination of means for feeding said material along a path, means disposed along said path for forming said material into a flat tube having two sides, said means comprising guiding means for bringing together the edges of the material along a line substantially midway between said sides and folding means for repeatedly folding said edges to form a substantially flat seam midway between the sides of said tube, said tube having therein tea quantities at spaced intervals, means constituting a supply of tea or the like, means for feeding tea or the like from said supply means along a second path so as to intersect said first path at a point prior to the formation of said material into a tube, and interlocking means joining said means for feeding said bag material and said quantities to insure deposit of equal quantities of tea or the like at equal spaced intervals along said bag-forming material.

35. In a machine for making and filling tea bags or the like from a substantially continuous tube of bag-forming material comprising means to fold a strip of bag-forming material about its edges to form a flat longitudinal seam substantially along the center line of said tube, means to deposit a plurality of dosages of tea or the like spaced at tervals within said tube, W-shaped anvil means to receive segments of the tube, twin-bladed folding swords positioned in operative relationship with said anvil means, and means to pivot said swords into and out of engagement with said anvil means, whereby to form a W-shaped fold in a tube segment positioned upon said anvil.

36. In a machine for making and filling and closing tea bags or the like, bag-closing means comprising at least one pair of bag-engaging arms adapted to bring together the two ends of a tube segment of bag-forming material so that one end extends above the other, a first folding anvil means for folding over the corners of said upstanding bag portion to form a central tab, and a second folding anvil means for folding down the resultant tab from said first folding operation to form a sealing fold for the top of said bag.

37. The method of making and filling and closing tea bags or the like which comprises the steps of: uniformly feeding a substantially continuous strip of bag-forming material along a path, turning up the longitudinal edges of said strip to form a trough therein having a relatively wide bottom, feeding a supply of tea or the like along a path substantially transverse to said strip path so as to interest therewith, depositing equal quantities of the tea or the like at spaced intervals along said trough, folding together said longitudinal edges of said strip to form a flat tube having a longitudinal seam disposed substantially along the center of one face thereof, folding a transverse seam in said tube between alternate adjacent quantities of tea or the like, and forming segments of said tube about said transverse seam into bags each containing two dosages of tea or the like.

38. The making of tea bags and the like as described in claim 37 which includes, bringing together the edges of said trough so that one edge extends above the other a distance equal the width of the fold to be formed therein, folding the extended edge portion over the lower edge portion, folding said three-layer fold about the now downwardly projecting edge portion, and folding the five-layer fold flat against the strip to form a substantially flat tube.

39. In the making and filling and closing of tea bags and the like, the method of forming a closing fold for said bag which comprises forming a tube segment containing two spaced doses of the tea or the like, folding said tube segment together with a W-shaped bottom so that one end portion extends above the other end portion, folding over the corners of said end portions to form a trapezoidal flap portion, folding down approximately the upper half of said flap portion, placing a string about said folded closure, and securing said closure with a staple inserted so as to engage said string on both sides of said fold.

40. In the method of forming bags from tube segments having interlocking longitudinal folds, the steps of cutting off a segment of the tube containing two spaced substance quantities, forming in the portion intermediate said substance quantities three equally spaced transverse folds of widths sufficient to permit the compartments of the completed bag to spread apart upon the swelling of the substance quantities and to insure the abutment of opposite portions of said longitudinal fold to prevent the opening thereof, and folding up the extremities of said segment so as to bring said compartments adjacent each other with said longitudinal fold disposed therebetween.

41. The method of claim 40 wherein the ends of said segment extremities are bent downwardly as said extremities are folded up to avoid overflowing of said substance quantities.

42. A machine for making, filling and closing tea bags and the like having a thread attached thereto and having a first and second conveyor wheel for carrying the bags past the various forming devices including a thread cutting and pulling device comprising a disk adapted to be rotated in a given relation with the rotation of said first conveyor wheel; a pair of levers mounted thereon and adapted to catch the thread and press it against the disk, said levers being arranged such that the lever close to the first of two moving bags, clamps the thread which connects the two bags, between said disk and lever; cutting means positioned to cut said thread between the spot where it is clamped and the first moving bag; guide means for placing the thread portion, between the clamping spot and the second bag, about the periphery of the disk during the continuing movement of the bags; and means for finally, during the continuing movement of said bags, pulling the thread portion off said disk.

43. In a machine of the type described having a first and second conveyor wheel for carrying the bag past the various devices disposed thereabout, a bag transfer wheel comprising, a rotatably mounted drum mounted on an axis and having therein a single pair of bag-receiving cavities, said cavities each having one common fixed side wall and one movable side wall, cam means positively controlling said movable side wall to selectively hold said bags in said cavities, a first gripper adapted to project through a slit in the side wall of said cavities and to engage the bag on the first conveyor wheel and to draw it into said cavity, means to rotate said transfer wheel when a bag is received, said means actuating said cam control means for clamping the bag in said cavity and rotating the bag 180° in one step, and a second gripper adapted to project into the rotated cavity and to eject said bag therefrom to said second conveyor wheel, each of said grippers being mounted independently of said drum on a respective pendulum arm pivoted on an axis opposite said drum axis, said pendulum arms being mounted on opposite sides of said drum, one on each side.

44. A device as in claim 43 wherein the bag to be transferred has attached thereto a thread and the gripper adapted to pull the bag into a cavity of the transfer wheel has an arm mounted thereon provided with thread-guiding means for directing the thread about said bag as said transfer wheel is rotated, and means for releasing said thread only when the bag is transferred to the second conveyor wheel.

45. In a machine for filling and closing and wrapping tea bags and the like, a device for forming an envelope about a completed bag which comprises, a conveyor wheel having therein a plurality of bag-receiving cavities and having disposed thereabout a plurality of devices for forming said envelope including, an adjustable rack containing a supply of envelope blanks positioned and arranged to permit it to be refilled without interrupting the operation of said machine, a pair of drive rollers for feeding said blanks to said conveyor wheel, a pair of pivotally mounted suction cups adapted to pick up one envelope blank at a time and feed it to said drive rollers, guide means for guiding the leading edge of said blank into cavity lining position across the mouths of said bag-receiving cavities on said conveyor wheel, spring fingers pivotally mounted adjacent said conveyor wheel adapted to insert said envelope blank into said bag-receiving cavities, and folding means adapted to close the flap of said envelope about said completed bag.

46. A devices as described in claim 45 wherein said bag inserting spring fingers comprise a pair of spring fingers spaced apart at their bag contacting ends and mounted on one end of a two arm pivotally mounted lever, a driving linkage for operating said lever and fingers, a stop within said bag-receiving cavities having a groove therein adapted to cooperate with said spaced spring fingers to form a W-shaped fold in the bottom of said envelope corresponding to the fold in the bottom of the bag.

47. A device as described in claim 45 which includes, means operative for a period during the feeding of said envelope blank from said stack to said conveyor wheel to hold said blank stationary, a pair of shearing blades mounted on said rollers adapted to form spaced longitudinal slits adjacent one end of said blank, and a transverse shearing blade adapted to form a transverse cut between said longitudinal cuts during said stationary period whereby a label is formed which is attached to said blank by a minimum number of uncut segments.

48. A device as described in claim 47 wherein said drive rollers have cutout channel portions in which said shearing blades are mounted and wherein said blades are arcuate in form and extend only around a portion of the periphery of the drive rollers and are mounted concentrically with the axes of said drive rollers.

49. A device as in claim 48 wherein one of the drive rollers has a cutout therein adapted to receive the front edge of each envelope blank to insure the insertion of the envelope blanks in between the drive rollers.

50. In a machine as described in claim 45 wherein the guide means are constructed in such a way that the envelope blank forms a loop between the drive rollers and the conveyor wheel and wherein said conveyor wheel is provided with clamping means adjacent the mouths of said cavities which grip the front edge of the envelope blank.

51. A machine as described in claim 45 including means for forming a label portion in said blank and a stapling device which is mounted adjacent said conveyor wheel beyond said spring fingers in the direction of rotation of said conveyor wheel and which is adapted to staple a thread or the like to the label portion of said envelope.

52. A device as described in claim 51 including means for prohibiting the staple forming operation in the second stapling device comprising feeler means adapted to detect the presence of an envelope blank in said wheel cavities and link means connected between said feeler means and said staple forming device to lock said staple forming device if no envelope blank has been inserted in the conveyor wheel cavity for which envelope the staple would be formed.

53. A machine as described in claim 45 wherein said folding means comprise a pair of cooperating dies mounted to sharply fold the ends of the flap so that the knurling wheels can securely interlock the edges thereof.

54. In a machine for making tea bags and the like having therein means for forming a bag and for folding over the top of the bag to form a closure therefor and for fastening said closure with a staple, interlocking means between the bag closure folding device and said bag stapling device including, a feeler element in said folding device adapted to determine the presence therein of a bag, a ratchet assembly in said stapling device adapted to control the formation of a staple therein, and linking means between said feeler and said ratchet assembly whereby a staple can be formed only when there is a bag appropriately positioned to receive said staple in a subsequent operation.

55. In the making, filling, closing and wrapping of tea bags and the like the method of forming an envelope about a completed tea bag or the like which comprises feeding an envelope blank to a forming station; partially severing a label portion from one end of said blank; forming said blank into a generally U-shaped configuration having a flap extending from one edge thereof; inserting a completed bag, having a string attached thereto, into said U-shaped portion; attaching the free end of said string to said label portion; folding said flap about said U-shaped portion and securing the edges of said blank together to form a closed envelope about said bag.

56. In a device of the character described the method of forming a tab portion in a short strip envelope blank which comprises gripping the front edge of the envelope blank, drawing it forward independently of the rear edge, driving the body of the blank by drive rollers independently of the front edge, forming a slack loop in the blank between front and rear edges, ejecting the rear edge of said envelope blank from said drive rollers before said loop is taken up whereby said rear edge is stationary for a short period while said loop is being taken up, and forcing a cutting blade into said envelope blank during the period when the rear part of said envelope blank is stationary to thereby partially sever the tab portion therefrom.

57. In a machine for packaging tea bags and the like, a bag-feeding chute having at one end thereof a bag-receiving chamber, means adapted to move said bags through said chute, and a turnover device positioned before the bag-receiving chamber in the line of feed thereto and adapted to turn each second bag fed thereto 180°, said turnover device comprising a pair of intermittently rotating discs spaced apart one bag-width and having therebetween, on either side of the axis thereof, two chambers with converging walls mounted in such a way that the wide entrance openings are diametrically opposite each other, and the opposite end of one chamber has a passageway for the bags and the opposite end of the other chamber has no such passageway.

58. A device for folding a short-length flat tubular segment of bag material not sealed transversely and containing a pair of spaced equal doses of a tea-like substance, said device comprising grasping means for engaging each end of said segment and for holding it generally horizontally, a W-shaped anvil having side edges and a center edge and positioned with its center edge substantially opposite the transverse certerline between the two doses of substance of said segment, clamping means for first pressing said segment against the center edge of said anvil and then for pressing the segment into W shape on said anvil, and closing means for moving said grasping means together to fold said segment double while its center portion is pressed against said anvil.

59. The combination of elements as in claim 58 wherein a plurality of W-shaped anvils are carried on a rotatable wheel, each anvil being adapted to have a bag segment folded on it, each anvil having associated with it at least part of said grasping means and said closing means, and in which said clamping means acts in turn in conjunction with each of said anvils.

60. In a machine for making two compartment tea-like substance bags, a rotatable wheel having equally spaced around its periphery a plurality of W-shaped anvils, a folding station and a plurality of bag-top closing stations positioned opposite said wheel at respective points spaced apart by the angular distance between said anvils, bag gripping means carried by said wheel and associated with each anvil, and bag folding means at said folding station adapted in conjunction with said gripping means to take a generally horizontal short tube-like segment of bag material containing a pair of spaced doses of substance and to hold the ends of said segment, to clamp the mid-portion thereof between said doses into an anvil, to bring the ends of said segment together above said anvil to fold said bags, and then to unclamp the mid-portion of said segment while holding said bag folded with its ends outward, said gripping means holding said bag in this position while it is rotated past said bag-top closing stations.

61. The combination of elements as in claim 60 wherein said bag folding means includes two plate-like members spring-urged together, and a thin arm separating the forward edges of said members and spring-urged to a level with said edges, said arm being adapted to press said bag segment against the center edge of one of said anvils and to hold it there while said members force the mid-portion of said segment into said anvil and to hold said segment while said members are being withdrawn therefrom.

62. In a machine wherein tea-bags and the like in the process of folding and closing are rotated past a plurality of work stations, a rotatable wheel, and a plurality of pairs of gripping fingers evenly spaced apart around the rim of said wheel and carried thereby, each pair of fingers being adapted to hold a bag extending generally along a radial line of said wheel and including a first semi-circularly curved arm carrying one of said fingers, a second semi-circularly curved arm carrying the other of said fingers, a first pivot shaft lying on one side of said radial line and about which said first arm can be rotated, a second pivot shaft lying opposite the first and on the other side of said radial line and about which said second arm can be rotated, and means for rotating said arms in opposite directions, said first and second arms lying mostly on one side of said radial line with their fingers opposite each other and adapted to grip a bag at said line, said second arm being curved around said first arm and said first pivot shaft.

63. In the method of applying string handles to tea bags and the like which are aligned along a direction in equally spaced apart relation and which are adapted to be moved intermittently in unison along said direction, the combined step of fastening to a bag as it stands opposite a first point a continuous length of string extending to the bag ahead and extending from a supply reel behind, holding near a second point the length of string between the bag at said first point and the bag ahead, cutting the string at the third point closely behind the bag ahead, and holding taut from near said third point the length of string attached to the bag ahead and previously cut from the bag still further ahead, the combined step of advancing the bag at said first point past said second point and just past said third point while grasping near said second point the length of string trailing behind and while holding taut the severed length of string leading ahead moving the point of holding of said severed length from near said second point to near the third, and simultaneously advancing the other bags, the last bag already advanced beyond said third point trailing its string handle which is finally pulled free from being held near said third point, and then repeating the above recited steps.

64. The method of packaging a tea bag or the like comprising the steps of attaching to a tea bag along the top edge thereof a short-length string handle, wrapping said handle around said bag from the point of attachment downward along a first face, around the bottom, upward along the other face to just above the top edge and then outward away from said other face, folding an envelope blank into a U shape with a top flap extending from one top edge and with a partially formed tab near the other top edge, placing said bag bottom-first into said U shape with said first bag face opposite said top flap, and said other bag face opposite said tab, fastening said handle to said tab, and then closing said flap over said tab.

65. In the making of two compartment tea-like substance bags, the method including the step of forming a continuous longitudinal tube of bag material filled with equally spaced pairs of equal doses of the substance, the spacing between each dose of a pair being the same from pair to pair and the spacing between pairs being equal from pair to pair, the step of cutting a short length from said tube, said length containing a pair of doses, the midpoint of said length being slightly to one side of the midpoint between the two doses, and the step of folding said length double about the midpoint between the two doses to form a two compartment bag.

66. The method as in claim 65 in which the spacing between each dose of a pair is equal to the spacing between each pair.

References Cited in the file of this patent

UNITED STATES PATENTS

| | | |
|---|---|---|
| Re. 20,881 | Rambold | Oct. 11, 1938 |
| 919,791 | Stringer | Apr. 27, 1909 |
| 948,699 | Hoxie | Feb. 8, 1910 |
| 949,804 | McGirr | Feb. 22, 1910 |
| 1,235,805 | Jennings | Aug. 7, 1917 |
| 1,269,451 | Jackson | June 11, 1918 |
| 1,313,864 | Smith et al. | Aug. 19, 1919 |
| 1,379,254 | Ekstrom et al. | May 24, 1921 |
| 1,396,157 | Birch | Nov. 8, 1921 |
| 1,402,184 | Sinclair | Jan. 3, 1922 |
| 1,463,636 | Stricker | July 31, 1923 |
| 1,659,143 | Hopkins | Feb. 14, 1928 |
| 1,727,208 | Bombard et al. | Sept. 3, 1929 |
| 1,869,116 | Rambold | July 26, 1932 |
| 1,935,613 | Bronander | Nov. 21, 1933 |
| 1,938,750 | Litchfield | Dec. 12, 1933 |
| 1,987,789 | Mudd | Jan. 15, 1935 |
| 1,992,740 | Chandler | Feb. 26, 1935 |
| 2,006,564 | Townsend | July 2, 1935 |
| 2,189,729 | Evans et al. | Feb. 6, 1940 |
| 2,362,459 | Barnett | Nov. 14, 1944 |
| 2,362,460 | Barnett | Nov. 14, 1944 |
| 2,427,712 | Casler et al. | Sept. 23, 1947 |
| 2,457,237 | Howard | Dec. 28, 1948 |
| 2,549,004 | Pomeroy et al. | Apr. 17, 1951 |

FOREIGN PATENTS

| | | |
|---|---|---|
| 660,916 | Germany | July 15, 1938 |

UNITED STATES PATENT OFFICE

CERTIFICATE OF CORRECTION

Patent No. 2,823,502      Adolf G. F. Rambold      February 18, 1958

It is hereby certified that error appears in the above numbered patent requiring correction and that the said Letters Patent should read as corrected below.

In the grant, lines 1, 2 and 3, for "Adolf G. F. Rambold, of Viersen, Germany," read -- Adolf G. F. Rambold, of Viersen, Germany, assignor to Teepack Spezialmaschinen, G. m. b. H., of Viersen/Rheinland, Germany, a company of Germany,--; line 12, for "Adolf G. F. Rambold, his heirs" read -- Teepack Spezialmaschinen, G. m. b. H., its successors --; in the heading to the printed specification, line 4, for "Adolf G. F. Rambold, Viersen, Germany" read -- Adolf G. F. Rambold, Viersen, Germany, assignor to Teepack Spezialmaschinen, G. m. b. H., Viersen/Rheinland, Germany, a company of Germany --; column 6, line 33, for "arm 253" read -- arm 353 --; column 13, line 6, for "locker" read -- rocker --; column 16, line 8, for "identical" read -- identically --; line 37, for "cam 207" read -- cam 207a --; column 17, line 64, for "sleeves 249a" read -- sleeves 252 --; line 68, for "lever 252" read -- lever 252a --; line 72, for "252" read -- 252a --; column 27, line 29, for "91-100" read -- 85-100 --; column 41, lines 44 and 46, for "2357", each occurrence, read -- 1357 --; column 54, line 60, for "interest" read -- intersect --.

Signed and sealed this 1st day of July 1958.

(SEAL)
Attest:

KARL H. AXLINE
Attesting Officer

ROBERT C. WATSON
Commissioner of Patents